US012689671B1

(12) United States Patent
Di Prisco et al.

(10) Patent No.: US 12,689,671 B1
(45) Date of Patent: Jul. 21, 2026

(54) INTEROPERABLE, WRAPPED TOKENS

(71) Applicant: The Next Thing Ltd., George Town (KY)

(72) Inventors: Gregory Di Prisco, New York, NY (US); Antonina Cherednichenko, New York, NY (US); Pierrick Turelier, Austin, TX (US)

(73) Assignee: The Next Thing Ltd. (KY)

( * ) Notice: Subject to any disclaimer, the term of this patent is extended or adjusted under 35 U.S.C. 154(b) by 0 days.

(21) Appl. No.: 19/535,955

(22) Filed: Feb. 10, 2026

Related U.S. Application Data

(60) Provisional application No. 63/901,392, filed on Oct. 17, 2025.

(51) Int. Cl.
H04L 67/10 (2022.01)
G06F 21/10 (2013.01)
H04L 9/40 (2022.01)

(52) U.S. Cl.
CPC .............. H04L 67/10 (2013.01); G06F 21/10 (2013.01); H04L 63/20 (2013.01)

(58) Field of Classification Search
CPC .......... H04L 67/10; H04L 63/20; G06F 21/10
See application file for complete search history.

(56) References Cited

U.S. PATENT DOCUMENTS

2019/0188793 A1    6/2019  Molinari et al.
2020/0051067 A1    2/2020  Overholser et al.
2020/0219093 A1 *  7/2020  Malhotra ............. G06Q 20/389
2021/0042836 A1    2/2021  Doney et al.
2022/0327529 A1 * 10/2022  Williams ................. H04L 9/50
2023/0018175 A1    1/2023  Kaplan et al.
2024/0005409 A1    1/2024  Doney

OTHER PUBLICATIONS

Luca Prosperi, Reconstructing the Monetary Stack, Ecosystem Feb. 8, 2024, pp. 1-10. https://research.mO.org/research/reconstructing-the-monetary-stack.
Greg Di Prisco, Introducing the Two Token Governor, Ecosystem, Feb. 23, 2024, pp. 1-13. https://research.mO.org/research/introducing-the-two-token-governor.
Joao Reginatto, A Brief Perspective on Money Technology, THought Leadership, Mar. 22, 2024, pp. 1-14. https://research.mO.org/research/a-brief-perspective-on-money-technology-by-joao-reginatto.
Antonina Norair, MO Protocol Basics: Minter Rate, Global Interest Rate Index, and Key Principles, Engineering, Aug. 28, 2024, pp. 1-12. https://research.mO.org/research/m-O-protocol-basics-minter-rate-global-interest-rate-index-and-key-principles.

(Continued)

*Primary Examiner* — Hany S. Gadalla
(74) *Attorney, Agent, or Firm* — Pillsbury Winthrop Shaw Pittman, LLP

(57) ABSTRACT

Provided is a process including: minting a base token with a base-token smart contract on a blockchain; wrapping the base token with a first-type of wrapper token with a first wrapper smart-contract on the blockchain; receiving a request to transfer the base token to a second-type of wrapper token; and in response to receiving the requested transfer: unwrapping the base token from the first-type of wrapper token and wrapping the base token with a second-type of wrapper token with a second wrapper smart-contract on the blockchain.

36 Claims, 8 Drawing Sheets

(56) References Cited

OTHER PUBLICATIONS

Rafael Weninger, MO's Software Modules and Key Functionalities Driving the Ecosystem, Ecosystem, Sep. 27, 2024, pp. 1-10. https://research.mO.org/research/m-Os-software-modules-and-key-functionalities-driving-the-ecosystem.

Luca Prosperi, Why we need decentralized stablecoins, Thought Leadership, Feb. 4, 2025, pp. 1-9. https://research.mO.org/research/why-we-need-decentralized-stablecoins.

M$^\wedge$0 Foundation, M$^\wedge$O Protocol Whitepaper, Mar. 20, 2024, pp. 1-37.

Santoro, Joey et al., ERC-4626: Tokenized Vaults o <>—Tokenized Vaults with a single underlying EIP-20 token, Dec. 22, 2021, pp. 1-17. https://eips.ethereum.org/EIPS/eip-4626.

Compound v2 Docs, cTokens, downloaded Feb. 11, 2026, pp. 1-29. https://docs.compound.finance/v2/ctokens/.

GitHub—lidofinance/core core/contracts/0.6.12/WstETH, downloaded Feb. 11, 2026, pp. 1-4. https://github.com/lidofinance/lido-dao/blob/master/contracts/0.6.12/WstETH.sol.

GitHub—gnosis/canonical-weth, downloaded Feb. 11, 2026, pp. 1-21. https://github.com/gnosis/canonical-weth/blob/master/contracts/WETH9.sol.

Kyber Network, BitGo Inc and Republic Protocol, Wrapped Tokens—A multi-institutional framework for tokenizing any asset, Whitepaper v0.2, Jan. 24, 2019, pp. 1-16.

GitHub—circlefin/stablecoin-evm, downloaded Feb. 11, 2026, pp. 1-5. https://github.com/circlefin/stablecoin-evm.

ERC-1404: Simple Restricted Token Standard #1404, downloaded Feb. 11, 2026, pp. 1-14. https://github.com/ethereum/EIPs/issues/1404.

Whitepaper, ERC3643—The T-REX protocol (Token for Regulated EXchanges), Version 4.0, Mar. 15, 2023, pp. 1-42.

GitHub—Uniswap/v2-periphery, downloaded Feb. 11, 2026, pp. 1-13. https://github.com/Uniswap/v2-periphery/blob/master/contracts/UniswapV2Router02.sol.

* cited by examiner

200

Update Collateral Interval 212

Propose Mint TTL 232

Mint Delay 222

| Update Collateral | Propose Mint | Mint M | Propose ID Expires |
| 210 | 220 | 230 | 240 |

300

600

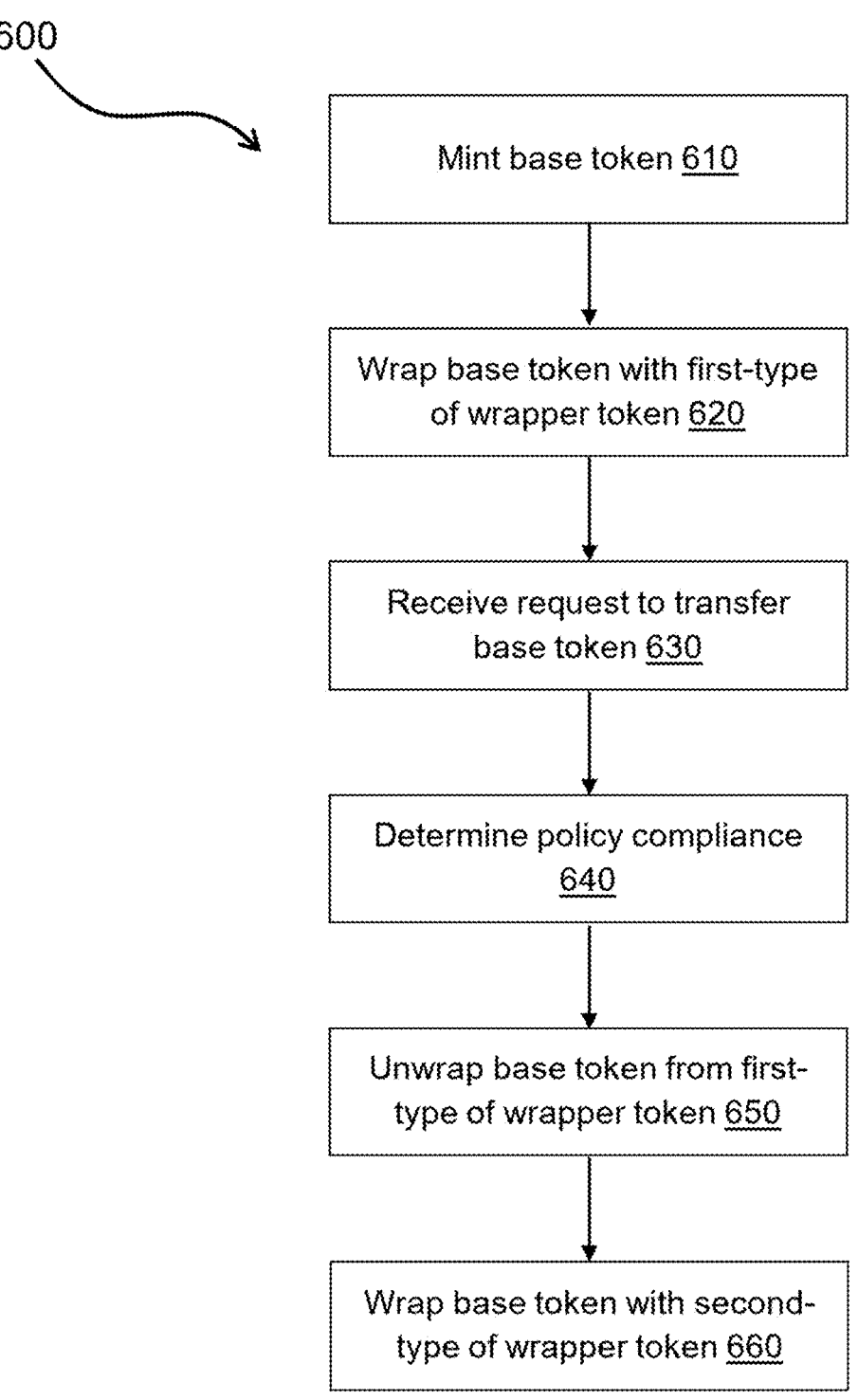

```
┌─────────────────────────────┐
│    Mint base token 610      │
└─────────────────────────────┘
              │
              ▼
┌─────────────────────────────┐
│ Wrap base token with first- │
│ type of wrapper token 620   │
└─────────────────────────────┘
              │
              ▼
┌─────────────────────────────┐
│  Receive request to transfer│
│      base token 630         │
└─────────────────────────────┘
              │
              ▼
┌─────────────────────────────┐
│ Determine policy compliance │
│             640             │
└─────────────────────────────┘
              │
              ▼
┌─────────────────────────────┐
│ Unwrap base token from first│
│ -type of wrapper token 650  │
└─────────────────────────────┘
              │
              ▼
┌─────────────────────────────┐
│ Wrap base token with second-│
│ type of wrapper token 660   │
└─────────────────────────────┘
```

FIG. 5

INTEROPERABLE, WRAPPED TOKENS

CROSS-REFERENCE TO RELATED APPLICATIONS

This patent application claims priority to U.S. Provisional Patent Application No. 63/901,392, filed Oct. 17, 2025. The aforementioned patent application is incorporated by reference herein in its entirety.

BACKGROUND

1. Field

The present disclosure relates generally to blockchain technology and, more specifically, to interoperable wrapped tokens.

2. Description of the Related Art

Blockchain tokens are rivalrous data representations that reside in distributed ledger systems and can be used to express ownership interests, access permissions, or other rights associated with digital or physical items. A token may carry identifiers, attributes, and transfer rules that software interprets when recording or updating ledger entries. These records can be visible to participants in a network and can be processed by programs that evaluate conditions for transfer, access, or other actions. In some contexts, tokens serve as units of account, tickets, collectibles, or proofs of participation, and they can interoperate with wallets, marketplaces, and other applications.

Organizations and individuals use tokens to coordinate activity across computers that do not share a single operator. Examples include settling payments, granting admission to services, distributing rewards, tracking items through a supply chain, managing in-app items, and supporting community governance or identity attestations. Networks that host tokens may provide timestamped recording, replication across nodes, and execution of programmable logic associated with token movement.

SUMMARY

The following is a non-exhaustive listing of some aspects of the present techniques. These and other aspects are described in the following disclosure.

Some aspects include a process including: minting a base token with a base-token smart contract on a blockchain; wrapping the base token with a first-type of wrapper token with a first wrapper smart-contract on the blockchain; receiving a request to transfer the base token to a second-type of wrapper token; and in response to receiving the requested transfer: unwrapping the base token from the first-type of wrapper token and wrapping the base token with a second-type of wrapper token with a second wrapper smart-contract on the blockchain.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 5 illustrates an example method in accordance with some embodiments herein.

Figure 1:
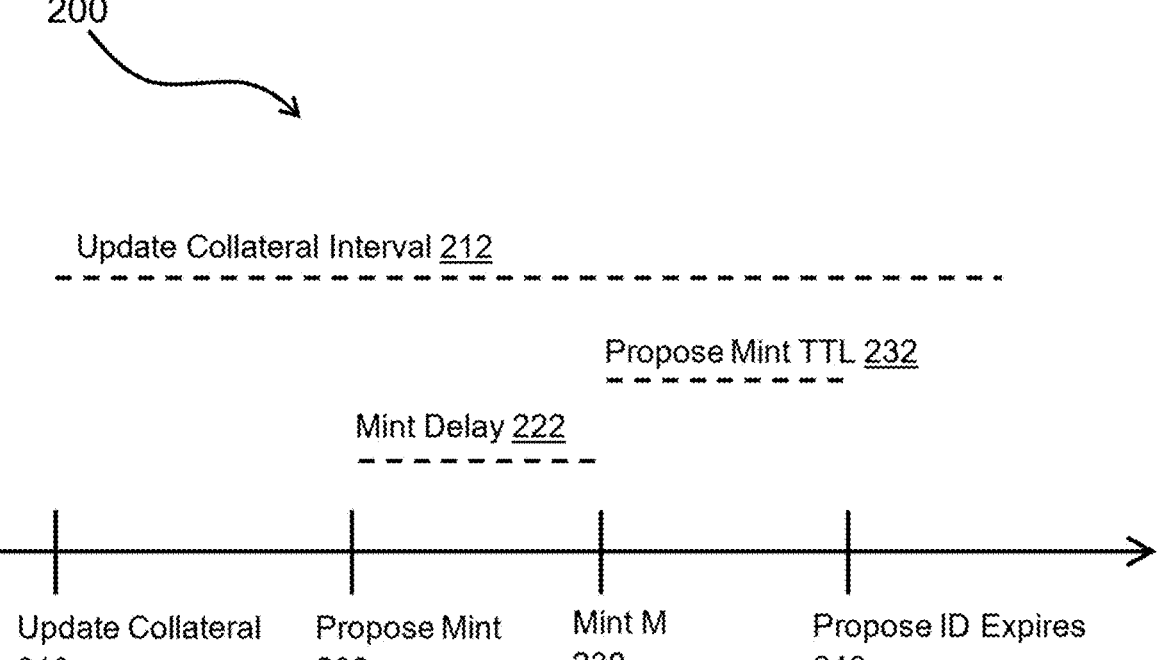
FIG. 1 illustrates an example collateral update process in accordance with some embodiments herein.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of blockchain computing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In many cases, stablecoin issuance places most operational and compliance complexity at the retail or brand layer. Each branded token tends to replicate various functions (like mint/redeem logic, compliance gates, fee handling, and yield accounting), leading to duplicated code paths, inconsistent behavior, and upgrade risk across many contracts. Because those tokens are economically independent, moving value between brands typically requires routing through a third, liquid intermediary (e.g., United States Dollar Coin (USDC™)), which introduces additional legs, slippage, gas cost, and failure modes. The absence of a common economic base also makes it difficult to guarantee value preservation when converting from one branded token to another.

Interoperability is further hampered by accounting models. Rebasing or locally computed yield causes balances to change asynchronously, which breaks downstream assumptions in DeFi (decentralized finance) and complicates reconciliation and tax/ledger treatment. Even with non-rebasing designs, branded tokens frequently maintain separate exchange rates or stale pricing oracles, so conversions between brands can misapply yield, expose users to index drift, or permit value extraction by arbitrageurs observing inconsistent states across contracts or chains.

Compliance and policy enforcement are typically implemented per token, at transfer time, rather than at the risk boundary where a user changes economic form (e.g., from one brand's policy regime to another's). This disperses allow/deny lists, fee schedules, and yield-routing rules across many contracts and chains, increasing surface area for configuration drift and making audits difficult. Without a single, authoritative control point for cross-brand transitions, it is hard to prove that both the source and destination policy predicates were satisfied before any state change, and hard to emit a canonical audit trail tying the conversion to a specific policy epoch.

Cross-chain operation compounds these issues. Branded tokens on different chains often rely on heterogeneous bridges and pricing sources, producing race conditions, replay risks, and inconsistent economic state. Often, brands cannot guarantee that conversions on any chain use the same economic snapshot and policy set. As a result, users face unpredictable outcomes, and operators face operational risk when liquidity or oracles are temporarily unavailable or maliciously manipulated.

Finally, many conversion flows are not designed for atomicity, the lack of which creates exposure to partial fills, front-running/MEV, stale-index drift between steps, and compliance gaps while the user temporarily holds the base asset. There is no mechanism to ensure that the amount debited from the source form and the amount minted in the destination form are computed against the same index snapshot and gated by both policy regimes in one all-or-nothing transaction. None of the proceeding discussion of issues with certain approaches or any of the other discussions herein about tradeoffs should be read to imply a disclaimer or disavowal of those techniques.

In some embodiments, a computer-implemented system may include a wholesale base asset token that may accrue value according to a global (e.g., across diverse types of tokens wrapping that base token) earning index, and a plurality of non-rebasing wrapper tokens that may each represent a claim on the base asset, while enforcing brand-specific or jurisdiction-specific operational policies. The system may centralize economic and compliance logic within a base layer and a policy registrar, allowing branded extensions to interoperate deterministically without conversion through a third-party intermediary asset.

The system may include a base asset contract configured to maintain an on-chain, monotonically non-decreasing earning index and to enforce role-based permissions, such as permissions associated with minting, earning, or routing. The system may further include an on-chain registrar that may store authoritative policy configuration data, including allow or deny lists, fee schedules, yield-routing parameters, and routing or portal allowlists. Multiple extension contracts may hold or reference the base asset and may expose standardized token interfaces, such as ERC-20-compatible interfaces, while remaining non-rebasing. A swap facility router (e.g., implemented on-chain as a smart contract, or off-chain) may provide the sole authorized pathway for performing transitions between extensions or between the base asset and an extension. Or in some embodiments, functionality of the router may be implemented partially or entirely within wrapper smart contracts.

In some embodiments, a conversion from a first extension to a second extension may be executed as a single transaction through the swap facility. An example workflow may include retrieving a current index snapshot or epoch identifier from the base asset contract, evaluating policy predicates of both the source and destination extensions using the registrar's stored state, including per-address compliance parameters, per-address fee and redirection rules, and pause or cap conditions. The system may then determine conversion amounts that are bound to the same index snapshot to maintain economic value consistency up to declared fees. The conversion operation may apply the resulting state transition atomically, either by burning and subsequently minting extension shares or by reassigning ledger entries within a shared vault, such that all state updates succeed together or revert together. The router may emit structured events containing data fields such as source, destination, index epoch, policy digest, input amount, and output amount, thereby allowing generation of an auditable record of the economic and policy context associated with the transition.

In some embodiments, extensions or other wrappers may require router authorization data, referred to as router memos, for deposit or redemption operations. Each memo may comprise a signed or otherwise attested digest binding input parameters such as source or destination addresses, transaction amounts, a policy digest, and an index epoch to a specific transition. An extension smart contract may reject redemption or deposit operations that lack a valid memo, thereby preventing bypasses that might otherwise allow unwrap and rewrap behavior without policy evaluation. This enforcement ensures that policy validation occurs at the transaction boundary where the economic representation changes.

In cross-chain embodiments, a hub portal on a canonical blockchain may publish epoched updates that include the earning index and a policy configuration digest. Spoke portals deployed on other chains may accept only origin-authenticated updates, which may be verified using light-client proofs, zero-knowledge proofs, or quorum attestations. The spoke portals may enforce anti-replay protections and freshness constraints and may verify bounded drift with respect to an external rate oracle prior to committing a new epoch. Extensions and routers deployed on spoke chains may perform conversions priced against the most recently accepted hub epoch, thereby maintaining consistency of economic and policy state across blockchains. Large datasets, such as earner allowlists or per-address fee tables, may be distributed as Merkle roots (or digests of other cryptographic accumulators) published by the hub, and callers may provide Merkle proofs bound to the current epoch when performing minting, redemption, or cross-extension transitions.

In some embodiments, a liquidity-aware configuration may be employed in which the router cooperates with a permissioned liquidity backbook holding a base-asset wrapper and one or more counter-assets, such as USDC™ or Tether™, at a target composition ratio. The system may monitor the state of such liquidity pools and, upon detecting threshold breaches or backlog conditions, may trigger automated mint or rebalance operations within governance-defined parameters, such as per-epoch mint caps or time-delayed buffers. These liquidity management controls may operate independently of the conversion invariants and may not interfere with single-transaction atomicity or index-consistent accounting of conversions.

In some embodiments, the described architecture may normalize heterogeneous branded tokens around a shared on-chain economic index, may enforce policy validation during state transitions using dual-sided predicates and auditable proof structures, may perform conversions without reliance on intermediary market assets, and may extend deterministically across chains by propagating authenticated epoch data and Merkle-proved policy datasets. The system may be implemented as one or more methods, computing systems, or non-transitory computer-readable media storing instructions that, when executed (e.g., by decentralized, untrusted collections of node computers executing the blockchain runtime by which the described smart contracts are executed), may perform operations including atomic transition processing, memo verification, index-epoch binding, registrar lookups, cross-chain epoch validation, and structured event emission. In some embodiments, base asset tokens may be transferred from one wrapper token to a different type of wrapper token without undergoing price discovery of that base asset token. For example, a base asset token may be so-conveyed between parties (or between different types of wrapper tokens of the same party) without the base asset being exchanged for fiat currency or being assigned a price denominated in fiat currency or its equivalents. In some embodiments, the base asset token exists primarily for the purpose of executing the described wrapper and interoperability layer on top of it.

In some embodiments, a decentralized architecture may constrain participant's actions based on onchain verifiability of roles and permissions. Providers of branded tokens (like branded stable coins) or other branded wrapped tokens may have permissions and capabilities architected to avoid functioning as issuers of a stable coin and may be prevented from exercising sufficient control over wrapped tokens, even when such tokens are held in a vault or other account associated with the wrapper (such as the described extensions), so that those assets will be excluded from the wrapper provider's bankruptcy estate in the event of insolvency of the wrapper provider (e.g., the brand for the stable coin). In some embodiments, a base token contract may enforce role-scoped operations by exposing mint, burn, wrap, unwrap, or transfer primitives that may only be callable by addresses appearing in governance-maintained allowlists. Extension contracts that hold or reference the base token may be generated, registered, or activated only through constrained factory flows or approval procedures, where a registrar may record role assignments, trusted caller sets, policy digests, and parameter keys. The base token's methods that effect movement or conversion of value may consult the registrar before permitting wrapping, unwrapping, minting, burning, or transfers, and may require that both the caller address and the extension address satisfy registered predicates, including issuer disqualification rules and control-separation rules intended to avoid characterization of the extension provider as the stable coin issuer or as having bankruptcy-relevant control. Examples include prohibiting the wrapper provider from unilaterally transferring base asset tokens associated with the wrappers account, such as those held in a vault specific to that wrapper when wrapped.

In some embodiments, contract logic may bind each extension to a custody model in which the base asset remains recorded under a program-controlled vault subject to registrar-governed routing, rather than under discretionary control of the wrapper provider. The wrapper's callable surface may be limited to non-rebasing share issuance and redemption functions that reference a deterministic pricing index or epoch, while privileged actions such as seizing, sweeping, or unilateral retagging of balances may be absent or gated behind multi-party attestations enumerated in the registrar. The registrar may maintain approved role lists, including minter, router, earner, and extension roles, and may expose read-only interfaces that the base token, router, and wrapper contracts (such as extension contracts) query prior to state transitions. In some embodiments, the router that mediates base-to-extension and cross-extension transitions may verify that the destination extension is an approved earner, that the caller possesses a permitted role, and that any memoized policy digest or epoch identifier matches registrar state at the time of execution. These controls may be enforced onchain such that extension providers cannot unilaterally mint or redirect base assets, thereby reducing the likelihood that extension token balances would be deemed under sufficient control of the wrapper provider for inclusion in the provider's bankruptcy estate.

Examples below are described with reference to stable-coins, but embodiments may process a variety of other types of assets tracked on a blockchain, including fungible and non-fungible assets.

Examples below may be implemented on various block-chain computing platforms, such as Ethereum, Solana, Bit-coin, BNB Smart Chain, Polygon, Avalanche, Tron, Car-dano, Polkadot, Cosmos, NEAR, Algorand, Tezos, Fantom, Aptos, *Sui*, Arbitrum, Optimism, Base, Starknet, zkSync Era, *Hedera*, XRP Ledger, Stellar, Flow, EOS, TON, Inter-net Computer (ICP), Celo, Kava, Cronos, MultiversX (El-rond), or Neo. Reference to various steps, functions, or algorithms being performed by a smart contract does not require that a single smart contract fully implement all of the operations, as one smart contract may call another or may call off-chain resources to implement the operations.

Examples below are described with reference to $M as a base token, but a variety of other stable coins or other tokens could be used. Reference to a token as being a base token does not preclude that token itself wrapping or deriving value in other ways from some other token that is then backed by an offchain asset. In some cases, base asset tokens may be backed by (e.g., non-fractional, without rehypoth-ecation) reserves in the form of U.S. coins and currency or balances at a Federal Reserve Bank; demand deposits or insured shares at an insured depository institution (including eligible foreign branches/agents/correspondent banks); U.S. Treasuries with remaining maturity≤93 days (or originally issued≤93 days); overnight repos where the issuer is the seller and collateral is T-bills (≤93-day maturity); overnight reverse repos where the issuer is the purchaser and collateral is Treasuries (tri-party, centrally cleared, or qualifying bilat-eral); shares of a registered government money market fund invested solely in the foregoing; other similarly liquid government (e.g., federal government)-issued assets approved by the primary regulator; tokenized forms of any of the foregoing. Tokens may be pegged to various assets, including U.S. dollar-based assets and non-U.S. dollar-based assets. In some embodiments, required reserve assets need not be denominated solely in United States dollars. For example, the reserve manager may hold, allocate, and rebal-ance reserves across multiple fiat currencies and correspond-ing short-duration (e.g., less than 180-day) sovereign instru-ments, while maintaining a target duration and liquidity profile sufficient to meet redemptions in any supported stablecoin denomination. In certain embodiments, a back-end foreign-exchange module couples the reserve ledger to one or more liquidity venues (e.g., bank FX, prime broker RFQ, on-chain RFQ/AMM), affording instant conversion between currency-denominated reserve lots and facilitating atomic settlement of cross-currency redemptions or swaps. The FX module may compute route selection and hedge size from real-time quotes and policy constraints (e.g., slippage caps, counterparty allowlists), and execute conversions contemporaneously with mint, burn, or cross-wrapper transitions so that end users receive the requested currency-denominated stablecoin without intermediate exposure to another asset. In further embodiments, the system records the executed FX rate, venue identifier, and policy epoch as part of the transaction audit trail. In some cases, tokens (base tokens or wrapper tokens, or both) may be compliant with one or more of the following standards: ERC-777, ERC-1155, ERC-4626, ERC-1363, ERC-1400, ERC-3643, ERC-3475, SPL Token (Solana), Token-2022 (Solana), TRC-20 (Tron), TRC-10 (Tron), BEP-20 (BNB Smart Chain), BEP-2 (Binance Chain), FA1.2 (Tezos), FA2 (Tezos), Algorand Standard Asset (ASA), NEP-141 (NEAR), CW20 (Cosm-Wasm/Cosmos), PSP22 (Polkadot/Substrate), XRP Ledger Issued Currencies, Stellar Issued Assets, *Hedera* Token Service (HTS), Flow Fungible Token (Flow FT), ICRC-1 (Internet Computer), EOSIO.token (EOS), Aptos Fungible Asset (FA), Aptos Coin (Move), *Sui* Move Coin standard, Cardano Native Tokens (Multi-Asset), ESDT (MultiversX/Elrond), NEP-17 (Neo), Waves Smart Assets, Avalanche X-Chain AVM Assets, KIP-7 (Klaytn), HRC-20 (Harmony).

M0 PROTOCOL, GOVERNANCE, AND ECOSYSTEM

Some embodiments may implement interoperable wrapped tokens with a base asset that uses the M0 protocol. In some embodiments, a core M0 protocol may function as a coordination layer among permissioned institutional participants for the issuance of a fungible digital token denoted as $M. The protocol may define standardized interfaces and verification procedures through which authorized entities may generate $M in accordance with predefined operational and compliance parameters.

In some embodiments, $M may be created upon the locking of eligible collateral within a secure offchain custody facility. The protocol may monitor or receive attestations regarding collateral status and may record corresponding on-chain representations of issued $M units. The system may enforce a uniform set of governance, risk management, and safety rules governing the issuance, redemption, and ongoing collateralization of $M. These rules may include procedures for collateral validation, issuance thresholds, withdrawal conditions, and periodic reconciliation between on-chain token supply and offchain collateral records.

In some embodiments, the M0 protocol may exclude certain periphery contracts and may operate as a coordination layer among permissioned entities for the generation of a fungible crypto asset referred to as $M. The M0 protocol may define the operational, financial, and verification procedures that govern the creation and ongoing management of $M, and may enforce such procedures through programmatic rules and consensus-based authorization mechanisms.

In some embodiments, $M may be a digital asset whose value is expected to correspond to an external collateral basket. This relationship may be maintained through the financial structure and incentive mechanisms applied to authorized generators of $M. Each instance of $M may be produced when eligible collateral, such as short-term United States Treasury Bills, is locked or otherwise committed to a secure custody facility operating in conjunction with legally recognized bankruptcy-remote entities. These entities may be configured to interface exclusively with the M0 protocol and to adhere to the procedural formalities of applicable legal frameworks. The interest or yield produced by the collateral may be collected or partially redirected by the protocol and redistributed among permissioned issuers and distributors as defined by protocol-level governance logic.

In some embodiments, $M may serve as a programmable and credibly neutral building block for representing value within digital systems. Each unit of $M may be self-custodial and fungible with all other units, and the protocol may not include any capability to discriminate among holders or to restrict transfers except as required by permissioning constraints. $M may be recorded and transferred using blockchain infrastructure, allowing it to be held securely at scale and transmitted globally in near real time without dependence on traditional financial intermediaries.

In some embodiments, $M may be described as a raw material for value representation rather than as a stablecoin in itself. The protocol may depend on permissioned issuers, referred to as Minters, who may be authorized to generate and distribute $M in compliance with applicable regulatory requirements. These Minters may elect to issue their own products based on $M, including stablecoin contracts or other financial instruments designed to meet specific jurisdictional, branding, or operational needs. In this configuration, $M may function as a composable monetary substrate from which higher-order financial products may be constructed.

In some embodiments, the M0 protocol may provide a standardized coordination infrastructure that may democratize access to the creation and management of digital representations of collateralized monetary instruments. The protocol may include on-chain smart contracts, offchain attestation mechanisms, and governance frameworks that together may ensure transparency, interoperability, and programmable control across issuers and collateral facilities. The system may thereby allow participants to generate tokenized representations of high-quality collateral without reliance on legacy banking systems or deposit tokenization frameworks.

In some embodiments, the M0 protocol may be viewed as an infrastructure layer designed to provide secure, programmable, and interoperable mechanisms for representing collateral-backed liquidity. It may be implemented as a software architecture that permits permissioned actors to interact through standardized interfaces to issue, redeem, and reconcile $M. The protocol may be expected to provide a foundation upon which builders, developers, and financial service providers may construct novel financial instruments, including programmable stablecoins and other synthetic monetary products.

In some embodiments, the M0 protocol may operate as a permissioned coordination framework governed through a Two Token Governor (TTG) mechanism. The TTG may define access rights, signature thresholds, and operational limits for authorized participants within the protocol. The permissioned actors may include Minters and Validators, which may be distinct governance-controlled protocol participants. Once approved through TTG authorization, these actors may be granted access to a defined set of smart contract functions that facilitate the issuance, maintenance, and destruction of the fungible token $M. $M may conform to the ERC-20 token standard and may exist in circulation only when fully backed by a value of Eligible Collateral that is equal to or greater than the outstanding token supply. Such Eligible Collateral may be required to be held within an Eligible Custody Solution operating offchain under verifiable attestation procedures. The protocol may thereby function as an enforcement layer that ensures adherence to defined rules governing token creation, collateral validation, and the imposition of fees or penalties when applicable.

In some embodiments, the generation of $M may be performed by Minters that maintain offchain holdings of Eligible Collateral. The offchain collateral position of each Minter may be represented onchain as an attested numerical value referred to as the onchain Collateral Value. Minters may update this value periodically through invocation of an Update Collateral method. The Update Collateral transaction may include input parameters such as the declared collateral amount, a list of signing Validators, timestamps associated with the Validator signatures, and corresponding cryptographic signature data. The smart contracts may apply the minimum timestamp among those submitted and validate the signatures against the minimum threshold defined by the TTG. The method may include a hash representing arbitrary offchain metadata and one or more Retrieval Identifiers that correspond to prior balance subtractions recorded under the Retrieving Free Collateral process. The Metadata Hash may allow retrieval of contextual information describing the collateral update, while the Retrieval Identifiers may allow reconciliation of previously reserved balances.

Signature verification may be performed either through use of an ecrecover function, which allows for recovery of validator signatures generated offchain, or through use of onchain contract-based signatures compliant with Ethereum Improvement Proposal 1271 (EIP-1271). Each verified signature may constitute an attestation to the accuracy of the collateral value associated with the Minter and to the conformity of such collateral with the eligibility requirements specified by the protocol.

FIG. 1 illustrates an example collateral update process 200. In some embodiments, a Minter may be required to update its onchain Collateral Value (step 210) within a predefined time window, referred to as the Update Collateral Interval 212, as defined under governance-controlled protocol parameters. Failure to update within this interval may cause the Minter's recorded Collateral Value to default to zero until a new validated update is provided. If valid Validator signatures are not supplied at the time of method invocation, the Update Collateral transaction may revert. Each successful invocation of the Update Collateral method may result in the accrual of a Minter Rate fee applied to the Minter's balance of owed $M. If rule violations are detected at the time of update (such as under-collateralization or use of ineligible assets) a Penalty Rate may also be applied to the affected balance.

An example workflow may include a scenario in which Eligible Collateral for $M consists of short-term United States Treasury Bills with maturities ranging from zero to ninety days. A Minter holding $10,000,000 in Treasury Bills within an Eligible Custody Solution may call the Update Collateral function and provide the value of 10,000,000 along with a valid Validator signature. The onchain Collateral Value for that Minter may then be recorded as 10,000,000. Subsequently, if $1,000,000 of the Treasury Bills mature and convert into non-eligible bank deposits, the Minter may submit a new Update Collateral transaction specifying a value of 9,000,000, accompanied by an updated Validator signature. Upon validation, the onchain record may be revised to reflect the reduced Eligible Collateral balance of 9,000,000.

In some embodiments, after a Minter has successfully updated its onchain Collateral Value, the Minter may become eligible to generate new units of $M. The generation process may be initiated through invocation of a Propose Mint (step 220) method of a smart contract. The Minter may provide, as input parameters, the amount of $M to be generated and the recipient address to which the resulting tokens should be issued. Upon execution, the Propose Mint method may first call a Get Present Amount function to determine the current balance of Owed $M associated with the Minter. The smart contract may then verify that the onchain Collateral Value, when multiplied by the Mint Ratio defined in the governance-controlled protocol parameters, remains greater than or equal to the total Owed $M for that Minter, inclusive of the new amount being proposed for generation and any amounts pending retrieval under the Retrieving Free Collateral process. If these conditions are met, the system may record and return a unique Mint Identifier (Mint ID) corresponding to the proposed minting action. In some embodiments, a Minter may maintain only a single active Mint ID at any given time.

Following proposal creation, the protocol may enforce a predefined Mint Delay interval 222, specified in the governance-controlled parameters. During this interval, Validators may review the collateral and proposed issuance data to determine whether intervention is necessary. If the Mint ID is not canceled by a Validator during the Mint Delay period 222, the Minter may execute the minting operation by calling the Mint method and supplying the Mint ID as an argument. The Mint Delay 222 may be intended to prevent atomic execution of collateral updates and mint operations within the same transaction cycle, thereby ensuring that Validators have sufficient time to verify that the proposed issuance remains consistent with current collateral attestations. The Minter may be required to call the Mint method 230 before expiration of the Propose Mint Time-To-Live interval 232; otherwise, the Mint ID may become invalid (step 240) and require reinitialization.

In some embodiments, Minters may reduce or eliminate outstanding Owed $M balances by invoking a Burn method of a smart contract. The Burn transaction may specify the Minter's address and the quantity of $M to be destroyed. The method may be callable by the Minter or by any third-party address that elects to repay the Minter's outstanding balance of $M on their behalf. Upon execution, the Burn operation may decrement the recorded Owed $M amount for the specified Minter and may permanently remove the corresponding $M tokens from circulation.

In some embodiments, the M0 protocol may assess two distinct categories of fees on Minters to regulate issuance behavior and maintain collateralization discipline. Both fees may be defined as governance-controlled parameters within the Two Token Governor (TTG) framework and may be applied automatically through onchain contract logic.

The first fee may be referred to as the Minter Rate, which may accrue continuously on the Minter's recorded balance of Owed $M. The Minter Rate may be compounded on a continuous basis through a global index that updates proportionally to elapsed time or block intervals. The accrued amounts may be distributed among designated beneficiaries, which may include an Earn Mechanism and holders of the ZERO governance token. The Minter Rate may be calculated implicitly within protocol operations and may not be callable independently by participants. For example, a Get Present Amount method may incorporate the Minter Rate calculation automatically whenever invoked by other Minter-facing methods, including but not limited to the Burn method.

The second fee may be referred to as the Penalty Rate, which may be assessed discretely on any portion of a Minter's balance that violates one or more protocol-defined invariants. Both the Minter Rate and Penalty Rate may share the same beneficiaries. An invariant of the M0 protocol (in some embodiments) may specify that a Minter's total Owed $M balance must not exceed the Minter's onchain Collateral Value, excluding any open Retrieval Identifiers, multiplied by the Mint Ratio. Any balance in excess of this calculated limit may incur the Penalty Rate. Additionally, if a Minter fails to invoke the Update Collateral method within the required Update Collateral Interval, the protocol may impose the Penalty Rate across the entire Owed $M balance for each interval missed. In such cases, the system may interpret the Minter's collateral value as zero for enforcement purposes until a valid update is provided.

Unlike the continuously compounding Minter Rate in some embodiments, the Penalty Rate may be imposed as a one-time percentage charge on the delinquent balance at the time of evaluation. The charged amount may then be added to the Minter's Owed $M balance. The Penalty Rate may be implemented within an Impose Penalty method of a smart contract (and in some cases, each of these methods may be methods of the same smart contract), which may be invoked exclusively as part of other core functions, including Update Collateral, Burn, and Deactivate Minter. When called in conjunction with Update Collateral, the Impose Penalty method may assess both missed Update Collateral Intervals and excessive Owed $M relative to the discounted Collateral Value. When called alongside Burn, the method may check only for missed Update Collateral Intervals to prevent redundant penalty assessments. The method may further track invocation timestamps to ensure that the same delinquent period is not penalized multiple times within a single interval.

An example workflow may proceed as follows. A Minter calls the Update Collateral method, which automatically invokes both Get Present Amount and Impose Penalty. Before the call, the Minter's recorded balance of Owed $M may be 8,000,000. The Get Present Amount method may first update the global index and apply the continuously compounding Minter Rate, increasing the balance to 8,000,010. If the Minter's onchain Collateral Value is 8,000,000 and the Mint Ratio is 90%, the maximum permissible Owed $M should be 7,200,000. The excess portion, equal to 800,010, may therefore be subject to the Penalty Rate. Assuming a Penalty Rate of 0.01%, the new Owed $M balance may be computed as 8,000,010 plus 800,010 multiplied by 1.0001, resulting in an updated balance of approximately 8,800,100.001 $M.

Figure 2:
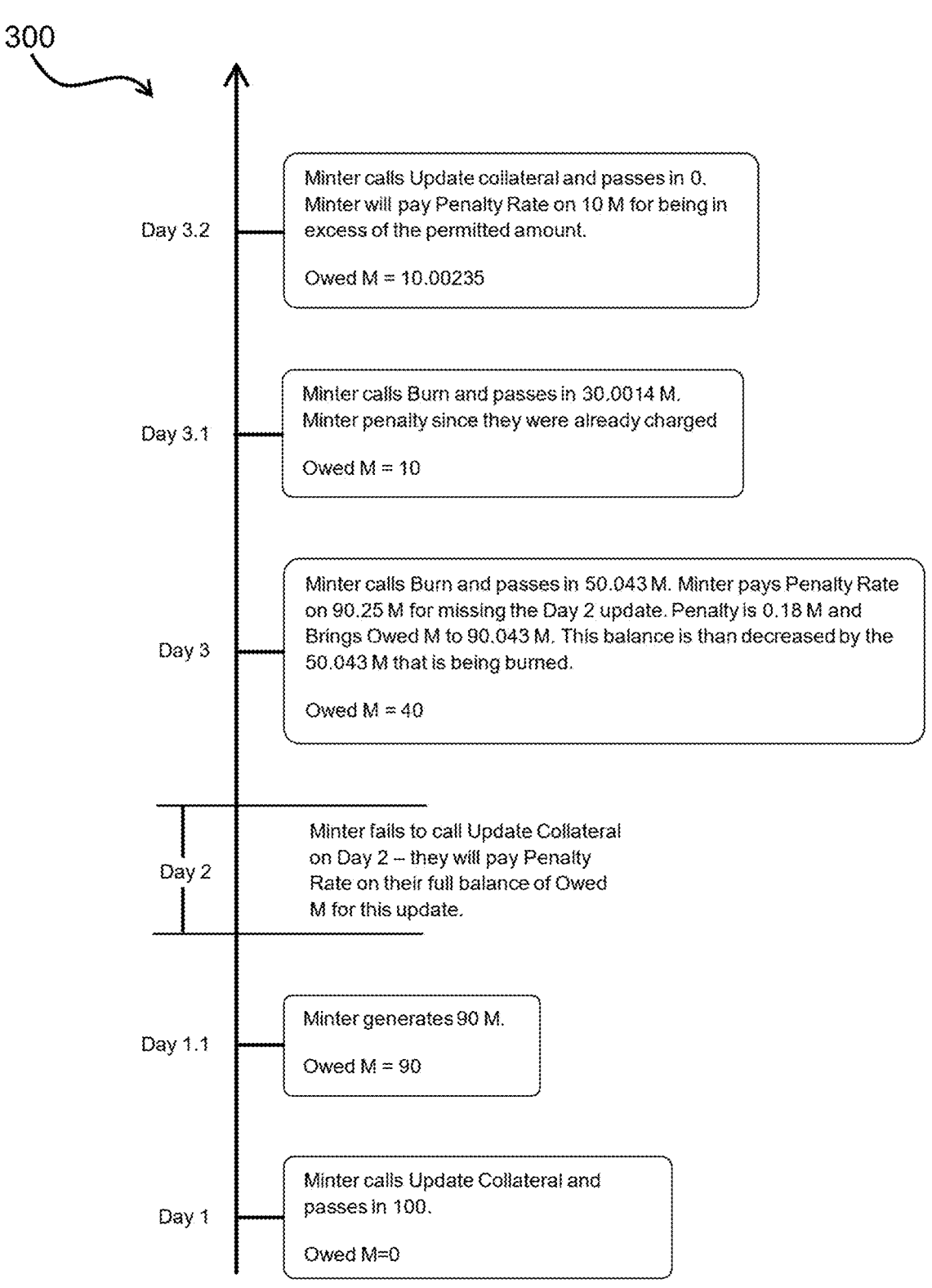
FIG. 2 illustrates an example where a Minter incurs penalty charges in accordance with some embodiments herein.

FIG. 2 illustrates an example 300 where a Minter incurs penalty charges. In some embodiments, protocol fee assessment may proceed as illustrated by the following example workflow, with certain balances rounded for clarity. Assume that the Mint-to-Collateral Ratio is set to ninety percent, the Update Collateral Interval is twenty-four hours, the Minter Rate corresponds to five percent annual percentage yield (approximately 0.00058 percent per hour), and the Penalty Rate is set to 0.02 percent.

a. On Day 1, a Minter invokes the Update Collateral method and submits a collateral value of 100. At this time, the Minter's Owed $M balance is zero. Later that same day (Day 1.1), the Minter generates 90 units of $M through a valid mint operation.

b. On Day 2, the Minter fails to call Update Collateral within the required interval.

c. On Day 3, the Minter invokes the Burn method and specifies a repayment of 50.043 $M. Because fewer than 48 hours have elapsed since the mint operation on Day 1, the system first calls Get Present Amount to apply the continuously compounding Minter Rate to the outstanding Owed $M balance. The balance of 90 $M increases to approximately 90.025 ($90.025) after the compounding adjustment calculated as 90×(1+ (0.0000058× 48)).

d. Next, the Impose Penalty method is called. Because the Minter missed one Update Collateral Interval (Day 2), a single Penalty Rate application is triggered. The balance is therefore increased to 90.025×(1+ (0.0002× 1))=90.043 $M. The Burn transaction then subtracts the repayment amount (50.043 $M) from this adjusted balance, reducing the Owed $M to 40.000. The Burn operation checks only for missed Update Collateral Intervals and does not assess penalties based on current onchain Collateral Value, ensuring that no duplicate penalties are applied.

e. Later on Day 3, the Minter calls Burn again, this time specifying repayment of 30.0014 $M. Assume that six hours have elapsed since the previous Burn. The Get Present Amount function is executed first, applying the Minter Rate over the six-hour period, increasing the Owed $M balance from 40 to approximately 40.0014. The Impose Penalty method then runs but does not impose any further charges because the Minter has already been penalized for the previously missed Update Collateral Interval. The specified repayment of 30.0014 $M is deducted from the updated balance, reducing the Owed $M to 10.000.

f. Finally, also on Day 3, the Minter calls Update Collateral and reports a collateral value of zero, potentially reflecting that previously eligible assets have matured into ineligible holdings such as bank deposits. After another six hours have elapsed, Get Present Amount is executed again, applying the Minter Rate to the remaining Owed $M. The balance increases slightly to approximately 10×(1+ (0.0000058× 6))=10.00035 $M. The Impose Penalty method is then called. No missed-interval penalties are assessed since these were already applied during prior Burn operations. However, a check for errant balance relative to the permissible collateralized limit is performed. Because the Minter's onchain Collateral Value is now zero, the entire Owed $M amount is treated as exceeding the allowable threshold. A Penalty Rate of 0.02% is therefore applied, increasing the balance to 10.00035×1.0002=10.00235 $M.

In some embodiments, the M0 protocol may include two control methods designed to halt unauthorized or potentially erroneous issuance activity or to temporarily restrict operations of a Minter under exceptional circumstances. These methods, referred to as Cancel and Freeze, may be callable exclusively by Validators, and may serve as intermediate governance enforcement mechanisms prior to permanent deactivation or removal of a Minter.

The Cancel method may be used to stop an in-progress generation of $M associated with an existing Mint Identifier (Mint ID). Any Validator may invoke the Cancel method by supplying the Mint ID as an argument. Upon execution, the specified Mint ID may be invalidated and the corresponding mint proposal terminated. The Cancel method may be callable at any time prior to execution of the Mint method for that Mint ID. Minters themselves may not have permission to directly invoke Cancel, since submission of a new Propose Mint transaction automatically cancels any previously outstanding proposals attributed to that Minter.

The Freeze method may be used to restrict a Minter's minting-related operations for a defined period of time. A Validator may invoke Freeze by passing the Minter's address as an argument. When Freeze is called, the affected Minter may be temporarily prevented from executing both the Propose Mint and Mint functions for the duration of a governance-defined interval referred to as the Minter Freeze Time. A Validator may invoke Freeze multiple times on the same Minter. Each subsequent invocation may restart the Minter Freeze Time countdown, effectively extending the freeze period.

An example workflow may proceed as follows. A Validator calls Freeze on a Minter when the Minter Freeze Time parameter is set to six hours. After five hours have elapsed, the Validator calls Freeze again on the same Minter. As a result, the freeze duration resets and the Minter remains restricted for an additional six hours. The Minter is therefore frozen for a total of approximately eleven hours unless another Freeze invocation occurs before expiration of the extended window.

In some embodiments, these control mechanisms may operate as part of a broader escalation framework. Validators may first exercise localized control through Cancel or Freeze operations. If additional intervention is required, the Two Token Governor (TTG) may initiate higher-level enforcement actions, including permanent removal or deactivation of a Minter through a TTG proposal process.

In some embodiments, the M0 protocol may include a defined process that allows Minters to retrieve collateral from custody when their verified offchain collateral holdings exceed the value required to back their outstanding balance of Owed $M. This operation, referred to as Retrieving Free Collateral, may be initiated when a Minter holds excess value (e.g., including Eligible Collateral or other assets maintained within an Eligible Custody Solution) relative to the total onchain liability associated with Owed $M.

A Minter may initiate the retrieval process by invoking a Propose Retrieval method of a smart contract and specifying the quantity of value to be withdrawn from the custody arrangement. Upon execution, the Propose Retrieval method may first call Get Present Amount to update the Minter's Owed $M balance with any continuously compounding Minter Rate adjustments. The system may then perform a validation step to confirm that, after deducting both the proposed retrieval amount and any amounts associated with open Retrieval Identifiers (Retrieval IDs), the remaining onchain Collateral Value continues to be sufficient to support the Minter's Owed $M at or above the required collateralization threshold.

If these conditions are satisfied, the proposed retrieval may be recorded onchain, and the corresponding balance may be sidelined for future collateral calculations where applicable. The contract may then generate and return a Retrieval ID that uniquely identifies the pending withdrawal. Unlike the minting process, which may restrict each Minter to a single active Mint Identifier at any given time, there may be no fixed limit on the number of concurrent Retrieval IDs a Minter can maintain. The subtraction associated with each active Retrieval ID may persist as a deduction from the Minter's onchain Collateral Value until the Retrieval ID is formally closed.

To close a Retrieval ID and restore the deducted value to the onchain Collateral Value computation, the Minter may include the relevant Retrieval ID as a parameter in a subsequent Update Collateral transaction. The associated Validator, by (e.g., cryptographically, with a private key corresponding to a public key) signing this transaction, may attest that the referenced Retrieval ID has been fully processed offchain or has been definitively canceled and that the updated onchain Collateral Value accurately reflects the current eligible collateral held in the custody solution.

In one example illustration, on Day 1, a Minter calls Update Collateral and passes in a value of 100. On Day 2, the Minter calls Update Collateral and passes in 100 again. Later on Day 2, the Minter call Propose Retrieval and passes in 50. Collateral Value is automatically reduced by all outstanding Retrieval IDs. Thus, at this point, the Collateral Value is 50 and Retrieval ID #1 is also 50. On Day 3, the Minter calls Update Collateral and again passes in 100. The Collateral Value and Retrieval ID #1 each remain at 50. On Day 4, the Minter calls Update Collateral and passes in 50; the Minter also passes in Retrieval ID #1 and specifies that it is closed. Collateral Value is thus 50.

In some embodiments, the M0 protocol may incorporate an Earn Mechanism that allows designated participants, referred to as Approved Earners, to accrue yield in the form of continuously compounding interest on their $M balances. The Earn Mechanism may be governed and permissioned through the Two Token Governor (TTG) framework, which may define both the set of eligible Earners and the parameters governing yield accrual.

The Earn Mechanism may operate according to a governance-controlled parameter known as the Earner Rate. This rate may be supplied as an explicit input value by the TTG but may be dynamically bounded within the smart contract logic. Specifically, the Earner Rate may be constrained to the lower of (a) the TTG-specified input value or (b) the maximum rate that can be sustained without causing aggregate $M disbursements to exceed the inflows generated by the Minter Rate. To formalize this relationship, the protocol may define a utilization value representing the proportion of $M that is "active" within the system-namely, the total amount of Owed $M currently subject to the Minter Rate-divided by the total amount of $M participating in the Earn Mechanism.

If a Minter is depermissioned or otherwise disabled by the TTG, the corresponding amount of Owed $M may be deducted from the active pool, thereby reducing utilization. The effective Earner Rate may then be calculated as the lesser of the TTG-specified value or the Minter Rate multiplied by utilization. This calculation ensures that the rate applied to Earners remains sustainable and that no greater amount of $M is distributed to Earners than is being collected from Minters through accrued Minter Rate obligations.

Once permissioned by the TTG, an Approved Earner may activate yield accrual by invoking a Start Earning method. Upon invocation, the protocol may verify that the calling address appears on the Approved Earners list. If validation succeeds, the account balance associated with that address may begin accruing the Earner Rate on a continuously compounding basis. If the address is later removed from the Approved Earners list through governance action, a Stop Earning method may be invoked with the affected address as an argument. Execution of this method may halt further accrual of the Earner Rate on the corresponding balance from that point forward.

In some embodiments, the M0 protocol may include a defined governance-controlled process for removing permissioned actors from participation in the system. Removal actions may be executed through a proposal and approval process conducted within the Two Token Governor (TTG) mechanism. The TTG may authorize removal of an actor from a specific governance-controlled list, such as the Minter list or the Validator list. Once an actor is removed from the relevant list, the protocol may automatically revoke that actor's ability to invoke permissioned methods within the smart contracts, thereby preventing further interaction with core protocol functions.

In the case of a Minter removal, once the Minter is deleted from the active Minter list, the accrual of Minter Rate fees on that Minter's Owed $M balance may cease. The remaining Owed $M balance, along with any accrued penalties from missed Update Collateral Intervals, may be retained as a static obligation recorded onchain. This residual balance may remain available for repayment either by the former Minter or by any other actor seeking to facilitate retrieval of the Minter's associated offchain collateral. The protocol may implement this rule to ensure that funds are not inadvertently routed to the Earn Mechanism or distributed to ZERO token holders in connection with Minters that are no longer active within the permissioned set.

The Burn method may remain callable by any address, regardless of the permission status of the Minter whose balance is being reduced. This design may allow offchain custodians or related service providers to participate in the controlled wind-down of the Minter's operations by burning Owed $M and allowing retrieval of value from the corresponding Eligible Custody Solution.

After a Minter has been removed from the Minter list, any actor within the protocol may call the Deactivate Minter method. Invocation of this method may permanently halt further accrual of Minter Rate and suspend any additional Penalty Rate charges. This may ensure that no new economic activity or fee accumulation occurs for depermissioned entities, while preserving historical state and balances for reconciliation and settlement purposes.

In some embodiments, a sequence of interactions may occur among permissioned protocol actors within the M0 system to facilitate generation, management, and redemption of $M. The following example illustrates a representative workflow describing how Minters, Validators, and Earners may engage with the protocol and how $M may flow through the system.

a. In a first step, addresses corresponding to prospective Minters, Validators, and Earners may be proposed to the Two Token Governor (TTG) for review. The TTG may evaluate each proposal according to governance-defined criteria and may either approve or reject the submitted addresses.

b. In a subsequent step, addresses approved by the TTG as Minters may be added to the onchain Minter List. Once included, each Minter may be required to perform its initial update of the onchain Collateral Value.

c. Each active Minter may maintain at least one offchain contractual relationship with one or more Validators. These Validators may have full audit access to statements and records maintained by the Eligible Custody Solution, where the Minter's collateral assets are held. The Validator may verify that the collateral held in custody is sufficient and that the proposed onchain Collateral Value does not exceed the verified dollar-denominated value of the Eligible Collateral. Upon confirmation, the Validator may issue a cryptographically signed attestation accompanied by a timestamp indicating when the verification was performed.

d. After obtaining one or more valid Validator signatures and corresponding timestamps, the Minter may call the Update Collateral method to publish the verified Collateral Value onchain. Once a positive onchain Collateral Value has been recorded, the Minter may proceed to generate $M by invoking the Propose Mint method and specifying the desired minting amount. The protocol may verify that the requested amount of $M is less than or equal to the product of the Minter's onchain Collateral Value (excluding any amounts associated with open Retrieval Identifiers) and the Mint Ratio parameter. If the check passes, the method may output a unique Mint Identifier (Mint ID). The Mint ID may initially remain inactive for a governance-defined Mint Delay period and subsequently become actionable for a defined Propose Mint Time-To-Live interval.

e. During the Mint Delay period, Validators may review the proposed mint transaction. If anomalies are detected, a Validator may call the Cancel or Freeze methods to halt execution. If no such action is taken within the Mint Delay, the Minter may execute the Mint method using the Mint ID to complete token generation.

f. Once the $M tokens are minted, the Minter's outstanding balance of Owed $M begins accruing the continuously compounding Minter Rate. The Minter remains responsible for maintaining sufficient onchain Collateral Value. If collateral updates are missed or if the Collateral Value falls below the required level-such as when collateral assets mature and transition into ineligible forms like bank deposits—the system may impose Penalty Rate charges.

g. If the Minter later elects to repay part of the Owed $M and retrieve a portion of the underlying collateral, they may first call the Burn method, specifying the amount of $M to be destroyed. This operation may reduce the Minter's Owed $M balance by the corresponding amount. If, after repayment, the Minter's Collateral Value supports a positive difference between the permissible and outstanding $M, the Minter may call the Propose Retrieval method to initiate collateral withdrawal. The smart contract method may confirm that, after the proposed retrieval, the Minter's Collateral Value remains compliant with collateralization requirements. If validated, the smart contract may issue a Retrieval Identifier (Retrieval ID) and adjust the onchain Collateral Value downward by the specified amount.

h. The Minter may then present the Retrieval ID to the operator of the Eligible Custody Solution to redeem the corresponding portion of collateral offchain. Once the redemption has been processed and settled, the Minter may call Update Collateral again, supplying the updated Collateral Value and the relevant Retrieval ID to remove the associated deduction from the onchain Collateral Value. As with prior updates, the transaction may require new Validator signature data and an associated timestamp to confirm that the onchain representation accurately reflects the Minter's verified collateral position.

In some embodiments, the M0 protocol may maintain a set of governance-controlled (e.g., onchain) lists that define the categories of permissioned actors authorized to perform specific protocol operations. These lists may be administered and updated through the Two Token Governor (TTG) mechanism, which may be responsible for granting, modifying, or revoking participation rights among actors.

The first category of actors may include Minters. A list of Minter addresses, referred to as the Minter List, may be maintained by the TTG. Addresses appearing on the Minter List may be authorized to access the protocol's minting functionality. These addresses may be permitted to invoke methods related to updating onchain Collateral Value, proposing new mint operations through Propose Mint, executing minting through Mint, repaying outstanding balances through Burn, and initiating collateral withdrawals through the Propose Retrieval process. Actors not described as permitted to do something may be prohibited from doing those things.

The second category of actors may include Validators. A corresponding Validator List may also be maintained by the TTG, consisting of Validator addresses authorized to serve as an attestation and enforcement layer for the protocol. Validators may be required to provide cryptographic signatures supporting the Update Collateral method, thereby verifying the accuracy of collateral attestations submitted by Minters. Validators may also have the authority to invoke the Cancel method on any active Mint Identifier (Mint ID) and the Freeze method on any Minter address, thereby halting or suspending mint-related activities when irregularities or risks are detected.

The third category of actors may include Earners. A governance-controlled Earner List may define the set of addresses eligible to participate in the Earn Mechanism. Addresses appearing on the Earner List may have the ability to control whether they are actively accruing the Earner Rate on their held balances of $M. Removal from the Earner List may halt further yield accrual for the affected address until reinstatement through TTG approval.

In some embodiments, the M0 protocol may include a collection of governance-controlled parameters that define the operational, financial, and timing characteristics of protocol behavior. These parameters may be established and modified through the Two Token Governor (TTG) mechanism by means of a governance process, such as a Standard Proposal. Each parameter may influence distinct aspects of collateralization, fee accrual, yield distribution, and transaction timing.

The Minter Rate may represent the continuously compounding annualized percentage applied to a Minter's outstanding balance of Owed $M. This parameter may be adjustable through a Standard Proposal. In some embodiments, the Minter Rate may be configured to remain below the average yield produced by the Eligible Collateral held by Minters. The resulting spread, when adjusted for the Mint Ratio, may represent the expected profit margin available to Minters.

The Penalty Rate may define a fixed percentage fee imposed on any portion of Owed $M that exceeds the amount a Minter is permitted to generate according to collateralization limits. The Penalty Rate may be assessed whenever the Impose Penalty function is executed, which may occur within the Update Collateral or Burn methods. This parameter may also be adjustable through a Standard Proposal. Unlike the Minter Rate, the Penalty Rate may not be an annualized rate but a discrete percentage applied to detected imbalances. The Penalty Rate may be calibrated to discourage noncompliance while avoiding excessive punitive effects on Minters affected by operational or timing discrepancies.

An example workflow may proceed as follows: A Minter holds 1,000,000 Owed $M but fails to call Update Collateral within the required Update Collateral Interval, resulting in an assumed onchain Collateral Value of zero. When the Minter next invokes Update Collateral or Burn, the Impose Penalty method is called and applies the Penalty Rate to the excess balance, calculated as 1,000,000 minus (0× Mint Ratio). If the Penalty Rate equals one percent, the Minter incurs 10,000 $M in additional charges for the missed interval.

The Earner Rate may represent the annualized percentage yield applied to balances participating in the Earn Mechanism. This parameter may also be adjustable through a Standard Proposal. The Earner Rate may automatically adjust downward in cases where total $M paid to Earners would otherwise exceed the total $M generated by the Minter Rate. Any residual $M collected from Minters but not distributed to Earners may be allocated to holders of the ZERO governance token. The Earner Rate may be expected to align with market demand among institutional holders of $M, while remaining capped such that aggregate payouts do not exceed aggregate inflows from Minter Rate accrual.

The Mint Ratio may define the proportion of a Minter's onchain Collateral Value that can be represented as generated $M. This parameter may determine both the leverage available to Minters and the degree of over-collateralization required for $M. It may be alterable via Standard Proposal and may be configured to balance attractive Minter economics with maintenance of systemic stability.

The Mint Delay may define the time interval between invocation of Propose Mint and eligibility to call Mint. This delay may serve as a verification buffer that allows Validators and other monitoring participants to inspect and, if necessary, intervene by invoking Cancel or Freeze. The Mint Delay may be adjustable via Standard Proposal and may be chosen to ensure adequate auditability without unduly hindering minting efficiency.

The Propose Mint Time-To-Live parameter may define the permissible time window following expiration of the Mint Delay during which a proposed mint can be executed. This setting may prevent Minters from executing delayed mint operations long after validation conditions have changed. It may be alterable via Standard Proposal and may be configured to allow sufficient execution flexibility while preserving the integrity of prior Validator reviews.

The Update Collateral Interval may represent the maximum allowable time between successive calls to Update Collateral by a Minter. Failure to invoke Update Collateral within this interval may cause the onchain Collateral Value to be treated as zero and may trigger Penalty Rate assessment at the next update. This parameter may be alterable via Standard Proposal and may be selected to provide Validators adequate time for offchain verification while preserving ongoing accuracy of collateral attestations.

The Update Collateral Threshold may specify the minimum number of Validator signatures required to successfully execute an Update Collateral transaction. If a Minter cannot provide signatures meeting this threshold, the update may revert. This threshold may be alterable via Standard Proposal and may be determined to balance security with operational reliability.

The Minter Freeze Time may define the duration during which a Minter is restricted from calling Propose Mint or Mint after a Freeze method has been invoked on their address by a Validator. This duration may be alterable through Standard Proposal and may be configured to provide sufficient time for the Minter to resolve detected irregularities while minimizing unnecessary disruption to legitimate operations.

In some embodiments, as noted, the M0 protocol may employ an onchain governance architecture referred to as the Two Token Governor (TTG) mechanism. The TTG may manage all governance-controlled inputs and parameters within the protocol through a smart-contract structured voting and proposal process. Participation in governance may be enforced through incentive and penalty logic of smart contracts, such that holders of voting tokens are penalized for failing to participate in active votes.

The TTG may rely on two governance utility tokens, referred to as POWER and ZERO. The POWER token may serve as the primary management token of the governance system and may be required for participation in voting on active proposals. POWER holders may earn ZERO tokens as compensation for their direct involvement in governance activity. When a POWER holder delegates their voting balance to another address that does not itself hold POWER tokens, the delegate address may receive the ZERO rewards associated with that participation.

The ZERO token may represent a comparatively passive governance role. ZERO holders may participate primarily in higher-order or infrequent governance decisions, such as those involving structural or systemic changes to the protocol. At any time, ZERO holders may exercise the Reset function, as described in the ZERO Threshold Proposals process, to reassign the full supply of POWER tokens to themselves.

The TTG mechanism may be designed to maintain credible neutrality within governance operations. In some embodiments, the governance system may aim to prevent two results in some implementations: (a) capture, in which a subset of actors gains control of decision-making power to advance interests contrary to equitable protocol function, and (b) fraud, in which malicious actors manipulate governance processes for personal benefit, rendering the system nonfunctional for legitimate users.

The two-token structure may serve to balance these opposing risks. POWER holders may be treated as a managerial class with authority to propose and vote on operational decisions and to earn compensation in the form of ZERO for sustained, compliant participation. ZERO holders, in turn, may act as an oversight class, with the ability to judge the continued benevolence and neutrality of the POWER holder group. If at any point the composition or actions of POWER holders begin to indicate governance capture or operational distortion, ZERO holders may invoke the Reset process to revoke POWER holders' management rights and redistribute governance control. This continuous balancing dynamic may increase the likelihood that governance remains neutral, self-correcting, and aligned with the broader protocol objectives.

In some embodiments, the M0 protocol may include a series of governance-controlled parameters and actor designations that are managed through the Two Token Governor (TTG) mechanism. These parameters and actor lists may be modifiable through onchain governance proposals and may collectively determine the operational, economic, and procedural behavior of the protocol.

Governance-controlled TTG parameters may include values such as the Proposal Fee, which may define the amount of value or tokens required to submit a governance proposal, the POWER Threshold, which may specify the minimum number of POWER tokens required to initiate or participate in proposal voting, and the ZERO Threshold, which may determine the quorum or approval requirement for proposals that involve ZERO holders or protocol-wide changes. The TTG may also include a CASH Toggle parameter, which may control whether specific protocol operations, such as collateral reconciliations or fee settlements, are conducted through onchain logic or coordinated offchain processes.

Governance-controlled protocol actors may include several distinct categories of permissioned participants. One such category may be a list of approved Minters, which may represent addresses authorized to generate, burn, and manage $M in accordance with collateralization requirements. Another category may be a list of approved Validators, representing addresses permitted to provide collateral attestations and to invoke enforcement methods such as Cancel or Freeze in the event of irregularities. A further category may include a list of approved Earners, representing addresses eligible to participate in the Earn Mechanism and to accrue yield according to the Earner Rate.

Governance-controlled protocol parameters may include variables that regulate key aspects of protocol function. These may include the Minter Rate, which may define the continuously compounding percentage fee applied to Owed $M; the Penalty Rate, which may establish the discrete charge applied to undercollateralized or noncompliant Minter balances; and the Earner Rate, which may specify the continuously compounding yield allocated to participants in the Earn Mechanism. Additional parameters may include the Mint Ratio, which may define the proportion of a Minter's onchain Collateral Value that can be represented as $M; the Mint Delay, which may set the required waiting period between a Propose Mint transaction and the eligible time for execution; and the Propose Mint Time-To-Live, which may determine how long a proposed mint remains valid following the Mint Delay. Further parameters may include the Update Collateral Interval, defining the maximum allowable time between successive collateral attestations by a Minter; the Number of Signatures, which may define the minimum number of Validator signatures required for a valid Update Collateral call; and the Minter Freeze Time, which may define the duration for which a Minter remains unable to mint after a Validator has invoked a Freeze on that address.

In some embodiments, the operational behavior of the M0 protocol may be governed through the TTG mechanism. Proposals submitted to the TTG may seek to amend existing lists of permissioned participants or to adjust numerical parameters that influence the operation of the protocol. While new lists and variables may be added over time through governance action, the core protocol implementation may remain immutable, ensuring that such additions do not alter or disrupt foundational smart contract logic. The implementation that governs the M0 protocol may be deployed (e.g., exclusively) on the Ethereum™ Mainnet, where all governance transactions and proposal executions occur.

Figure 3:
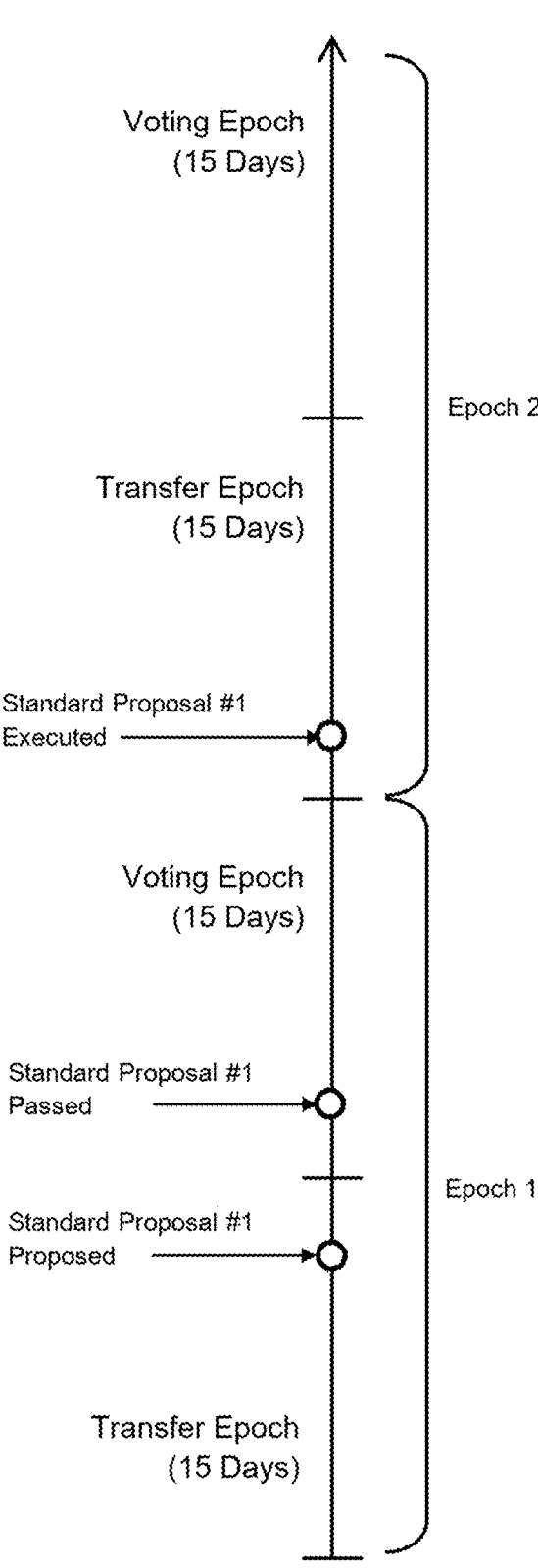
FIG. 3 illustrates an example where governance is organized into conceptual thirty-day epochs in accordance with some embodiments herein.

In some embodiments, the TTG mechanism may operate according to a structured cycle of governance epochs. As illustrated in FIG. 3, governance may be organized into conceptual thirty-day epochs, during which proposals are considered, voted upon, and executed. For operational purposes, each thirty-day epoch may be divided into two fifteen-day subperiods. The first subperiod, referred to as the Transfer Epoch, may serve as a non-voting period in which token transfers and delegation adjustments are permitted. The second subperiod, referred to as the Voting Epoch, may serve as the active voting window during which proposals are voted on, and during which transfers and delegation of voting power are disabled. These transfer and voting restrictions may apply solely to POWER tokens, while ZERO tokens may remain unrestricted throughout all periods.

The division of the thirty-day governance cycle into two sub-epochs may ensure consistent accounting for token balances, delegation, and inflation during governance operations. Proposals may be collected during one fifteen-day epoch and then voted upon in the subsequent fifteen-day Voting Epoch. Proposals approved during voting may then be scheduled for execution during the following fifteen-day Transfer Epoch. Proposals that are passed but remain unexecuted beyond their designated execution window may expire automatically. As a result, a proposal's lifecycle may range from as short as approximately fifteen days plus two block intervals to as long as forty-five days, depending on when it is introduced relative to the epoch boundaries.

During each fifteen-day Transfer Epoch, POWER token holders may transfer balances, reassign delegations, and participate in governance-related token auctions. This cyclical structure may allow the TTG to maintain predictable governance cadence and ensure consistent synchronization between token state, proposal management, and execution timing.

In some embodiments, the Two Token Governor (TTG) mechanism may manage protocol modifications through an onchain proposal and voting system. Proposals submitted under this framework may take one of three defined types: Standard Proposals, POWER Threshold Proposals, and ZERO Threshold Proposals. Each proposal type may correspond to a distinct voting process and may require a specific approval condition in order to be executed.

The term threshold in this context refers to a minimum percentage of affirmative ("yes") votes that must be reached for a proposal to pass. (Elsewhere, the term may be used differently.) Proposals that include such a threshold requirement may not explicitly fail but may remain pending until the requisite number of affirmative votes is achieved or until the proposal expires according to the epoch timing rules. For example, if a proposal specifies a ten percent yes threshold, it may be considered passed once at least ten percent of the relevant voting token supply has voted in favor. If this participation level is never reached, the proposal may simply expire without enactment.

In some embodiments, Standard Proposals may represent the most common form of governance proposal within the TTG system. Standard Proposals may be open exclusively to POWER token holders and may require a simple majority of participating tokens to pass. These proposals may not require a defined threshold percentage of yes votes relative to total supply; instead, passage may depend solely on the balance of yes versus no votes among participants. For example, if one hundred POWER tokens participate in voting, and fifty-one vote yes while forty-nine vote no, the proposal may pass. Conversely, if votes are evenly split at fifty to fifty, the proposal may fail because the number of affirmative votes does not exceed the number of negative votes.

Standard Proposals may also serve as the only class of proposal for which POWER holder participation is mandatory. Failure by a POWER holder to participate in voting may result in dilution of that holder's proportional voting power within the system and forfeiture of any ZERO token rewards that would otherwise accrue for governance participation. Upon successful passage of a Standard Proposal, the Proposal Fee originally submitted with the proposal may become eligible for return to the proposer.

As an illustrative example, during a Voting Epoch, a proposal may be submitted to modify the Minter Rate parameter. If ten percent of the total POWER token supply participates in the vote and sixty percent of those participating tokens vote yes, the proposal may be deemed approved because the number of affirmative votes exceeds the number of negative votes. The total proportion of participating tokens relative to total supply would only affect proposals that require a defined POWER Threshold rather than a simple majority.

In some embodiments, the M0 protocol may include a class of governance actions referred to as POWER Threshold Proposals, which may require attainment of a defined voting threshold for immediate execution. These proposals may be used to enact protocol changes that demand expedited consideration, such as those addressing urgent or exceptional governance circumstances.

A POWER Threshold Proposal may be used to propose any modification that could otherwise be introduced as a Standard Proposal; however, unlike Standard Proposals, a POWER Threshold Proposal may require explicit attainment of the POWER Threshold before execution and may become immediately votable and executable upon submission. This design may allow governance participants to act without waiting for the standard epoch cycle typically required for other proposal types.

If the specified POWER Threshold is not achieved before the expiration of the proposal, the proposal may become invalid and ineligible for execution. POWER Threshold Proposals may remain active until the end of the subsequent governance epoch, after which they automatically expire if not passed.

An example workflow may proceed as follows. During a Transfer Epoch, a POWER Threshold Proposal may be submitted to modify the Minter Rate parameter. Because this proposal type requires explicit attainment of the POWER Threshold, the defined threshold may be set to seventy-five percent of the total POWER supply. The proposal may become immediately open for voting, and if one hundred percent of the POWER token supply participates with eighty percent voting affirmatively, the proposal may be considered passed. Upon surpassing the seventy-five percent affirmative voting threshold, the proposal may become instantly executable. Although the proposal could continue to accumulate additional affirmative votes, execution would typically occur immediately or shortly after the threshold condition is satisfied.

In some embodiments, the M0 protocol may include a governance proposal type referred to as a ZERO Threshold Proposal, which may be reserved for executing major structural or systemic governance actions. ZERO Threshold Proposals may be used to perform operations such as invoking the Reset function, toggling the CASH denomination between Wrapped Ether (WETH™) and $M, or modifying the POWER and ZERO Threshold parameters themselves.

The Reset function may represent a specialized governance feature available exclusively to ZERO token holders. This function may permit ZERO holders, upon achieving the requisite yes threshold, to replace the existing governance contract and corresponding POWER token with a new version. Under this process, a new instance of the governor may be deployed, and a new POWER token may be issued with an initial distribution determined on a pro rata basis relative to the balances of ZERO holders in the epoch immediately preceding the Reset. The Reset proposal may become immediately executable once the specified ZERO Threshold is achieved.

The Reset process may be intended for use in circumstances where ZERO holders determine that the existing composition or voting behavior of POWER holders has become irreparably misaligned with protocol neutrality or operational integrity. By invoking Reset, ZERO holders may assume direct governance responsibility through reallocation of management power. It is anticipated that ZERO holders may also employ Reset to reassign control back to existing POWER holders only in exceptional circumstances, such as when governance token mechanics require recalibration after a long operational period, which is expected to occur only after an extended duration. Although there may be no explicit limit on the number of times Reset may be invoked, it is expected to be exercised rarely, if ever.

If a Reset is executed during an active Voting Epoch, all pending and unexecuted proposals associated with the previous governance contract may be automatically canceled, as they are tied to an obsolete governor instance.

An example workflow may proceed as follows. Assume the ZERO Threshold parameter is set to sixty percent. A proposal by POWER holders appears likely to pass, which would add a perceived malicious actor to the Minter List. In response, a participant submits a ZERO Threshold Proposal to call the Reset function. This proposal becomes immediately votable, and once seventy percent of the total ZERO token supply votes affirmatively, the proposal is considered passed and executed immediately. Execution of the Reset invalidates all active and pending proposals, including the proposal to add the suspected malicious Minter, as the governance contract has been replaced.

In some embodiments, the M0 protocol may rely on a checkpointing and voting mechanism within the Two Token Governor (TTG) to determine voting eligibility and ensure consistent governance accounting across epochs. At the start of each epoch, a snapshot- or checkpoint—of token balances may be recorded onchain. These checkpoint balances may be used to determine the voting power of each address throughout the epoch, ensuring that voting outcomes are based on balances existing at the defined governance boundary rather than those affected by transfers during the voting period.

During a Transfer Epoch, only the balances recorded in the most recent checkpoint may be eligible for use in voting on POWER Threshold Proposals, as these proposals do not include standard inflationary or reward-related voting. To participate in a vote, a POWER holder- or the delegate address associated with that holder—may call the Cast Votes method, specifying an array of proposal identifiers and the corresponding yes or no selections for each. The TTG framework may not provide an abstain option, meaning all votes must be cast affirmatively or negatively.

In some embodiments, the TTG may also define the procedures for submitting new proposals. Any address on the Ethereum™ network that holds Wrapped Ether (WETH™) or $M may submit a proposal in some embodiments. The TTG may be deployed using WETH as its internal currency, referred to within the mechanism as CASH, although the CASH denomination may be switched between WETH and $M through the governance-controlled CASH Toggle parameter. To submit a Standard Proposal, a proposer may be required to pay a Proposal Fee denominated in the current CASH currency in addition to gas costs. Once the proposal has passed and is executed, the Proposal Fee may become eligible for return to the proposer.

Proposals submitted through the TTG may generally take one of two structural forms. The first form may involve configuration of a registrar used by the protocol (for example, adding or removing addresses from governance-maintained lists or updating stored variable values). The second form may involve modification of governance parameters, such as rate values, thresholds, or time intervals.

The M0 protocol may reference the registrar for operational parameters and actor sets that it uses in execution of its processes.

To modify a list, a proposer may submit either a Standard Proposal or a POWER Threshold Proposal that invokes the Add To List or Remove From List methods, specifying the list name and the address to be added or removed. A Remove From And Add To List method may also be available to replace one address with another in a single transaction. To introduce a new list within the TTG, a proposer may submit a proposal invoking Add To List with a specification for the new list, which may be created concurrently upon successful execution. Because the M0 core contracts are immutable, any lists added post-deployment may be used only for management of periphery smart contracts and may not directly affect core protocol operations.

As an example, assume Alice seeks to add her company's address to the list of approved Minters. Alice may call Add To List, specifying the Minters list and the desired address, thereby proposing to grant minting permission for that address.

To propose a change to a configuration contract, proposers may invoke the Set Key method, specifying the registrar or configuration contract to be updated along with the desired key and new value. This method may either establish a value for a previously unset key or overwrite an existing entry. For instance, if Bob wishes to modify the Minter Rate parameter from three percent to four percent, he may call Set Key, specifying the configuration contract managing the rate variable and the updated numerical value.

Once a proposal passes and the requisite waiting period has elapsed, any network participant may execute the proposal by invoking the smart contract Execute method onchain and supplying the associated proposal arguments. Execution of this method may apply the approved change to the relevant contract, thereby enacting the governance decision recorded by the TTG.

In some embodiments, the M0 protocol may incorporate an inflation mechanism within the Two Token Governor (TTG) to manage issuance of the governance tokens POWER and ZERO. This mechanism may operate on an epoch-based schedule aligned with the TTG governance cycle, providing a predictable framework for distributing newly minted tokens to active governance participants.

At the beginning of each epoch, the total supply of POWER may increase by ten percent, while the total supply of ZERO may increase by up to five million tokens. These newly created tokens may be claimable on a pro rata basis by POWER holders who participate in governance during that epoch. The claim may be made by the delegate address associated with each participating POWER holder. Any portion of newly minted POWER that remains unclaimed (whether because a holder or delegate did not participate in voting, or due to incomplete engagement during the epoch) may be auctioned through a pay-as-bid Dutch auction process.

When an auction is triggered, it may begin at the start of the Transfer Epoch and conclude at the end of the same epoch. Participants purchasing POWER in such an auction may be eligible to use those tokens in the subsequent Voting Epoch. During each Voting Epoch, POWER holders who participate in all active Standard Proposals may also receive their proportional share of the ZERO token inflation, calculated according to their percentage of total voting power.

Once a Standard Proposal has been submitted, it may be voted upon during the next Voting Epoch unless it is classified as a POWER Threshold Proposal or a ZERO Threshold Proposal, both of which may be voted on immediately. When a proposal becomes available for voting, participation may be mandatory for POWER holders. Failure to vote on any Standard Proposal during an epoch may result in forfeiture of that holder's eligibility to claim inflation rewards for both POWER and ZERO in that epoch. Additionally, nonparticipating POWER holders may experience dilution of their relative voting weight in subsequent governance cycles. Inflation distribution may occur only in epochs that contain at least one Standard Proposal; if an epoch includes only Threshold Proposals or no proposals at all, no inflation is issued for that period.

An example workflow may proceed as follows. Alice holds 1,000 POWER tokens out of a total POWER supply of 10,000, giving her ten percent of total voting power. During Epoch 1, Alice participates fully by voting on all Standard Proposals. At the end of the epoch, she becomes eligible to claim an additional 100 POWER tokens-representing ten percent of a 1,000-token POWER inflation- and 500,000 ZERO tokens, representing ten percent of a 5,000,000 ZERO token inflation. In Epoch 2, Alice fails to vote on one of the Standard Proposals. Consequently, she forfeits her claim to both POWER and ZERO inflation for that epoch. The 110 POWER tokens that would have been allocated to her-representing ten percent of the 1,100 newly minted tokens—are instead auctioned during the Dutch auction process. Bob participates in the auction, bids one Wrapped Ether (WETH™), and acquires the 110 POWER tokens, which he can then use for voting in the next epoch. The ZERO tokens that would have been allocated to Alice are not minted, reducing the total inflation for that cycle.

In some embodiments, the M0 protocol may include an onchain Dutch auction mechanism designed to distribute unclaimed POWER tokens at the start of each Transfer Epoch. This auction may activate automatically whenever one or more POWER holders fail to participate in the voting process during the preceding epoch, thereby leaving their corresponding share of newly issued POWER unclaimed.

At the commencement of the Transfer Epoch, the Dutch auction may begin simultaneously with the epoch itself. The initial auction price may be defined per basis point (0.01%) of the total POWER supply and may start at a value corresponding to $(2^{99})$ wei, where wei represents the smallest denomination of Wrapped Ether (WETH™). The auction price may decrease in discrete exponential steps approximately every 3.6 hours, while linearly declining between those step intervals. For example, after the first 3.6 hours, the price may decrease to $(2^{98})$ wei and then linearly decline toward $(2^{97})$ wei during the subsequent 3.6-hour interval.

In the protocol implementation, bitwise shifting operations may be used to perform these price adjustments efficiently. At the midpoint between two exponent intervals, the effective auction price may be equal to the arithmetic midpoint of the two corresponding exponential values. Participants who wish to acquire POWER tokens through the Dutch auction may do so by invoking the Buy method, specifying the desired purchase amount and payment in WETH. Upon execution, the method may allocate POWER tokens to the purchaser according to the prevailing auction price at the block time of the transaction.

In some embodiments, the M0 protocol may permit the delegation of governance voting power within the Two Token Governor (TTG) framework. Both POWER and ZERO token holders may delegate their voting authority to any Ethereum™ address during a Transfer Epoch. When delegation occurs, the delegated voting power becomes effective for the subsequent Voting Epoch based on snapshot data recorded at the beginning of the governance cycle.

When POWER tokens are delegated, any inflationary rewards associated with those tokens may continue to accrue to the original holder's address, while any ZERO token rewards generated as compensation for governance participation may become claimable by the delegate address. ZERO token ownership itself does not confer additional inflationary rewards beyond those derived from protocol fee distributions, and delegation of ZERO tokens affects only voting power, not financial accruals. However, ZERO holders may receive a share of protocol-derived value from several sources, including Proposal Fee payments collected from rejected Standard Proposals, proceeds from POWER token auctions, and a portion of the Minter Rate and Penalty Rate fees charged to Minters.

Delegation data may be captured through periodic snapshots, which are taken at the beginning of each epoch and finalized at the end. Until an epoch closes, delegation values may be adjusted by token holders. Both POWER and ZERO tokens may conform to the ERC-20 standard, and holders may delegate by calling the Delegate method and specifying the desired delegate address. If no delegation is made, the token owner's address may serve as the default delegate. Holders are not required to reestablish delegation in each epoch unless they intend to change their delegate address.

In some embodiments, ZERO holders may also be entitled to claim residual value accumulated from ongoing protocol operations. As compensation for their role in governance oversight, ZERO holders may receive the remaining balance of protocol fees that are not otherwise distributed. This residual value may consist of unclaimed Proposal Fee payments from rejected proposals, proceeds from POWER token auctions, and designated portions of the Minter Rate and Penalty Rate collected from Minters. Proposal Fee and auction proceeds may be denominated in Wrapped Ether (WETH™) or $M, depending on the current status of the CASH Toggle, while Minter Rate and Penalty Rate proceeds may be collected exclusively in $M.

At any time, a ZERO holder may call the Claim smart contract method to withdraw their accrued residual value. The claimable amount for each holder may be calculated on a pro rata basis according to their ZERO balance recorded at the close of each epoch being claimed. When invoking the Claim method, the ZERO holder may specify either an array of epoch identifiers or a starting and ending epoch, allowing for batch retrieval of residual value across multiple governance periods.

In some embodiments, the M0 protocol may define a set of governance-controlled parameters within the Two Token Governor (TTG) framework that determine how governance processes operate, including proposal submissions, thresholds for approval, and the choice of internal settlement currency. These parameters may be modifiable through governance action, typically by means of a Standard Proposal.

The CASH parameter may specify the internal currency used within the TTG for paying Proposal Fees and purchasing POWER tokens during Dutch auctions. CASH may be toggled between Wrapped Ether (WETH™) and $M, depending on the governance setting. The token designated as CASH may be required to be permissionless and broadly distributed across network participants in order to prevent concentration of control or potential governance manipulation. It may also be expected to maintain a value sufficient to deter spam proposals while supporting efficient auction settlement dynamics.

The Proposal Fee parameter may define the amount, denominated in CASH, that must be paid to submit any governance proposal. This value may be adjustable through a Standard Proposal. The Proposal Fee may be configured to remain high enough to discourage frivolous or spam submissions but low enough to ensure accessibility for legitimate proposals that advance protocol governance.

The POWER Threshold parameter may determine the minimum number of affirmative votes, expressed as a percentage of the total POWER token supply, required to approve any proposal classified as a POWER Threshold Proposal. This percentage may be selected to balance two competing objectives: enabling timely passage of urgent proposals while preventing rapid approval of potentially harmful or malicious actions. For example, if the POWER Threshold is set to eighty percent and the total POWER supply is 1,000,000, then at least 800,000 POWER tokens must vote affirmatively for the proposal to pass.

The ZERO Threshold parameter may similarly define the percentage of the total ZERO token supply required to approve proposals classified as ZERO Threshold Proposals, including Reset operations or other major governance actions. This threshold may be designed to be low enough to allow execution of Reset under necessary circumstances, while remaining high enough to prevent such actions from being undertaken without strong consensus among ZERO holders. For example, if the ZERO Threshold is set to sixty percent and the total ZERO supply is 1,000,000,000, then at least 600,000,000 ZERO tokens must vote affirmatively for the proposal to pass.

In some embodiments, the M0 protocol may include a set of immutable parameters governing the operation of the Two Token Governor (TTG) mechanism. These parameters may be fixed at deployment and not subject to modification through governance proposals, ensuring consistent timing, auction behavior, and epoch structure throughout the lifecycle of the protocol.

The Epoch Duration may define the total combined length of both the Voting Epoch and the Transfer Epoch. This duration may be set to thirty days. The time frame may be selected to provide sufficient opportunity for governance participation and coordination among POWER holders, while maintaining a cadence that enables timely management and execution of protocol updates.

The Voting Epoch Duration may define the length of the period during which POWER holders can actively cast votes on governance proposals. This duration may be fixed at fifteen days. The length may be calibrated to ensure that participants have adequate time to review proposals and record votes onchain, accommodating both organizational and technical constraints across jurisdictions and participants.

The Transfer Epoch Duration may define the length of the non-voting period that follows each Voting Epoch. This interval may also be set to fifteen days. During the Transfer Epoch, POWER tokens may be freely transferred or redelegated, and the Dutch auction for unclaimed POWER tokens may be conducted. The duration may be chosen to ensure sufficient time for market operations and delegation adjustments between voting cycles.

The Auction Duration may define the total time during which the Dutch auction for unclaimed POWER tokens remains active. This period may be fixed at fifteen days and may fully overlap with the Transfer Epoch. The duration may be intended to allow adequate time for price discovery while ensuring the auction completes before the beginning of the next Voting Epoch, such that tokens acquired in the auction are included in the checkpoint for the following voting cycle.

The Dutch Auction Exponent may define the starting auction price as an exponent with a base of two, set to a value of ninety-nine. This parameter may determine the initial price per POWER token, expressed in units of the TTG's internal currency (CASH). The exponent may be selected to produce a sufficiently high starting price that the prevailing market price of POWER in CASH remains below it, while ensuring that the price declines to zero before the end of the Transfer Epoch under the configured decrement schedule.

The Dutch Auction Periods parameter may specify the total number of equally spaced periods into which the Transfer Epoch is divided for the purpose of price decrementing in the Dutch auction. This value may be fixed at one hundred. With this configuration, the auction price exponent may decrease approximately every 3.6 hours, enabling gradual, predictable price reduction and efficient market-driven price discovery throughout the auction cycle.

In some embodiments, the M0 protocol may define a set of immutable parameters specific to the governance token POWER, which establish its initial supply and long-term inflation behavior. These parameters may be fixed at deployment and may not be modifiable through governance actions, ensuring consistency and predictability in governance token economics.

The POWER Initial Supply parameter may define the total number of POWER tokens created at the time of protocol deployment, before any inflationary adjustments occur. This value may be fixed at 1,000,000 tokens, with zero decimal precision. The initial supply may be calibrated to provide sufficient tokens for distribution among early network participants while maintaining a total quantity that avoids potential overflow errors in future computations. The omission of decimal places may simplify arithmetic operations within the smart contracts and mitigate rounding or subdivision concerns. The determination of the initial supply may also consider a minimum distribution threshold, or "dust level," which represents the smallest ZERO token balance that would yield a nonzero POWER allocation following a Reset. For instance, if the POWER Initial Supply is 1,000,000 tokens, any ZERO holder owning less than one-millionth of a ZERO token may receive zero POWER tokens after a Reset event.

The POWER Inflator parameter may define the fixed percentage by which the total POWER supply increases in each active epoch, where an active epoch is one containing at least one votable proposal. The inflation rate may be set at ten percent (10%). Inflation may be applied proportionally across the active POWER supply, and participation in the epoch's voting process may be required for a holder to claim the corresponding inflation allocation. If a POWER holder fails to participate fully in an epoch containing a votable proposal, their absolute token balance may remain unchanged; however, their proportional voting power relative to the total supply may decrease by a factor of one divided by (1+POWER Inflator).

This inflation rate may be selected to balance incentive alignment and system stability. At a ten percent inflation rate, a nonparticipating holder may experience a reduction of approximately forty-five percent in relative voting power after six inactive epochs (corresponding to roughly six calendar months), about seventy percent after twelve epochs, and approximately ninety percent after twenty-four epochs. The inflation percentage may be chosen to provide a meaningful participation incentive while preventing infrequent lapses from causing excessive governance instability. It may also take into account the expected number of active epochs over the long term to prevent arithmetic overflow within token supply calculations, which would otherwise require corrective measures such as a Reset or protocol-level fork. The configuration of the POWER Inflator and the zero-decimal setting may therefore be jointly designed to ensure that the total supply remains within computational limits while achieving the intended participation dynamics across governance cycles.

In some embodiments, the M0 protocol may define a set of immutable parameters specific to the governance token ZERO, which establish its initial supply and the reward mechanics associated with governance participation. These parameters may be fixed at deployment and not subject to modification through governance actions, ensuring predictable and transparent operation of the governance reward system.

The ZERO Initial Supply parameter may define the total number of ZERO tokens created upon deployment of the protocol prior to the issuance of any subsequent rewards. This value may be fixed at 1,000,000,000 tokens, with six decimal places of precision. The initial supply may be chosen to promote a broad and decentralized distribution of governance power, particularly in relation to the Reset method, while remaining within limits compatible with commonly used blockchain integrations and token accounting systems.

The ZERO Reward parameter may define the maximum number of ZERO tokens distributed to POWER holders during each Voting Epoch. The total reward may be set at 5,000,000 ZERO tokens per epoch. Each participating POWER holder may receive a pro rata portion of this amount corresponding to their share of total voting power, provided that they have fully participated in all eligible voting activities during the epoch. The reward tokens may be claimable concurrently with the voting process. Any portion of the reward that remains unclaimed due to non-participation or incomplete voting may not be minted. Additionally, no ZERO rewards may be distributed during epochs that lack active proposals.

This configuration may be designed to ensure that participation in governance voting (e.g., in Standard Proposals) is consistently incentivized while maintaining overall system stability. The reward amount may be selected to provide a meaningful economic incentive to active voters without introducing excessive or unpredictable inflation into the ZERO token supply. In determining this parameter, consideration may also be given to the relationship between expected gas fees and participation economics. Specifically, the per-epoch reward should at least offset the average gas cost associated with voting to make participation economically viable, while still ensuring that total rewards scale appropriately with the level of decentralization among POWER holders.

As an example, assume Alice has 10 percent of the total POWER supply delegated to her address. If Alice fully participates in all Standard Proposals during a Voting Epoch, she may receive 10 percent of the 5,000,000 ZERO tokens allocated for that epoch, resulting in a reward of 500,000 ZERO tokens.

In some embodiments, the M0 protocol may be structured as an economic coordination framework that facilitates structured interaction among permissioned institutional actors through onchain logic. The protocol may not be designed to replace existing financial entities but may instead provide a programmable and transparent means through which such entities can transact and interoperate. By enforcing operational and economic rules directly in code, the protocol may allow a unified blockchain-based environment to supplant the fragmented and opaque systems currently used for value transmission.

Figure 4:
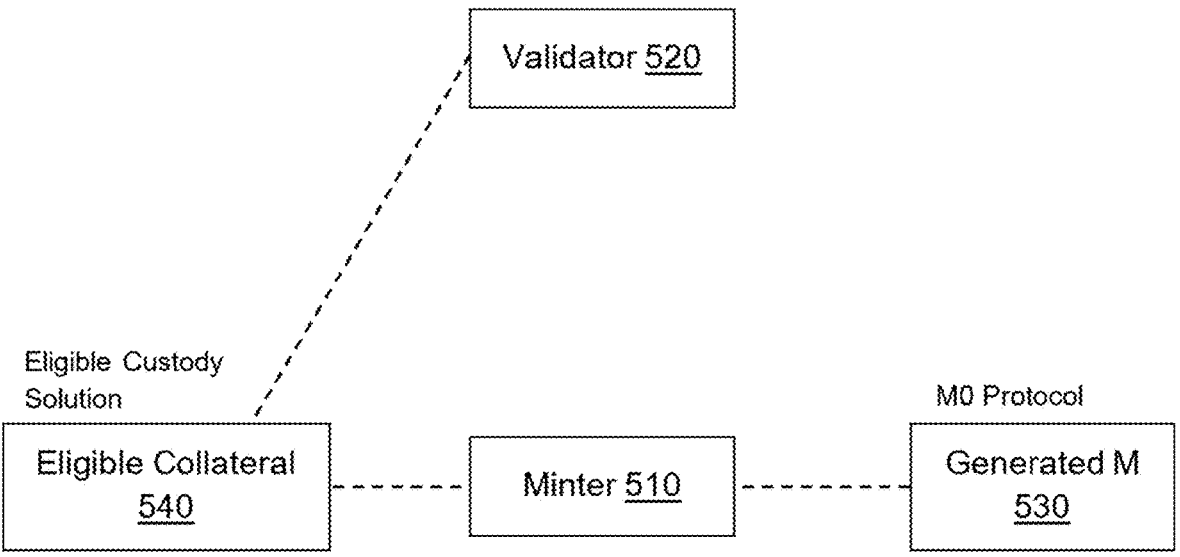
FIG. 4 illustrates an example relationship between Minters, Validators, and Earners in accordance with some embodiments herein.

As illustrated in FIG. 4, the M0 protocol may coordinate Minters 510, Validators 520, and Earners 530. Each category may correspond, in offchain terms, to a class of regulated financial entities or service providers. For instance, Minters 510 may align with financial institutions or stablecoin issuers responsible for generating and distributing $M; Validators 520 may correspond to auditors or custodial attestors who verify collateral balances; and Earners 530 may correspond to institutional investors or yield-seeking holders of $M participating in the Earn Mechanism.

In some embodiments, Minters 510 may be entities motivated to participate in the protocol to capture the yield spread between the return on their Eligible Collateral 540 and the rate charged by the protocol, referred to as the Minter Rate. The effective profitability of minting operations may be determined by both this yield spread and the governance-defined Mint Ratio, which controls the proportion of collateral value that may be represented as issued $M.

The effective return on capital (ROC) for a Minter may be expressed conceptually as the net yield generated on the Eligible Collateral divided by the Minter's net cash investment. The net investment may be defined as the total capital deployed into Eligible Collateral, minus the amount of $M owed (assuming the $M can be redeemed or sold at face value), plus any administrative buffer required for liquidity management.

Minters participating in the M0 protocol may be expected to correspond, in offchain implementation, to licensed or supervised financial services providers such as stablecoin issuers, asset managers, or other regulated institutions. Within the protocol, the primary function of a Minter may be the generation, management, and redemption of the $M supply.

Where the initial class of Eligible Collateral comprises short-term United States Treasury bills (T-bills), it may be expected that the governance-defined Minter Rate will be maintained below the prevailing U.S. Federal Funds Rate to preserve economic viability for Minters. The relationship among collateral yield, Minter Rate, and Mint Ratio may collectively define the incentive structure and equilibrium of the M0 economy.

In some embodiments, Minters participating in the M0 protocol may be expected to engage in arbitrage activity as part of their normal economic behavior. When the market price of $M on secondary trading venues exceeds one United States dollar, a Minter may find it economically rational to deposit additional Eligible Collateral into the system in order to generate new units of $M. By doing so, the Minter may increase their effective net yield by capturing the premium in the secondary market.

Conversely, if the market price of $M falls below one United States dollar, a Minter may choose to repurchase $M from the market and use the acquired tokens to Retrieve Eligible Collateral from custody. This activity may likewise improve the Minter's net yield by enabling reacquisition of collateral at a favorable effective rate.

Through these counterbalancing behaviors, Minters may act as economic stabilizers, although the price of $M may still fluctuate around one dollar. Because the protocol depends on market-driven incentives rather than direct price controls, the exchange value of $M may exhibit short-term volatility while remaining anchored around parity with the United States dollar over the longer term. This dynamic equilibrium may rely on the interplay of heterogeneous market forces that occasionally operate with inefficiency or delay, thereby creating temporary price deviations that Minters are incentivized to correct.

In some embodiments, Validators within the M0 protocol may serve as offchain or semi-offchain entities responsible for attesting to the existence and value of Eligible Collateral supporting the issuance of $M. From an economic standpoint, Validators may not receive compensation through the core protocol itself. Instead, their incentives and payment structures may be established through offchain agreements or through periphery smart contracts deployed alongside, but not within, the core protocol framework. This design choice may reflect the inherent complexity of modeling the diverse and often jurisdiction-specific economic arrangements required to compensate Validators, which may not be effectively or accurately expressed through onchain logic.

In operation, Validators may be expected to provide cryptographic signatures required for execution of the Update Collateral method. These signatures may serve as attestations that the collateral values reported by a Minter are accurate and current. It is anticipated that Validators and Minters will enter into legally binding offchain agreements that define their respective rights, obligations, and compensation terms, including verification frequency, reporting requirements, and service-level expectations. In practical deployment, Validators within the M0 protocol may correspond to professional auditors or custodial verification agents who provide near real-time attestations of the assets used to generate and support $M.

Although all Validator addresses may be treated equivalently by the core protocol, various functional specializations may emerge within the Validator ecosystem. For example, some Validators may focus primarily on providing routine collateral verification and signing operations, while others may operate as "sentinel" Validators tasked exclusively with invoking enforcement methods such as Cancel or Freeze when a Minter exhibits anomalous or noncompliant behavior. Over time, additional Validator roles may evolve to align with the growth of the ecosystem, particularly as Periphery Contracts introduce new auxiliary methods and responsibilities that extend beyond the initial scope of the core protocol.

In some embodiments, Earners within the M0 protocol may represent onchain addresses that have been approved by the Two Token Governor (TTG) to accrue yield at the governance-defined Earner Rate. These addresses may include institutional participants, liquidity managers, or custodial entities that maintain inventories of $M on behalf of clients or counterparties. Throughout normal operation, the Earner Rate may be expected to remain generally aligned with the prevailing United States Federal Funds Rate in order to provide a competitive yield that encourages continued holding of $M.

The Earner Rate may also function as a dynamic policy instrument for maintaining the market price of $M near parity with one United States dollar. If the market price of $M rises above one dollar, the TTG may choose to lower the Earner Rate to reduce the incentive to hold $M, thereby encouraging participants to sell $M in pursuit of alternative yield opportunities. Conversely, if the price of $M falls below one dollar, the TTG may increase the Earner Rate to incentivize retention and accumulation of $M, reinforcing demand-side support. The Earner Rate may exceed the Minter Rate under certain configurations, provided that the aggregate amount of $M distributed through the Earn Mechanism remains less than the total $M accrued through Minter Rate fees.

Offchain, Earners may correspond to institutional holders of $M such as regulated custodians, financial institutions, or exchanges maintaining $M reserves for settlement or liquidity purposes. They may also include issuers or distributors responsible for circulating $M to retail or institutional users. Functionally, Earners may serve as a principal source of sustained demand for $M, facilitating efficient creation and redemption activity by Minters and ensuring consistent market depth for the asset.

As an illustrative example, the TTG may grant permission to a large cryptocurrency exchange, which is appropriately regulated within its operating jurisdictions, to join the Earners list. Once permissioned, the exchange may allocate customer-held $M balances to earn the Earner Rate through the protocol. The exchange may then distribute a portion or the entirety of the accrued yield to its users, thereby extending the protocol's economic benefits to a broader market audience while reinforcing demand for $M.

M0 EXTENSIONS: CUSTOM STABLECOINS BUILT ON $M

In some embodiments, M0 Extensions may represent the application layer of the M0 protocol, though, as noted above, wrappers consistent with these techniques may be applied to a variety of other protocols. Each Extension may take the form of a customized ERC-20-compliant, SPL-compliant, or other standard-compliant digital asset that wraps the base $M token. Through this wrapping mechanism, Extensions may inherit the underlying security, collateralization, and yield characteristics of $M while allowing developers to introduce independent branding, functionality, and business logic.

Conceptually, the $M token may function as a secure, collateral-backed base layer providing economic and regulatory integrity, while Extensions may serve as programmable applications and products built atop that foundation. The resulting architecture may allow developers and institutions to provide distinct digital assets (like branded stable coins) that remain economically anchored to $M yet offer differentiated features or compliance properties suited to their operational needs.

The structural relationship between an Extension and the M0 base layer may be represented as follows: a Custom Stablecoin (Extension) wraps or unwraps the $M Token (Foundation), which in turn is fully backed by United States Treasury collateral held within an eligible custody network.

In some embodiments, each Extension token may maintain a one-to-one correspondence with $M, ensuring constant redeemability between the two representations. This 1:1 linkage may allow Extensions to inherit $M's stability profile and compliance assurances. Or in some cases, an Extension token may be partially backed by $M, in which case, in some embodiments, transfers may be limited to the amount that is backed. Where approved through M0 governance, Extension contracts may also accrue the yield associated with their held $M balances. Developers implementing such Extensions may determine how that yield is distributed (whether to end users, reserve treasuries, liquidity pools, or other designated destinations) allowing a range of programmable monetary behaviors within a unified, collateral-anchored framework.

In some embodiments, a SwapFacility smart contract may function as the central conversion mechanism within the M0 protocol (or in some embodiments, conversions may be non-centralized), supporting deterministic one-to-one exchanges between governance-approved M0 Extensions and the foundational $M token. The SwapFacility may serve as the (e.g., exclusive, or one of a variety) onchain interface through which wrapping and unwrapping operations occur, thereby providing consistent accounting and preservation of value across the M0 ecosystem. All M0 Extensions participating in conversion operations may be required to hold Earner status as approved by governance, while certain permissioned Extensions may require additional authorization through designated swapper roles.

The SwapFacility may be implemented with robust reentrancy protection and may include support for gasless transaction authorization through permit-style functions. By consolidating all conversion logic into a single smart contract, the SwapFacility may provide implicit liquidity across all M0 Extensions, eliminating the need for independent trading pairs between each variant and the base token. This architecture may establish the SwapFacility as the interoperability layer supporting seamless movement of value across the M0 ecosystem.

In some embodiments, Extension tokens may be only partially backed by $M. In these embodiments, SwapFacility may only transfer up to the balance of $M provided in the smart contract.

Developers of wrapper tokens may elect to build custom M0 Extensions to introduce differentiated logic, controls, and yield distribution models while retaining the underlying economic integrity of $M. Extensions may support customizable yield routing, allowing accrued returns on held $M to be directed toward users, reserve treasuries, or other defined destinations according to application logic. Access control layers may be integrated to enforce compliance requirements such as know-your-customer (KYC) verification, jurisdictional restrictions, or institutional-only participation. Fee mechanisms may also be embedded at the Extension level, including transaction fees, management fees, or programmable revenue-sharing structures. Branding parameters may allow developers to issue fully customized digital assets, such as institution-specific or consumer-facing stablecoins, while retaining parity with $M.

By inheriting the characteristics of the M0 protocol, Extensions built through the SwapFacility may benefit from the system's regulatory-compliant infrastructure, shared liquidity environment, and security framework. Because all Extensions unwrap to $M, in some embodiments, they may tap into ecosystem-wide liquidity without requiring external markets. The underlying architecture may also support cross-chain deployment on any network where M0 is active, extending interoperability beyond a single chain.

From a business perspective, Extensions built through the SwapFacility may provide entities with direct control over user engagement and monetary design for wrapped tokens that are then transferred to accounts on the blockchain of users who become holders of those wrapped tokens, and those users may transfer such wrapped tokens further in some embodiments). Unlike integration with third-party stablecoins, issuing an Extension allows full ownership of the user relationship and monetization strategy. Entities may capture revenue through yield management or transaction-based fees while maintaining the flexibility to modify Extension logic, access rules, or incentive mechanisms as operational needs evolve.

In some embodiments, a variety of M0 Extensions may be implemented to address distinct economic, operational, and regulatory use cases. Each Extension type may define a particular yield-routing configuration, access structure, and accounting model while maintaining a one-to-one relationship with the underlying $M token.

Treasury Extensions may be designed to direct the entirety of accrued yield to a single designated treasury address while preserving a non-rebasing, stable-value user experience. These Extensions may be suited for entities seeking to consolidate yield flows for organizational or ecosystem-level management. Representative use cases may include protocol treasuries, ecosystem development funds, corporate reserve accounts, and application-driven or ecosystem-driven general purpose stablecoins.

User Yield Extensions may distribute a portion of accrued yield directly to token holders while retaining a configurable protocol fee that may support ongoing operations or sustainability objectives. Such Extensions may be useful for decentralized finance (DeFi) platforms, consumer financial applications, and yield-bearing savings products where user participation and return distribution are central features.

Institutional Extensions may incorporate granular per-account management, allowing for individualized fee arrangements, whitelisting, and compliance enforcement. These configurations may be designed to accommodate entities operating under regulatory or fiduciary constraints. Use cases may include prime brokerage environments, fintech platforms, and institutional treasury management systems.

Development of M0 Extensions may be recommended for several categories of participants. Application developers building games, payment networks, exchanges, blockchain wallets, or DeFi protocols may issue branded stablecoins to integrate seamlessly with their products. Ecosystem builders such as Layer 1 or Layer 2 network teams may develop native stablecoins to provide unified liquidity within their ecosystems. Fintech companies may design Extensions to meet specific compliance, custody, or yield-distribution requirements, while treasury managers may deploy Extensions to create yield-bearing accounts with tailored operational controls.

Entities that do not require customized functionality may instead elect to use $M, or a general purpose wrapped version, directly. This approach may be preferable for participants who only require standard decentralized finance integrations (such as automated market maker (AMM) pools or lending markets) or who prefer to utilize an existing, governance-approved token rather than deploying a bespoke Extension.

In some embodiments, M0 Extensions may be implemented as smart contracts that interface directly with the M0 protocol through standardized wrapping and unwrapping functions. Each Extension may inherit from a foundational contract, such as one referred to as MExtension.sol, which provides a framework for interaction with the $M base token and defines structural requirements for extension-level logic.

An Extension may extend this base functionality to incorporate additional programmable features, such as custom access controls, transaction restrictions, compliance enforcement, or yield distribution mechanisms. Prior to activation of yield-bearing capabilities, an Extension contract may be required to obtain governance approval as an Earner, allowing it to accrue yield on its held $M balance according to protocol-defined parameters. Once deployed and approved, Extensions may be launched on Ethereum™, Solana, compatible Layer 2 networks, or any additional chain where the M0 protocol operates.

Each Extension may be required to implement a defined set of functions with its smart contract. The wrap (recipient, amount) method may convert a specified quantity of $M into the corresponding Extension token, crediting the resulting tokens to the designated recipient. The unwrap (recipient, amount) method may perform the inverse operation, redeeming the Extension token for an equivalent amount of $M and transferring it to the specified recipient. In addition to these functions, each Extension may define its own logic for yield claiming and distribution, determining how accrued protocol earnings on held $M are allocated among users, treasuries, or other designated destinations in accordance with the developer's implementation.

Swapfacility

In some embodiments, a SwapFacility smart contract may operate as a (e.g., universal) routing and conversion engine within the M0 Extension ecosystem. The SwapFacility may support atomic, one-to-one exchanges between any governance-approved M0 Extension and the foundational $M token, or between two distinct types of Extensions (e.g., with different policies) that both wrap $M. The contract may maintain minimal onchain state to reduce complexity and attack surface, while deferring extension permissions and access validation to the Two Token Governor (TTG) system and its associated governance registries.

The SwapFacility may use several components. The $M token may serve as the foundational collateral-backed digital asset that underlies all Extensions. The TTG Registrar may function as a governance-controlled registry maintaining the list of approved Earners, which defines which Extensions are authorized to participate in wrapping and swapping operations. Alternatively or additionally, Extensions may be admin-controlled. The smart contract may further employ a ReentrancyLock mechanism implemented through transient storage to prevent recursive or reentrant execution during atomic conversion transactions, thereby ensuring transactional integrity.

The SwapFacility may support a unified swap interface that enables direct Extension-to-Extension conversions through a single function call: function swap (address extensionIn, address extensionOut, uint256 amount, address recipient) external.

When invoked, this function may follow a structured operational flow. First, the contract may verify that both extensionIn and extensionOut addresses correspond to governance- or admin-approved Extensions by invoking an internal validation method, such as revertIfNotApprovedExtension ( ) Upon successful verification, the smart contract may transfer the specified quantity of extensionIn tokens from the caller to the SwapFacility. It may then call the unwrap ( ) function on the extensionIn contract to convert the input tokens into the underlying $M.

After the unwrap operation completes, the SwapFacility may measure the precise quantity of $M received, accounting for potential rounding or precision differences among Extension versions. It may then approve the target extensionOut contract to access the received $M balance and invoke its wrap ( ) function, thereby minting the corresponding number of extensionOut tokens. The newly minted tokens may be transferred to the designated recipient, completing the atomic conversion process in a single transaction.

In some embodiments, the SwapFacility contract may include functions that allow direct interaction with the foundational $M token for conversion to or from approved M0 Extensions. These operations may be structured to maintain strict value equivalence while incorporating granular access control to prevent unauthorized or unintended conversions.

Two smart contract functions may govern direct $M interactions:
  a. function swapInM (address extensionOut, uint256 amount, address recipient) external
  b. function swapOutM (address extensionIn, uint256 amount, address recipient) external The swapInM function may permit any user to convert $M directly into a specified Extension token. Upon invocation, the function may receive a quantity of $M, validate that the target Extension is governance-approved, and then call the Extension's wrap ( ) function to mint the corresponding Extension tokens to the designated recipient. Execution of swapOutM may therefore be restricted to entities holding the M_SWAPPER_ROLE or possessing explicit permission for the specified Extension in some embodiments.

The swapOutM function may perform the inverse operation, converting an approved Extension token back into $M. Because this function involves direct redemption into the base layer, additional authorization may be required. Execution of swapOutM may therefore be restricted to entities holding the M_SWAPPER_ROLE or possessing explicit permission for the specified Extension.

Access control within the SwapFacility may follow a two-tiered permission model distinguishing between Standard Extensions and Permissioned Extensions. Standard Extensions may allow open participation in Extension-to-Extension and $M-to-Extension swaps, whereas Permissioned Extensions may require specific authorization for direct $M conversions. The system may provide administrative smart contract functions for governance or authorized maintainers to manage these permissions:
  a. function setPermissionedExtension (address extension, bool permissioned) external
  b. function setPermissionedMSwapper (address extension, address swapper, bool allowed) external The SwapFacility may employ a role-based access system, where the DEFAULT_ADMIN_ROLE grants authority for contract administration, configuration changes, and upgrades, while the M_SWAPPER_ROLE confers global permission to perform swapOutM operations on standard Extensions.

To ensure operational security, the contract may implement advanced reentrancy protection through inheritance from a ReentrancyLock module. This module may utilize transient storage-based state tracking to prevent concurrent execution within a transaction. An example of the reentrancy guard modifier may include the following structure:

```
modifier isNotLocked ( ) {
    if (Locker.get ( )!=address (0)) revert ContractLocked ( )
    address    caller=isTrustedRouter    (msg.sender)?
    IMsgSender (msg.sender).msgSender ( ): msg.sender;
    Locker.set (caller_);
    _;
    Locker.set (address (0));
}
```

In this example implementation, the modifier may first verify that no other operation is currently in progress by checking the stored locker address. It may then record the active caller, execute the protected function logic, and subsequently clear the transient storage slot, thereby preventing nested or recursive invocations that could otherwise compromise atomic swap integrity.

In some embodiments, the SwapFacility smart contract may incorporate a Trusted Router System designed to support advanced integrations with external protocols, such as automated market makers or liquidity adapters (for example, a UniswapV3SwapAdapter). This system may allow designated router contracts to act as intermediaries while preserving knowledge of the original transaction initiator.

When a function is called directly by a user, the contract may store msg.sender as the locker to identify the active caller. When the function is called indirectly through a trusted router, the system may instead retrieve the initiating address using an interface such as IMsgSender (msg.sender) .msgSender ( ). This approach may support accurate tracking of the ultimate user who initiated the transaction. Any Extension integrated with the SwapFacility may therefore call swapFacility.msgSender ( ) to obtain the verified address of the true transaction originator, regardless of routing pathway.

Some or all governance-related permission checks within the SwapFacility may be conducted through integration with the TTG registrar. For example, the approval status of any Extension may be verified against the governance-maintained list of approved Earners using a query of the following form:

function isApprovedEarner (address extension) private view returns (bool) {return IRegistrarLike (registrar).get (EARNERS_LIST_I-GNORED_KEY)!=bytes32(0)||

IRegistrarLike (registrar).listContains(EARN-ERS_LIST_NAME, extension);

}

This logic may ensure that only extensions recognized by the TTG registrar as approved Earners are eligible to participate in swap operations, preserving systemic consistency with governance-defined configurations.

To reduce transaction costs and improve user experience, the SwapFacility may implement permit-based gas optimization, e.g., supporting both EIP-2612 and EIP-712 signature schemes. Each swap function may include a permit-enabled variant allowing users to authorize token transfers through cryptographic signatures rather than separate approval transactions. Examples of such smart contract functions may include:

a. function swapWithPermit ( . . . , uint256 deadline, uint8 v, bytes32 r, bytes32 s) external b. function swapWithPermit ( . . . , uint256 deadline, bytes calldata signature) external These implementations may allow users to complete swap operations in a single atomic transaction while minimizing gas overhead.

The SwapFacility may also employ precise balance tracking to ensure accurate accounting across token versions and prevent rounding errors. For compatibility with Wrapped M version 1, the contract may directly measure changes in its $M balance before and after an unwrap operation, as shown below:

uint256 mBalanceBefore=_mBalanceOf (address (this));

IMExtension (extensionIn).unwrap (address (this), amount);

amount=mBalanceOf (address (this))—mBalanceBefore;

This procedure may guarantee that the amount of $M recorded for subsequent wrapping operations reflects the actual token inflow resulting from the unwrap call, thereby maintaining consistent and verifiable balance reconciliation throughout all swap processes.

In some embodiments, the SwapFacility contract may be implemented using an immutable architecture that enforces the permanence of its foundational dependencies while allowing controlled modification of operational parameters through governance actions. Two addresses may be defined as immutable at deployment:

a. address public immutable mToken;

b. address public immutable registrar;

The mToken reference may designate the foundational $M token contract, while the registrar reference may link to the governance-controlled registry maintained by the TTG. Declaring these references immutable may prevent subsequent alteration of the protocol's core trust anchors, thereby strengthening system integrity and reducing the attack surface, while parameters affecting operational logic may remain modifiable through authorized governance proposals.

The SwapFacility may maintain minimal internal state to simplify verification and reduce gas costs. Persistent variables may include:

a. permissionedExtensions: a mapping defining which M0 Extensions require explicit authorization for participation in swap operations; and b. permissionedMSwappers: a mapping designating the specific addresses authorized to perform $M conversions on behalf of those permissioned Extensions.

The smart contract may emit structured events to provide transparent, onchain records of conversion activity:

c. event Swapped (address indexed extensionIn, address indexed extensionOut, uint256 amount, address indexed recipient);

d. event SwappedInM (address indexed extensionOut, uint256 amount, address indexed recipient);

e. event SwappedOutM (address indexed extensionIn, uint256 amount, address indexed recipient);

These events may be used by offchain computing services and analytics tools to monitor swap operations, track liquidity flows, and confirm compliance with governance-defined parameters.

In some embodiments, the SwapFacility may be designed to maintain one-to-one value correspondence across all conversions. Each swap operation may be executed atomically, ensuring that either the full conversion succeeds or all changes revert. This architecture may eliminate the possibility of slippage or trading fees and may prevent the emergence of arbitrage opportunities within the M0 ecosystem. All conversions may preserve parity with one United States dollar, with every Extension token remaining fully backed by its equivalent value in $M reserves.

By concentrating all conversion logic in a single smart contract rather than dispersing liquidity across multiple automated market maker (AMM) pools, the SwapFacility may create implicit liquidity between all approved M0 Extensions (though some embodiments may be dispersed as well). This configuration may allow value to move seamlessly across the ecosystem while consolidating capital efficiency within the foundational $M layer, resulting in deterministic, frictionless interoperability among all compliant Extensions.

Ethereum Virtual Machine Implementation

In some embodiments, operation of the Ethereum™ network may rely on the collective execution of a deterministic virtualized computing environment known as the Ethereum Virtual Machine (EVM). Each participating node (e.g., untrusted computing devices executing an instance of the EVM) may independently execute the same ordered sequence of transactions, applying identical inputs and producing a shared post-execution global state, referred to as the state root. Every block may include both the ordered transaction list and a cryptographic commitment to the resulting global state. When a validator proposes a block, all other nodes may re-execute each transaction within the EVM instruction by instruction, applying gas charges, updating contract storage, and recording event logs. If the final state root computed locally does not match the one asserted by the block proposer, the block may be considered invalid and discarded. In this architecture, correctness may arise not from a trusted operator but from universal re-execution and hash-based verification of state transitions.

Consensus protocols may transform this deterministic execution process into a canonical blockchain history. In proof-of-stake configurations, a randomly selected proposer may assemble a block, and a distributed set of validators may then attest that the block extends the most recent confirmed chain head. A fork-choice rule (such as Latest Message Driven-Greediest Heaviest Observed SubTree, or LMD-GHOST) may determine which competing chain branch is adopted, while a finality mechanism (such as Casper Friendly Finality Gadget, or FFG) may periodically checkpoint finalized states that cannot be reverted without severe validator penalties. Validators may sign proposals and votes with cryptographic keys that can be slashed for producing invalid or conflicting attestations, providing strong economic incentives for adherence to protocol rules. Because all execution is deterministic and consensus participation is open, any network participant may operate a full node and verify the system's complete behavior from first principles.

Additional architectural components may be involved. Gas metering may constrain computational and storage resource consumption: each EVM opcode may carry a fixed gas cost, and callers may prepay with Ethereum tokens with a gas limit. Should execution exceed this limit, the transaction may revert, preventing denial-of-service conditions due to unbounded computation. The global system state may be encoded in Merkle-Patricia tries (or other cryptographic accumulators), allowing compact, cryptographic commitments to all account balances, contract code, storage entries, logs, and receipts. Full nodes may verify the entire state, whereas light clients may verify specific inclusions through Merkle proofs without holding the full dataset.

At the local level, the EVM may operate as a stack-based machine that provides transient memory per call and persistent key-value storage per contract address. Each transaction may execute as a single call graph (e.g., without concurrency, preemption, or shared mutable memory beyond explicitly accessed contract storage). This strict determinism may support secure cross-contract operations. For example, a router contract may atomically burn wrapped tokens, query a pricing index from a base asset, and mint into a destination wrapper; all such operations may succeed or revert collectively, producing a single consistent state transition on every node. Event logs emitted during execution may be included in the block's receipt trie, allowing offchain systems to later verify precisely which index snapshots and policy parameters were applied.

Transaction authenticity may be enforced through digital signatures and sequential account nonces, ensuring that only the private key holder can authorize an operation and that each transaction executes at most once. A fee market defined by EIP-1559 may determine transaction inclusion priority through base fees and optional tips. Execution costs may vary according to "cold" and "warm" access conditions and storage-write rules, maintaining predictable gas pricing. Because all blocks are verified by independent participants according only to protocol rules and signatures, correctness may not depend on any specific proposer, bridge, or decentralized application; rather, trust may rest solely on cryptographic verification and the economic alignment of the validator majority.

Within this deterministic environment, wrapping operations may be implemented. An extension contract or other wrapper token contract may contain executable code and storage that govern minting and redemption of share tokens against an underlying $M balance. Each wrap or unwrap may include a sequence of EVM instructions that adjust balances between two ledgers, e.g., the base and the wrapper. As all nodes re-execute the same arithmetic deterministically, in some embodiments, no proposer can mint excess tokens or misplace collateral without producing a block that fails verification. A cross-wrapper swap may similarly execute as a sequence of atomic state updates combined with policy checks. If any predicate, pricing condition, or validation step fails, the transaction may revert and all state changes may be rolled back, preserving full system integrity.

The cryptographic state commitments that support efficient verification may also facilitate auditability. The base token's index values may occupy fixed, well-known storage locations, and routers and wrappers may read these values once per transaction, binding their computations to that snapshot. Logs may encode structured data including participant addresses, amounts, and digests of policy or configuration data, all of which are Merkle-committed through the receipt root of the block. Consequently, any observer may reconstruct a completed swap, prove which index epoch was used, and verify that the amounts minted or burned correspond exactly to the executable logic.

In some embodiments, the structure of the Ethereum™ execution environment may make the implementation of token "wrapping" an extension of the existing ERC-20 standard. An ERC-20 token contract may maintain two storage mappings) e.g., balanceOf(address⇒uint256) and allowance (owner⇒ (spender⇒uint256))) and may expose a minimal interface including the transfer, approve, and transferFrom methods. A wrapper token may extend this model by introducing a one-to-one or indexed relationship between a share token (representing wrapper units) and an underlying asset (representing the base token or collateral). The wrapper may define deterministic conversion functions that govern the issuance and redemption of shares relative to the underlying asset.

During minting, a user may first grant the wrapper permission to transfer the underlying token on their behalf by submitting an onchain approval transaction or by providing an offchain signature under the EIP-2612 permit standard. Once authorized, the wrapper may read its pricing rule (such as an index value stored in the base token contract that reflects accrued yield) and compute the number of wrapper shares to issue according to the expression shares=floor (assets/index). The smart contract may then update storage in two atomic steps: increasing the user's balanceOf value for the wrapper token and increasing the wrapper's recorded holding or claim on the underlying asset. During redemption, the wrapper may burn the user's shares by decrementing balanceOf [user] and transfer or release the corresponding amount of underlying assets, calculated as assets=shares× index, to the designated recipient. Because the EVM enforces atomic state updates, either both the share and underlying updates complete, or both are reverted.

When value must move between two wrappers (such as converting holdings from Wrapper A to Wrapper B) the Ethereum Virtual Machine (EVM) may allow execution of an atomic unwrap-to-rewrap sequence within a single transaction call graph. A router contract may initiate this process by invoking Wrapper A's redemption function to burn the user's shares, capturing the same pricing index snapshot to maintain consistency, and consulting a registrar contract to apply any policy-based checks such as address allowlists, fee schedules, or compliance restrictions. If all conditions pass, the router may immediately call Wrapper B's mint function using the released underlying value. Should any validation step fail (e.g., due to an insufficient allowance, a stale index value, or a rejected policy predicate) the router may issue a REVERT, rolling back all intermediate state changes, including SSTORE operations. The user therefore never temporarily holds unwrapped underlying tokens or partial balances, as the EVM enforces atomic execution for the entire sequence.

Internally, the gas accounting system may increment across CALL and DELEGATECALL boundaries, with cold storage slots becoming "warm" after their first access to reduce subsequent gas costs. The transaction receipt may contain a structured event log sequence emitted by Wrapper A, the router, and Wrapper B, enabling offchain systems to reconstruct which index epoch, policy digest, and parameters governed the operation.

Developers implementing wrappers may rely on several lower-level mechanisms to preserve determinism and safety. The index used for pricing may reside in a fixed storage slot within the base token contract, ensuring that wrappers load it once per transaction via SLOAD and bind all computations to that immutable snapshot, preventing intra-transaction drift. Rounding conventions may be selected to favor users and limit systemic dust: minting operations may round down, while redemptions may round up, keeping residual discrepancies bounded to the smallest token unit. Reentrancy protection may be enforced through a mutex-style storage guard, preventing recursive calls when the wrapper interacts with external contracts that could attempt to invoke the wrapper again mid-execution.

For generalized vault-like wrappers, developers may adopt the ERC-4626 standard, which defines uniform interfaces such as convertToShares and convertToAssets and integrates naturally with index-based valuation models. From a user experience standpoint, many complex workflows may be aggregated using multicall mechanisms or signed message flows (for example, permit combined with a single router invocation). However, regardless of frontend complexity, all such operations ultimately compile or interpret down to a deterministic sequence of EVM bytecode instructions that read and write defined storage slots in a single, ordered call graph, ensuring consistent and verifiable execution on every node.

In some embodiments, the Merkle-Patricia trie may be replaced with a Verkle tree. A Verkle tree combines a sparse key-value layout with a vector (polynomial) commitment at each internal node, allowing a single compact commitment to bind a large branching set of children (for example, 256 or 1024). Internal nodes commit to their child commitments using a polynomial commitment scheme such as KZG, while leaf nodes store concrete key-value pairs such as a storage slot identifier and its 32-byte value. The commitment at a node can be viewed as a polynomial evaluation in which each child's value contributes a coefficient; informally, a node commitment C aggregates terms $v_i \cdot g_i$ where $v_i$ denotes a child value or hash and $g_i$ denotes the corresponding generator from the structured reference string. Because these commitments support succinct openings, a prover can furnish short proofs that particular leaves contain particular values without revealing unrelated data.

A Verkle proof for a key consists of the committed path from the root to the leaf, the evaluated field elements at internal nodes along that path, and an aggregated KZG proof attesting that the evaluations are consistent with the commitments. Verification, in some embodiments, requires only a small, constant number of elliptic-curve pairings and transmits data that scales with tree depth rather than with the number of siblings, which reduces proof size compared to Merkle-Patricia inclusion proofs.

Applied to M0, the Base Asset Contract may store its global earning index, the current index epoch, and a policy or registrar digest in fixed storage slots that correspond to specific leaves in the global state Verkle tree. In some embodiments, a Spoke Portal running on another L1 or L2 periodically obtains a Verkle proof that attests to the values of these slots at a particular block. For example, the proof can show that BaseAsset.index_epoch equals 1052, BaseAsset.global_index_value equals 1.002341, and Registrar.policy_digest equals 0x9a . . . f3 at block B. The portal, in some embodiments, receives a proof object containing the block's state root, the sequence of node commitments and evaluations along each relevant path, and an aggregated KZG opening. Using the public structured reference string and the state root embedded in the canonical header, in some embodiments, the portal verifies the proof locally. If verification succeeds, in some embodiments, it writes the verified values into its own state and marks them as belonging to epoch 1052. Because Verkle proofs are essentially constant sized (e.g., on the order of a few kilobytes regardless of state depth), in some embodiments, this synchronization can occur frequently and economically, yielding high-resolution alignment between the Ethereum hub and peripheral chains.

In a stateless-verification regime, validators may need not store the entire state; they process a block by re-executing the transactions against the parent state root while checking the Verkle proofs for every account and storage slot touched. They then compute the new root. For M0, this means that only a small set of storage slots (e.g,. those for the index, epoch, and registrar digest) need to be proven per update. Once a block finalizes, in some embodiments, its Verkle root acts as a cryptographic fingerprint of all M0 state transitions at that height. Any external chain or auditor, in some embodiments, can later demonstrate the value of an M0 variable at that block by presenting a Verkle proof against the recorded root.

An example hub-to-spoke update proceeds as follows. At block B, an authorized caller invokes updateIndex (newIndex, epochId) on the Base Asset Contract. Execution updates the relevant leaves, which produces a new Verkle state root in the block header. The hub publishes the epoch parameters together with or referential to that header. A Spoke Portal retrieves the header's root R_B and a bundled proof that opens the leaves corresponding to the index and policy digest. The portal verifies the aggregated KZG opening against R_B, records epochId 1052 locally, and binds pricing and policy enforcement to that epoch. Routers and extensions on the spoke annotate transactions with the accepted epoch, and the router rejects conversions that do not match, ensuring that economic and policy consistency is enforced cryptographically. The result is compact cross-chain attestations, stateless yet precise auditing of M0 values at any block, reduced reliance on centralized oracles because the spoke trusts only the Ethereum header chain and Verkle proof validity, and configurable confirmation depth so governance can balance latency against security when deciding how many finalized headers to require before accepting a new epoch.

In some embodiments, Ethereum extends its block format with a blob data space that is separate from the ordinary execution payload. Each block can include a bounded number of blob-carrying transactions. A blob is a large binary object, approximately 128 kilobytes (e.g., or less), that is not addressable by EVM opcodes but is nevertheless committed in consensus through a KZG polynomial commitment recorded in the block header. For execution, in some embodiments, a transaction carries a versioned hash that references its blob's commitment. For consensus and data availability, in some embodiments, validators distribute a "sidecar" containing the full blob bytes so that nodes can sample and verify that the data were published. The network, in some embodiments, retains blob bytes for a limited window, after which only the commitments persist; rollups rely on data-availability sampling over this window to argue that their posted state deltas were indeed made public.

This mechanism can be applied to M0 by anchoring epoch snapshots in blobs. The Hub Portal, in some embodiments, periodically constructs an epoch package that summarizes the base system's economic and policy state, such as the epoch identifier, the current global earning index, a policy digest covering allow/deny lists, fee tables, and yield routing parameters, and optionally a collateral attestation root. The package, in some embodiments, is serialized as a structured object and written as the payload of a blob in a blob-carrying transaction. The transaction, in some embodiments, invokes a publish function on the Hub Portal with the blob's versioned hash; the contract records this reference and emits an event. At consensus time, in some embodiments, the validator set includes the blob's KZG commitment in the beacon block's data-availability roots and gossips the sidecar to peers.

Spoke chains, in some embodiments, consume this data by verifying the blob and importing its contents into their local state. On optimistic rollups, in some embodiments, the sequencer observes the beacon chain for new blobs, retrieves the epoch package, and writes the index root and policy root into L2 state while referencing the blob commitment in L2 metadata so that any verifier can, during the fraud-proof window, reconstruct the blob from Ethereum and check that the imported data match the commitment. On zero-knowledge rollups, in some embodiments, the prover circuit may include a KZG opening of the blob commitment and demonstrate that the extracted epoch fields correspond to the committed polynomial; the verification circuit then enforces that swaps, mints, and burns reference the epoch proven from the hub blob. In both designs, in some embodiments, the L2's economics and policy become deterministic because they are cryptographically anchored to the blob commitments published on Ethereum.

A representative synchronization flow proceeds as follows. The Base Asset Contract updates the earning index for a new epoch on Ethereum. The Hub Portal computes digests for the updated index and the current policy set, serializes them with the epoch identifier and timestamp, and posts the package in a blob. The block that includes this transaction carries a KZG commitment to the blob in its data-availability root. A Spoke Portal retrieves the blob sidecar, checks the KZG opening against the commitment, reconstructs the serialized payload, and verifies that the included digests match the expected values. Upon successful verification, the spoke records the new epoch identifier, accepted index, and accepted policy digest in local state and emits an acceptance event. Thereafter, in some embodiments, any conversion on the spoke must supply the accepted epoch identifier; the router rejects operations that do not match the last imported epoch, ensuring policy and economic consistency with the hub.

Because blob bytes are pruned after the retention window, in some embodiments, an archival service may periodically extract epoch payloads and store them in an immutable repository, optionally chaining them with additional Merkle commitments back to Ethereum for long-term integrity. This arrangement, in some embodiments, yields an audit log in which an external reviewer can recompute KZG commitments for historical blobs and confirm that specific epochs were propagated as claimed, and governance can verify that minters and spokes operated under the correct, attested epochs.

The cost model, in some embodiments, separates blob gas from execution gas. A blob-carrying transaction pays a fee for its number of blobs and a small amount of execution gas to record the versioned hash on-chain. At current parameters, in some embodiments, where total blob capacity per block is on the order of half a megabyte, an epoch package of roughly 100-200 kilobytes consumes only a fraction of a blob, making frequent publication economically feasible.

In some embodiments, Ethereum supports a transaction model in which account logic is programmable and validation is performed by contracts rather than by fixed secp256k1 signatures on externally owned accounts. In some cases, this is realized at the application layer by EIP-4337, which introduces a meta-transaction flow built around an EntryPoint contract and off-chain bundlers that collect and submit user operations. Some embodiments may integrate the same or a similar model natively so that user operations become first-class transactions without requiring a separate bundling layer.

In some embodiments, a user constructs a UserOperation object that encodes intent (target calldata, gas limits, fees) and provides whatever authorization scheme its smart account demands. The smart account is a contract that implements validation and execution routines; it decides which signatures, policies, or conditions authorize the action. The operation is relayed to a canonical EntryPoint contract by a bundler, which pre-pays gas in ETH and is reimbursed if validation succeeds. The EntryPoint invokes the smart account's validation function, enforces gas and nonce semantics, optionally consults a paymaster contract that sponsors fees subject to policy, and then dispatches the target call. The entire flow is atomic at the EntryPoint level: if authorization, sponsorship, or execution fails, the operation reverts and no state changes.

This abstraction, in some embodiments, lets complex authorization replace brittle private-key flows. A minter, validator, or institutional earner can adopt a smart account whose validation logic requires multi-party signatures, MPC attestations, jurisdictional checks, issuance or burn rate limits, or time-windowed schedules. The same account, in some embodiments, can whitelist specific automation agents to submit routine actions while keeping hard caps and revocation hooks on-chain. Because UserOperations are pre-validated against these rules, in some embodiments, the chain only executes transactions that already satisfy policy, reducing operational risk from mis-signed or incorrectly sequenced calls.

A paymaster, in some embodiments, extends the model by underwriting gas on behalf of approved actors. Its contract logic inspects the UserOperation, checks role membership and compliance data (for example, by querying a registrar), and decides whether to sponsor the fees. If it does, in some embodiments, the EntryPoint debits the paymaster to reimburse the bundler and may, in turn, charge the actor in the protocol's native unit or deduct fees from accrued earnings. This pattern yields gasless UX for permissioned participants while keeping cost recovery and policy enforcement programmable and auditable.

In some embodiments, account abstraction allows actors to operate through smart accounts rather than externally owned accounts. In some embodiments, a MinterAccount can validate collateral updates and mint proposals only when a threshold of keys signs and a fresh attestation from a validator set is included; a ValidatorAccount can authorize freezes or collateral attestations via quorum signatures (e.g., aggregated BLS); an EarnerAccount can delegate routine start/stop earning calls to a custody platform that never holds ETH, with a paymaster sponsoring the gas if registrar conditions are met. Multi-step procedures (such as "attest collateral to update index to mint" or "unwrap extension A to rewrap into extension B via the router") can be encoded as a single UserOperation using multicall semantics so the whole sequence succeeds or reverts together.

In some embodiments, the mechanism becomes protocol-native, and similar semantics may move into the base layer. In some embodiments, UserOperations are included directly by block builders; nonce and gas accounting are integrated with the account's execution context; and sponsorship/refund logic is enforced by the protocol. In some embodiments, this reduces surface area, eliminates reliance on third-party bundlers, and strengthens verifiability because each actor's smart account state and validation code participate directly in the canonical state transition.

An example program flow is as follows. An automation system constructs a UserOperation that invokes a base-asset update with new attestation data. The minter's smart account validates the operation by checking a threshold signature, verifying that the attestation is timely and matches a payload hash signed by validators, and confirming that issuance limits are not exceeded. The paymaster consults the registrar to ensure the minter is authorized and sponsors the gas. The bundler submits the operation to the EntryPoint, which runs validation, performs the call, and settles refunds; the block includes logs from both EntryPoint and the called contracts, allowing auditors to tie the action to a specific validation digest and epoch. All other nodes deterministically re-execute the same validation and execution under the same gas constraints, which preserves trustlessness.

Governance fits into this model in some embodiments. A registrar can specify which smart-account implementations are permitted for each role and can rotate implementations by updating registry pointers. Because signature schemes live inside the account code, different actors can mix EOAs, MPC, threshold BLS, or hardware-attested keys without changing downstream integrations. Reentrancy and front-running risk, in some embodiments, are reduced because the EntryPoint isolates each user operation's validation and enforces deterministic gas ceilings before execution.

FIG. 5 is a flow diagram illustrating an example method 600. Steps may be added to or omitted from the method 600 without departing from the present disclosure. In some embodiments, the method is executed, partially or entirely, with the system 1000 of FIG. 8.

At step 610, a base token is minted. The base token may be minted with a base-token smart contract. The smart contract may be on a blockchain. The base token may be a rivalrous asset. The base token may be rendered a rivalrous asset by the blockchain.

At step 620, the base token is wrapped with a first-type of wrapper token. The wrapping may be performed with a first wrapper smart-contract. This may be performed on the blockchain. The wrapping may comprise minting the first-type of wrapper token. Wrapping may comprise transferring the base token to a first wrapper blockchain account. The account may be partially controlled by the first wrapper smart-contract. The minted first-type of wrapper token may be transferred to a first user blockchain account. This may occur without also transferring the base token to the first user blockchain account.

At step 630, a request to transfer the base token is received.

At step 640, policy compliance is determined. Policy compliance may be determined responsive to receiving the request to transfer the base token. The policy may be associated with the first wrapper smart-contract. Compliance with rules of the policy may be determined.

At step 650, the base token is unwrapped from the first-type of wrapper token. This unwrapping may occur responsive to the requested transfer.

At step 660, the base token is wrapped with a second-type of wrapper token. This wrapping may occur responsive to the requested transfer. The wrapping may be performed with a second wrapper smart-contract. This may occur on the blockchain. The second wrapper smart-contract may be associated with a different policy from the policy associated with the first wrapper smart-contract. The partial control of the first and second wrapper smart-contracts may include the ability to selectively block transfers of the base token. The partial control may not include the ability to transfer the base token to blockchain accounts that are not pre-approved in a registry controlled by a different entity from entities specifying the policies associated with the first-type of wrapper token and the second-type of wrapper token.

Figure 6:
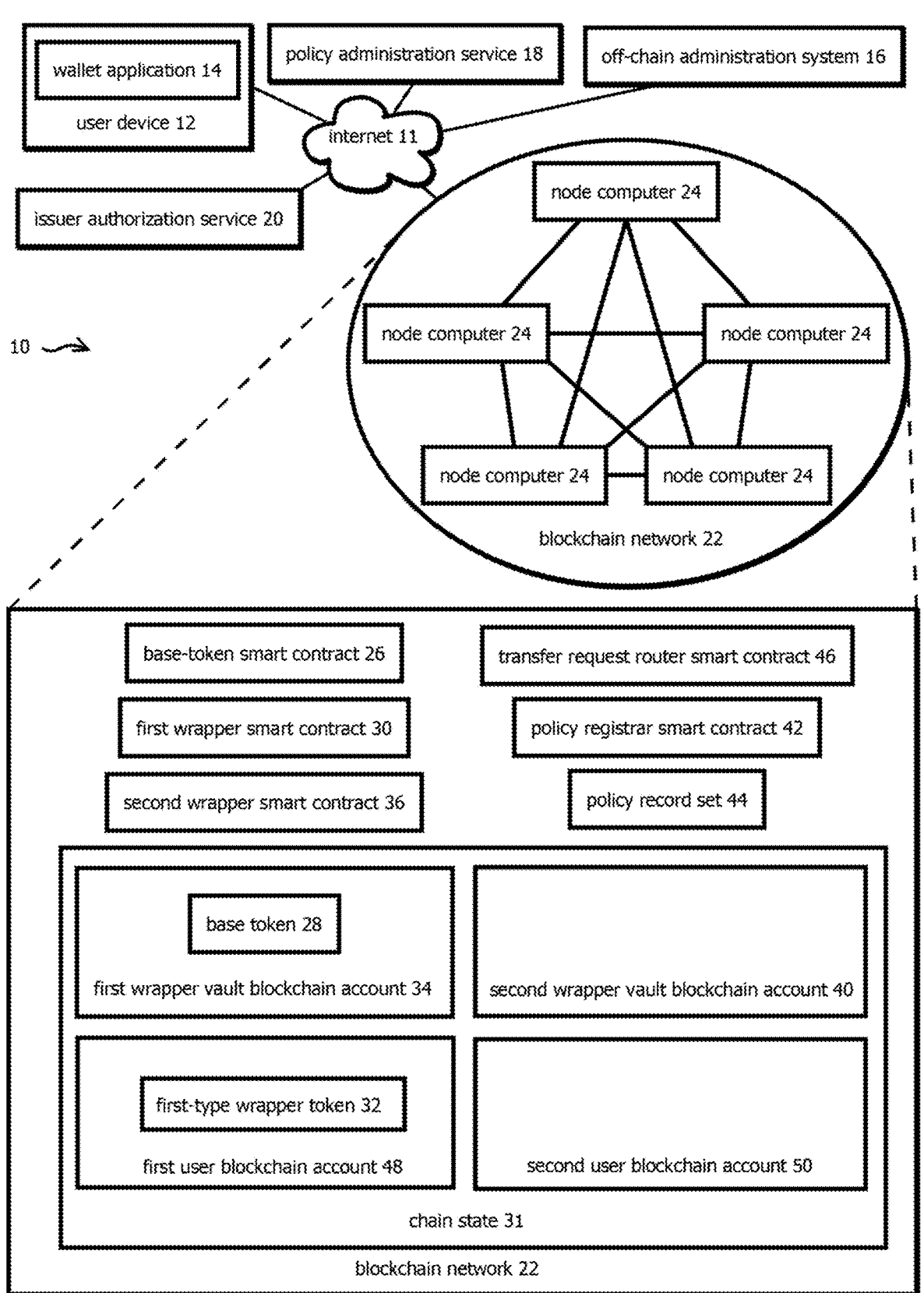
FIG. 6. is a block diagram of an example stablecoin platform in a first state in accordance with some embodiments herein.
Figure 7:
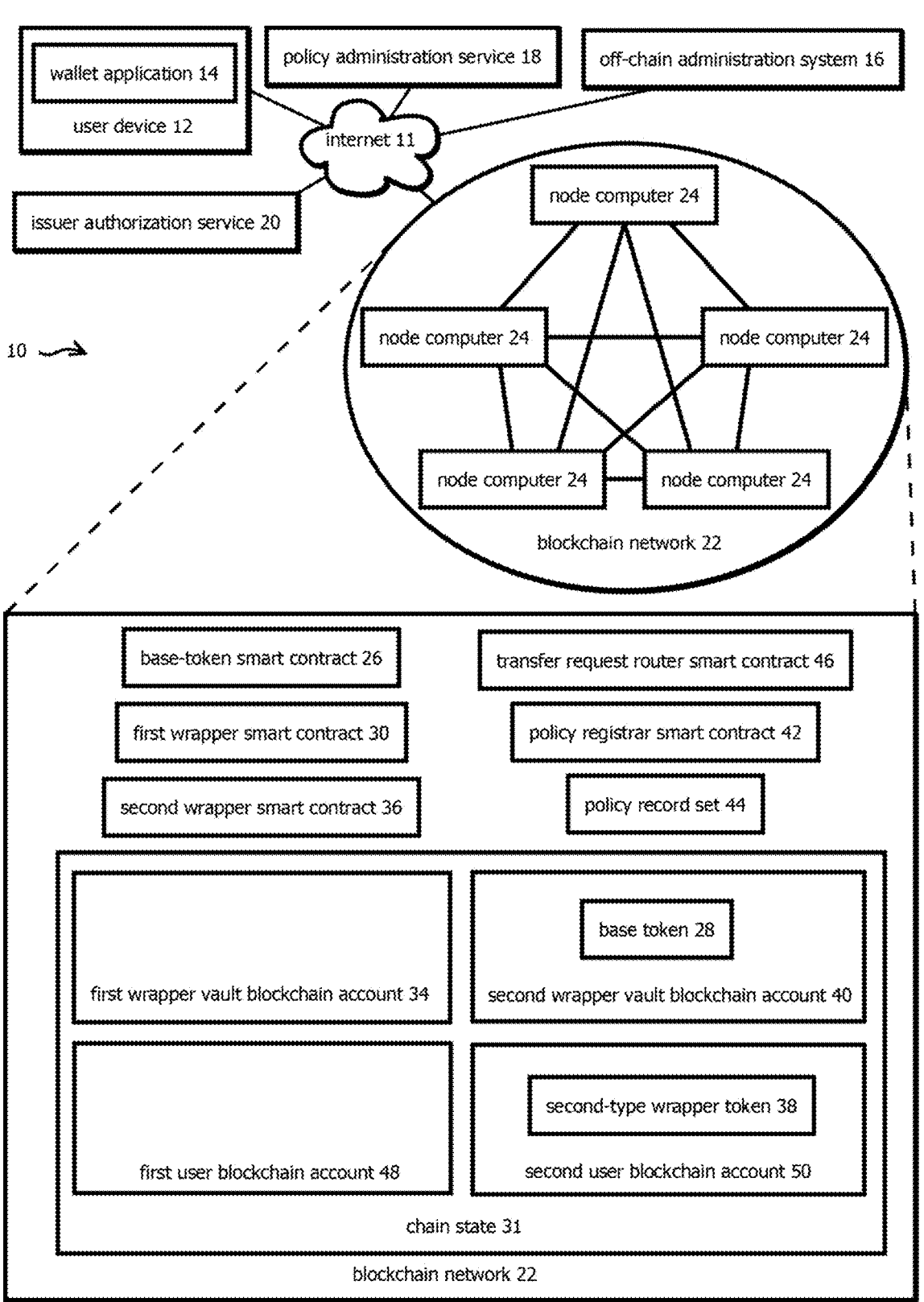
FIG. 7. is a block diagram of the example stablecoin platform in a second state in accordance with some embodiments herein

FIGS. 6 and 7 illustrate an example stablecoin platform in a first and second state in accordance with some embodiments. In some embodiments, the illustrated system may execute the other processes and provide the other functionality described herein. In some embodiments, a computing environment 10 may include components that may cooperate to create, wrap, unwrap, and transfer rivalrous digital assets on a blockchain network 22 under policy-controlled conditions. In some implementations, the computing environment 10 may include one or more off-chain computing systems that may generate, sign, relay, and monitor blockchain transactions, and the computing environment 10 may further include one or more on-chain programs that may execute as smart contracts and may mutate chain state 31 in response to validated transactions.

In some embodiments, the internet 11 may provide packet-switched connectivity among one or more components of the computing environment 10. In some cases, the internet 11 may carry transaction requests, policy updates, and cryptographic proofs using one or more network protocols, such as HyperText Transfer Protocol (HTTP) over Transport Layer Security (TLS). In some implementations, the internet 11 may include one or more private networks, virtual private networks, cellular networks, peer-to-peer overlays, and gateway services, and the internet 11 may further include one or more message relays that may buffer and forward signed transaction payloads.

In some embodiments, a user device 12 may include one or more processors and one or more memories storing instructions that, when executed, may cause the user device 12 to generate user-facing interfaces and to produce cryptographically signed requests targeting the blockchain network 22. In some implementations, the user device 12 may include secure key storage, such as a secure enclave, a trusted platform module, or a hardware security module, and the user device 12 may further include one or more biometric sensors or passcode mechanisms that may gate access to signing operations. In some cases, the user device 12 may include a desktop computer, a mobile phone, a tablet, or an embedded device, and the user device 12 may further include one or more peripheral devices that may assist with identity verification or transaction approval.

In some embodiments, a wallet application 14 may execute on the user device 12 and may manage one or more blockchain accounts, including a first user blockchain account 48 and, in some embodiments, another user device 12 (not pictured) may manage a second user blockchain account 50 to be used in a transaction described below. In some implementations, the wallet application 14 may derive account addresses and keys using hierarchical deterministic derivation, and the wallet application 14 may store encrypted key material and may decrypt key material transiently for signing. In some cases, the wallet application 14 may construct transaction call data for one or more smart contracts on the blockchain network 22, and the wallet application 14 may submit signed transactions to one or more nodes, relayers, or transaction bundlers over the internet 11. In some embodiments, the wallet application 14 may display balances and positions by querying chain state 31 via one or more Application Programming Interfaces (APIs) exposed by node operators, and the wallet application 14 may validate returned results by checking cryptographic proofs, block headers, or Merkle paths.

In some embodiments, an off-chain administration system 16 may include one or more server computers that may maintain policy artifacts and operational parameters that may be referenced by on-chain logic and off-chain clients. In some implementations, the off-chain administration system 16 may expose APIs that may accept authenticated requests to create, update, and revoke policy configurations, and the off-chain administration system 16 may store those configurations in one or more databases with audit logs. In some cases, the off-chain administration system 16 may publish policy digests, signatures, or version identifiers that may be committed on-chain, and the off-chain administration system 16 may monitor on-chain events to reconcile policy versions with observed enforcement outcomes.

In some embodiments, a policy administration service 18 may be included within, or be independent of, the off-chain administration system 16 and may implement workflows for drafting and approving policy rules associated with wrapper smart contracts, including a first wrapper smart contract 30 and a second wrapper smart contract 36. In some implementations, the policy administration service 18 may represent policies as machine-readable rule sets, and the policy administration service 18 may compile those rule sets into one or more formats such as signed JSON, binary encodings, or decision trees. In some cases, the policy administration service 18 may compute a cryptographic digest of a policy version and may cause that digest to be anchored on-chain via a policy registrar smart contract 42, and the policy administration service 18 may additionally distribute the same policy version to clients such as the wallet application 14 for local pre-checking. In some embodiments, the policy administration service 18 may support rule conditions that may reference account allowlists, deny lists, time windows, rate limits, multi-party approvals, jurisdictional attributes, or asset provenance attestations, and the policy administration service 18 may allow administrators to attach metadata and revocation instructions to a policy version.

In some embodiments, an issuer authorization service 20 may be included within, or be independent of, the off-chain administration system 16 and may coordinate authorization to mint or otherwise originate a base token 28 through a base-token smart contract 26. In some implementations, the issuer authorization service 20 may manage one or more signing keys that may correspond to privileged roles recognized by the base-token smart contract 26, and the issuer authorization service 20 may require multi-factor approval, threshold signatures, or multi-signature workflows prior to producing a transaction that invokes minting functions. In some cases, the issuer authorization service 20 may interface with custody providers, compliance systems, or identity providers, and the issuer authorization service 20 may record approval decisions in an audit log that may be correlated with on-chain transaction identifiers. In some embodiments, the issuer authorization service 20 may be implemented as a set of microservices, a monolithic service, or a set of scripts executed in a controlled environment, and the issuer authorization service 20 may additionally be distributed across multiple administrative domains using secure enclaves or multi-party computation.

In some embodiments, a blockchain network 22 may include a distributed set of (e.g., untrusted, peer) node computers 24 that may maintain a replicated ledger and may execute smart contract code in response to consensus-validated transactions. In some implementations, the blockchain network 22 may implement proof-of-stake consensus, proof-of-work consensus, or other consensus mechanisms, and the blockchain network 22 may enforce transaction ordering, fee payment rules, and state transition validity. In some cases, the blockchain network 22 may expose a virtual machine or interpreter for executing smart contracts, and the blockchain network 22 may constrain execution via gas limits, opcode metering, or resource quotas. In some embodiments, the blockchain network 22 may be partitioned into shards or rollups, and cross-domain messaging may be supported by bridges or message-passing contracts that may be treated as additional components of chain state 31.

In some embodiments, a set of node computers 24 may include one or more full nodes, archive nodes, validator nodes, and/or light clients that may collectively participate in maintaining the blockchain network 22. In some implementations, nodes in the node computer set 24 may receive signed transactions from the wallet application 14 and may gossip those transactions to peer nodes, and the nodes may execute smart contract calls to compute candidate state transitions. In some cases, nodes in the node computer set 24 may validate block proposals and may persist block data and receipts, and the nodes may provide query endpoints that may be used by off-chain applications to read chain state 31. In some embodiments, the node computer set 24 may include specialized relayer nodes that may bundle transactions or sponsor fees, and those relayer nodes may impose additional policies, such as anti-replay checks, nonce management, or rate limiting.

In some embodiments, a base-token smart contract 26 may define logic for creating and tracking a base token 28 on the blockchain network 22, and the base-token smart contract 26 may treat the base token 28 as a rivalrous asset by recording ownership in chain state 31. In some implementations, the base-token smart contract 26 may include a mint function that may accept parameters identifying a recipient blockchain account and an amount, and the mint function may update balances and emit events that may be observed by off-chain components. In some cases, the base-token smart contract 26 may restrict mint operations to a role that may be controlled by the issuer authorization service 20, and the base-token smart contract 26 may verify signatures, multi-signature thresholds, or role membership stored in chain state 31. In some embodiments, the base-token smart contract 26 may implement additional transfer restrictions, such as freezing, pausing, or blacklisting, and the base-token smart contract 26 may store those restrictions as flags or mappings within chain state 31.

In some embodiments, a first wrapper smart contract 30 may implement wrapping operations that may accept transfers of the base token 28 into a first wrapper vault blockchain account 34 and may mint a first-type wrapper token 32 to represent a wrapped position held subject to a first policy. In some implementations, the first wrapper smart contract 30 may expose a wrap function that may call the base-token smart contract 26 to transfer the base token 28 into the first wrapper vault blockchain account 34, and the first wrapper smart contract 30 may then mint the first-type wrapper token 32 to the first user blockchain account 48 without transferring the base token 28 to that user account. In some cases, the first wrapper vault blockchain account 34 may be an account whose spending authority may be partially controlled by the first wrapper smart contract 30 through programmatic checks, and additional control may be shared with a governance mechanism, a time lock, or a multi-signature wallet. In some embodiments, the first wrapper smart contract 30 may record linkages between wrapper token identifiers and underlying base token quantities in chain state 31, and the first wrapper smart contract 30 may store per-user allowances, redemption constraints, or transfer hooks that may be consulted during subsequent operations.

In some use cases, chain state 31 may be migrated from that depicted in FIG. 6 to that depicted in FIG. 7 by unwrapping the base token 28, transferring it to the second wrapper vault blockchain account 40, re-wrapping the base toke 28 with a second-type of wrapper token 38, which is provided to the second user blockchain account 50.

In some embodiments, the second wrapper smart contract 36 may implement analogous wrapping operations under a different policy, and the second wrapper smart contract 36 may accept the base token 28 into a second wrapper vault blockchain account 40 and may mint a second-type wrapper token 38. In some implementations, the second wrapper smart contract 36 may expose a wrap function and an unwrap function, and those functions may mint, burn, and transfer tokens by updating chain state 31 and emitting events. In some cases, the second wrapper smart contract 36 may restrict outgoing transfers of the base token 28 from the second wrapper vault blockchain account 40 unless one or more policy conditions have been satisfied, and the second wrapper smart contract 36 may consult policy data stored via the policy registrar smart contract 42. In some embodiments, the second wrapper smart contract 36 may implement additional features, such as partial unwrapping, batch operations, permit-style approvals, or delayed settlement, and the second wrapper smart contract 36 may encode those features as additional state variables and checks.

In some embodiments, chain state 31 may include a representation of accounts, token balances, policy records, and other persisted variables that may be mutated by smart contract execution. In some implementations, chain state 31 may store ownership and balances for the base token 28, the first-type wrapper token 32, and the second-type wrapper token 38 as mappings from account addresses to quantities. In some cases, chain state 31 may store the first wrapper vault blockchain account 34 and the second wrapper vault blockchain account 40 as addresses whose balances may correspond to underlying locked base tokens, and chain state 31 may further store the first user blockchain account 48 and the second user blockchain account 50 as addresses holding wrapper tokens and other assets. In some embodiments, chain state 31 may store a policy record set 44 as mappings from policy identifiers to rule digests, version numbers, allowlists, deny lists, and revocation flags, and the policy record set 44 may be referenced during transfer requests and during unwrap or rewrap operations. In some implementations, chain state 31 may include nonces, approvals, and event logs that may be used by the wallet application 14 and the off-chain administration system 16 to detect state changes and to coordinate multi-step operations.

In some embodiments, a policy registrar smart contract 42 may manage the policy record set 44 and may provide on-chain accessors that may return policy parameters associated with a given wrapper smart contract or wrapper token type. In some implementations, the policy registrar smart contract 42 may allow authorized accounts to register a new policy version by submitting a policy digest and metadata, and the policy registrar smart contract 42 may store that information in chain state 31. In some cases, the policy registrar smart contract 42 may also store role memberships for actors such as administrators, minters, validators, or other privileged roles, and the policy registrar smart contract 42 may expose functions that wrapper contracts and router contracts may call to check role membership. In some embodiments, the policy registrar smart contract 42 may support policy deactivation, supersession, or time-bounded validity, and the policy registrar smart contract 42 may enforce those features by comparing block timestamps, block numbers, or epoch counters against values stored in chain state 31.

In some embodiments, a transfer request router smart contract 46 may receive a request to transfer the base token 28 from a first-type wrapper token 32 representation to a second-type wrapper token 38 representation, and the transfer request router smart contract 46 may coordinate policy checks and multi-contract calls. In some implementations, the transfer request router smart contract 46 may accept call data that identifies an input wrapper type, an output wrapper type, a quantity, and one or more recipient accounts, and the transfer request router smart contract 46 may then determine whether the requested transfer complies with rules in a policy associated with the first wrapper smart contract 30 by querying the policy registrar smart contract 42 and by evaluating rule conditions against chain state 31. In some cases, the transfer request router smart contract 46 may cause unwrapping by calling the first wrapper smart contract 30 to burn or lock the first-type wrapper token 32 and to release the base token 28 from the first wrapper vault blockchain account 34 into an intermediate holding address or directly into the second wrapper vault blockchain account 40. In some embodiments, the transfer request router smart contract 46 may then cause wrapping by calling the second wrapper smart contract 36 to mint the second-type wrapper token 38 and to associate the locked base token 28 with the second wrapper vault blockchain account 40 under the different policy. In some implementations, the transfer request router smart contract 46 may support additional safety checks, such as reentrancy guards, replay protection, per-block rate limits, or staged execution with commit-reveal, and the transfer request router smart contract 46 may store intermediate progress markers in chain state 31 to allow recovery from partial execution.

In some embodiments, the first user blockchain account 48 and the second user blockchain account 50 may be addresses recorded in chain state 31 that may hold balances of the base token 28 and wrapper tokens, and those accounts may sign transactions via keys managed by the wallet application 14. In some embodiments, accounts may be externally owned accounts, smart contract accounts, multi-signature wallets, or account-abstraction wallets, and signature verification may be performed using one or more signature schemes, including Elliptic Curve Digital Signature Algorithm (ECDSA), EdDSA, or threshold signature variants, subject to the execution environment of the blockchain network 22.

In some embodiments, additional off-chain components may be included in the computing environment 10 to support development and operations. In some cases, a transaction indexing service may ingest on-chain events and may expose query endpoints to the wallet application 14 and the off-chain administration system 16, and a monitoring service may detect policy violations or anomalous transfer patterns by processing event streams. In some implementations, a risk scoring service may compute scores for addresses or transactions using rule-based logic or machine learning models, and the risk scoring outputs may be encoded into policy updates that may be published through the policy administration service 18 and anchored via the policy registrar smart contract 42. In some embodiments, a key management service may be used to rotate signing keys and may distribute key shares across multiple administrative entities, and that key management service may integrate with the issuer authorization service 20 to control minting operations under the base-token smart contract 26.

Solana Implementation

In some embodiments, execution within the Solana™ network may occur through a runtime system known as Sealevel, which executes programs compiled to extended Berkeley Packet Filter (eBPF) bytecode, e.g., derived from high-level languages such as Rust using the Anchor framework. In contrast to the single-threaded, stack-based execution model of some embodiments using the Ethereum Virtual Machine (EVM), some embodiments may achieve parallelized transaction execution by requiring each transaction to explicitly declare in advance every account it intends to read or write. The Sealevel runtime may then apply read and write locks to the declared accounts and schedule transactions whose writable sets do not overlap to execute concurrently across multiple processor cores.

Each deployed program may exist as executable code at a fixed address and may not itself contain persistent storage. Instead, all durable state may reside in accounts, which are structured as byte arrays with metadata including ownership, balance, and permissions. Each account may specify an owner program, and only that program may modify the account's data. When a transaction invokes a program, in some embodiments, it provides a compact list of account metadata entries (including account addresses, signer status, and write permissions) along with serialized input data. The runtime, in some embodiments, may strictly enforce ownership and access restrictions, preventing a program from modifying or reading undeclared or unauthorized accounts. This architecture, in some embodiments, may eliminate categories of shared-state and reentrancy risks that can arise in call-stack-based systems such as the EVM.

Network trustlessness may be derived from deterministic re-execution of transactions combined with proof-of-stake (POS) consensus layered on a proof-of-history (PoH) timekeeping mechanism. A designated leader (proposer), in some embodiments, may assemble a block by ordering transactions and passing them through the PoH sequence, which provides a cryptographically verifiable record of event order. Each validator node may independently re-execute the same ordered transaction and account set, measuring computational work in compute units (CUs) and enforcing both memory and account-size constraints. Transactions that exceed their CU budgets, attempt to access undeclared accounts, fail ownership checks, or encounter runtime errors may, in some embodiments, fail and revert all pending state modifications. Successful transactions may deterministically update the affected accounts. Validators may then vote on the resulting block through a consensus process such as Tower Byzantine Fault Tolerance (BFT) operating over PoH, finalizing the block when all honest nodes compute an identical bank hash (e.g., a cryptographic commitment to the aggregate account state). A block that does not deterministically produce the same bank hash on re-execution may be rejected, and leaders producing invalid or conflicting blocks may incur economic penalties or loss of consensus standing.

This runtime architecture, in some embodiments, affects how wrapping operations may be implemented. In some embodiments, token balances may reside in SPL Token accounts managed by a canonical token program (or Token-2022, which supports extended functionality). An M Extension program may control a vault token account that holds the representation of the base $M token. To wrap, a transaction may include references to the extension program ID, the vault account (marked writable), the user's token account, the SPL Token program, and any policy or configuration accounts. During execution, the extension program may validate policy conditions, compute the appropriate number of shares using a bridged earning index, and perform a cross-program invocation (CPI) into the token program to mint shares for the user while updating the vault's $M balance. The unwrap process may invert these steps (e.g., burning user shares through CPI and releasing the corresponding amount of $M from the vault). Because all involved accounts are explicitly declared and are locked during execution, in some embodiments, the entire sequence may occur atomically: either all CPIs succeed and state updates are committed, or the transaction reverts with no state modification across validators.

The runtime may also permit underlying economic updates to flow into balances in two configurations. Non-rebasing extensions may maintain static share counts for each holder, calculating mint and redeem values using the latest hub-attested index stored in a configuration account. Alternatively, rebasing extensions may leverage Token-2022's Scaled-UI feature, which applies a chain-wide scaling factor to the mint, automatically adjusting displayed balances across all accounts without individual writes. In both designs, the platform may receive origin-authenticated index updates from a hub chain through a portal or bridge account, storing the accepted epoch in state. Validators re-execute these index update transactions deterministically, in some embodiments, and all subsequent wrap or swap operations must reference the accepted epoch accounts, ensuring all value transformations correspond to a specific, globally verifiable index snapshot.

Cross-extension swaps may follow the same execution principles. A router program (for example, ext_swap) may receive a transaction specifying the source extension and vault, destination extension and vault, user token accounts, SPL Token program, and policy/index accounts. Within one transaction, the router may invoke the source extension to burn the user's shares and realize an amount of $M based on the current index epoch, then invoke the destination extension to mint the new shares using the same epoch and policy digest. The runtime may guarantee safety through its account-locking system, ensuring no race conditions over shared state. Consensus based on the bank hash, in some embodiments, ensures that every validator observes identical account sets and bytecode, and CPI atomicity ensures that no partial conversions occur if a policy validation or CPI call fails.

Wrapping $M into Solana-based extensions may include constrained CPIs into the SPL Token program, deterministic extension logic applied to declared accounts, index values authenticated by the hub epoch, and final commitments recorded in the global bank hash across all honest validators.

Some embodiments may execute on a validator client in which networking is driven by a DPDK packet pipeline that bypasses the kernel and sustains multi-million-packet-per-second ingest; execution decomposes each transaction into its read/write account set so that non-overlapping transactions can run concurrently across cores; and consensus, transaction ingestion, and execution are isolated on separate threads so no stage blocks another. Cryptographic hot paths (e.g., signature checks and proof-of-history hashing) may be vectorized with AVX-512, yielding high parallel efficiency without sacrificing determinism. Embodiments are expected to safely processes tens of thousands of transactions per second while ensuring every node replays the same ordered state transitions and lands on the same bank hash. In some embodiments, a vectorized signature pipeline can verify large batches of validator signatures in microseconds, which may allow a spoke of M0 to ingest hub updates (such as new index epochs or policy digests) almost immediately. In some embodiments, a single transaction updates the oracle/config account that holds the current root, and some embodiments schedule that write on its own thread while other threads continue clearing the user transaction queue. Subsequent M0 operations in the same block may read the updated epoch, so every validator advances state in lockstep.

ZK Compression, also called state compression with validity proofs, represents a fundamental may be used to store and verify data. Instead of writing every individual balance, mapping, or registry entry directly into an on-chain account, in some embodiments, the network maintains a single compact commitment (e.g., a Merkle or polynomial root) that summarizes a large off-chain dataset. That dataset may contain millions of individual entries, but only the root may be stored on-chain. When an entry changes, a proof showing how the previous root transitions to the new root may be submitted, verified, and used to update the commitment. ZK Compression may provide zero-knowledge validity proofs. Instead of revealing every intermediate hash, in some embodiments, the updater submits a succinct proof that they have correctly recomputed a new root from a valid prior state according to predefined transition rules. These proofs can be generated off-chain using systems such as Plonky2, Halo2, or Jolt, and then verified on-chain via pairing-based elliptic curve checks (for example on the bn254 or bls12-381 curves). In some embodiments, the runtime executing the smart contracts includes a system call that can perform these pairing checks efficiently in native code, supporting the verification of thousands of off-chain updates with minimal computational overhead.

Some embodiments may track large sets of permissioned entities (e.g., Minters, Validators, and Earners, of which there may be more than 100, more than 1,000, or more than 10,000 of each) as well as dynamic values such as collateral balances, policy digests, and index epochs. In some implementations, each of these records may require a separate account, consuming storage and rent. Under ZK Compression, these data structures can exist primarily off-chain in a compressed map or tree, while a single root commitment resides in an on-chain registry account controlled by the M0 protocol. When a Minter's collateral balance changes, in some embodiments, the off-chain attestors update the corresponding leaf in the compressed state tree and produce a zero-knowledge proof that the transformation from the old root to the new root is valid. The M0 contract, in some embodiments, verifies the proof on-chain and replaces the old root with the new one. Validators and auditors, in some embodiments, can independently confirm the correctness of these updates by verifying the proof and ensuring that it references the expected previous root.

While each compressed tree can contain millions of leaves, some embodiments using these techniques could represent the entire global Minter registry or collateral attestation set with a single 32-byte root. The bandwidth and cost of posting updates may be reduced, yet any observer can still verify the full state's integrity from that single root. In some embodiments, the protocol might maintain several such roots: one for permissioned actor registries, another for collateral proofs, and a third for yield or index data. When a user performs a wrap, unwrap, or swap, their transaction can include a proof of inclusion showing that their address and collateral record are part of the current root, tying the operation to a verifiable global snapshot.

ZK Compression may also help the M0 Solana spoke to synchronize with the Ethereum hub. The hub could publish a new epoch containing a Merkle or polynomial commitment to the canonical earning index and policy configuration. A bridge or portal may transport that root and a proof of origin to Solana, where it replaces the current on-chain root in the M0 Index Oracle program. Any extension or swap transaction on Solana, in some embodiments, thereafter references that root to determine pricing and policy, ensuring that all computations derive from a cryptographically linked, cross-chain-consistent snapshot.

In some embodiments, the runtime treats the compressed account like any other account: as a byte array with an owner program and a data field containing the current root and various metadata fields, such as tree height or proof system identifier. Updates arrive as transactions that invoke the M0 smart contract, in some embodiments, which then loads the current root, verifies the zero-knowledge proof using the built-in pairing syscall, and writes the new root back into the account. Because each update touches only one writable account, in some embodiments, it executes quickly and deterministically. Off-chain, in some embodiments, a network of validators or custodians maintains the full uncompressed state and can reconstruct proofs for any leaf when needed, such as when a user redeems collateral or disputes a record.

Example Blockchain

In some embodiment state may be persisted to a blockchain. In some embodiments, a blockchain may operate as an append-only ledger composed of blocks that each include a header and a body, where the header may store a cryptographic commitment to the block's contents and a hash pointer to a predecessor block. Nodes may receive proposed blocks, verify that each transaction and commitment satisfies protocol rules, and, under a consensus mechanism, may agree upon a single canonical ordering of blocks. The block body may contain a sequence of transactions or state transitions, while the header may store fields such as a parent hash, a commitment to the transaction set or resulting state, timing or proposer metadata, and consensus-associated attestations or proofs. When a new block is proposed, each verifying node may recompute the header commitments from the body and predecessor, and reject the block if any recomputation fails. Because blocks may reference prior blocks by a hash of their headers, any mutation to an earlier block may alter its header hash and thereby invalidate every subsequent hash pointer, which may render tampering immediately evident unless an adversary can also reconstruct and convince the network to accept a replacement suffix.

In some embodiments, the set of all known blocks may be represented as a directed acyclic graph of cryptographic hash pointers. Each block may point to exactly one parent via the parent's header hash, and time moves monotonically forward along edges from children to parent without cycles. Because competing blocks may be produced against the same parent, the structure observed by nodes may be a tree-like DAG, within which a fork-choice rule may select a single path as the canonical chain. Non-selected branches may remain recorded as side branches in the DAG, and they may influence future fork-choice decisions depending on the consensus protocol, but they may not alter the canonical path once finality conditions are met.

In some embodiments, a cryptographic hash pointer may include an addressing component that identifies where to fetch the referenced data and a digest component that is a cryptographic hash of that exact data. A verifier may dereference the pointer, recompute the hash of the retrieved object, and compare against the stored digest, and any discrepancy may demonstrate alteration or corruption. A block header's parent hash may be an instance of such a hash pointer to the parent header, and the Merkle root within a block may be viewed as a higher-order hash pointer that commits to an entire set of leaves through a tree of digest pointers to children. Because the block may commit both to its predecessor and to its own contents using cryptographic hash pointers, any change to either the body or the parent may be detectable by a mismatch when hashes are recomputed.

In some embodiments, the tamper-evident property may arise from the composition of inter-block and intra-block commitments. At the inter-block layer, altering a past block may produce a different header hash, which may break the child's parent reference and cascade forward, requiring recomputation of every descendant header. At the intra-block layer, altering any transaction or state element may change the Merkle root (or other cryptographic accumulator digest) or other commitment recorded in the header, which may immediately invalidate that block. Consensus mechanisms may further amplify tamper-evidence by making the acceptance of an alternative suffix economically or procedurally infeasible. For example, proof-of-work participants may need to redo aggregate work sufficient to outpace the honest chain, and proof-of-stake validators may need to gather and risk slashing a supermajority of stake to sign conflicting histories. Because execution and verification may be deterministic and signatures may bind authorship, any deviation from the protocol-authorized sequence may be detectable by honest nodes that re-execute the same steps on the same inputs.

In some embodiments, the cryptographic hash used in hash pointers and Merkle commitments may be a function that maps arbitrary-length input to a fixed-length digest and may satisfy preimage resistance, second-preimage resistance, and collision resistance. Preimage resistance may make it computationally infeasible to find an input that maps to a given digest; second-preimage resistance may make it infeasible, given one input, to find a distinct input with the same digest; collision resistance may make it infeasible to find any pair of distinct inputs with the same digest. Additional properties such as unpredictability and avalanche behavior may ensure that small changes to input produce outputs that are computationally indistinguishable from random and flip a large fraction of output bits. These properties may prevent an adversary from forging data that matches an existing commitment or from equivocating by preparing two different datasets with the same committed hash.

In some embodiments, the hash function may be constructed using the Merkle-Damgård paradigm. An input may be padded, including an encoding of its original length, and split into fixed-size blocks. A compression function may take a chaining value and a message block and may output a new chaining value. Starting from a fixed initialization vector, the construction may iterate the compression function over all blocks, and the final chaining value may be output as the digest. Security of the overall construction may rely on the collision resistance of the compression function and on the inclusion of the length in the padding, which may prevent certain extension ambiguities. Some Merkle-Damgård based hashes may exhibit a length-extension property, which may be mitigated in protocols by domain separation, tree hashing, or message authentication code constructions. In other embodiments, sponge-based hashes such as Keccak (standardized as SHA-3) may absorb and squeeze data through a permutation with a rate and capacity split, which may avoid length-extension behavior while providing different provable bounds.

In some embodiments, a block may also include a commitment to a Merkle tree of transactions or to a trie that summarizes post-execution state. A verifier may recompute the root from all leaves or may verify specific inclusions by checking an authentication path from a leaf to the root, with each node's hash recomputed along the path. Because each internal node may be a digest of its children and the root may be recorded in the header, altering any leaf may induce a different root, and nodes may reject the altered block when they detect the mismatch. When combined with the parent hash pointer and a fork-choice rule, this structure may produce a ledger whose history may be globally verifiable and whose past entries may be infeasible to alter undetected.

In some embodiments, a blockchain may determine its canonical state by combining deterministic execution with a consensus protocol that orders blocks and resolves forks. Each node may independently re-execute transactions within a proposed block, verify signatures and commitments to data (such as transaction roots or state roots), and compute the post-execution state. Because multiple blocks may contend to extend the same parent, a fork-choice rule may select one branch as canonical, and a finality mechanism may periodically render earlier checkpoints economically irreversible. The result may be that the global state at any height corresponds to the state produced by deterministically executing the blocks along the selected branch, while any conflicting branch may be discarded as non-canonical.

In some embodiments using proof of work, block producers may search for a nonce that makes a block header hash fall below a network-wide difficulty target (like computing a partial hash collision). The computational cost of finding such a header may probabilistically rate-limit block creation, and the fork-choice rule may favor the chain with the greatest cumulative work. If an adversary attempts to rewrite history, they may need to re-mine the modified block and every descendant and still surpass honest miners' aggregate work; this may be economically prohibitive unless the adversary controls a substantial fraction of total hash power. Difficulty adjustment may target a stable block interval, and eventual consensus may emerge as confirmations accrue, with deeper blocks becoming exponentially harder to replace. Nodes may accept a new state root only when it is anchored by a chain that the longest-chain rule deems superior.

In some embodiments using proof of stake, validators may lock up stake and participate in proposing and voting on blocks. A proposer may assemble a block that extends the current head, and a large set of validators may attest that the block is well formed and properly extends the chain. A fork-choice rule may use these attestations (for example, weighing votes by stake and considering the latest messages from validators) to select the preferred head among competing branches. A separate finality gadget may aggregate votes into checkpoints and finalize them when sufficient supermajority support is observed, after which reverting them may require validators to violate protocol rules and incur slashing penalties. Because the cost to create blocks may be low relative to proof of work, economic security may arise from the threat of stake confiscation for equivocating or signing invalid blocks rather than from expended computation.

In some embodiments, the protocol may employ proof of stake with a proposer selected pseudo-randomly per slot and committees of validators attesting to blocks. A fork-choice rule such as a latest-message, stake-weighted tree walk may identify the best head among known blocks, while a finality mechanism may accumulate two-thirds supermajority votes to justify and finalize checkpoint epochs. Validators may sign attestations and sync committee messages and may be subject to slashing for double-signing or surrounding votes. State transitions may remain deterministic: every node may execute the same runtime calls in the same order, and the block header may commit to the resulting state root. As finality occurs, older checkpoints may become impractical to revert without burning a substantial fraction of stake, which may anchor application state such as balances and contract storage. In some embodiments, proposer-builder separation and related relay systems may be used off-protocol to mitigate transaction-ordering manipulation while preserving the same consensus safety guarantees.

In some embodiments, the protocol may use stake-weighted consensus combined with a proof-of-history sequence that provides a verifiable ordering clock for batches of transactions. A leader schedule may assign short time slots to validators in proportion to stake, and the designated leader may ingest transactions, order them against the proof-of-history sequence, and produce blocks. Other validators may replay the same transactions under the runtime, locking declared accounts and executing non-overlapping sets in parallel, and then vote on the resulting bank state. A tower-style Byzantine fault tolerant mechanism may apply increasing lockouts to votes, so that once a validator has voted on a branch at a certain depth, switching away may require violating prior lockouts, which may lead to slashing or exclusion. Because the proof-of-history sequence may be publicly verifiable and the vote lockouts may accumulate quickly, the cluster may converge on a single bank hash for each slot, and subsequent confirmations may render prior banks economically final. The canonical state may thus be the one obtained by deterministically replaying the ordered transactions on the branch with the most stake-weighted voting power and the strongest lockouts.

In some embodiments, consensus may determine which ordered list of blocks is authoritative. Nodes may accept a block's state root only if the block both satisfies consensus validity (proper proposer, proper votes, proper difficulty or stake signatures) and passes local execution checks. Tamper evidence may arise because any change to a block's content may alter its header commitments and break the cryptographic hash pointer referenced by its child, while fork choice and finality may make it infeasible to persuade honest nodes to adopt an alternative history without expending overwhelming work or risking forfeiture of locked stake.

In some embodiments, blockchain computing platforms may rely on untrusted, geographically distributed, computing nodes connected via the Internet to execute smart contracts while preserving correctness by designing every layer (e.g., authorization, execution, state commitment, and consensus) to be objectively verifiable. A transaction may begin as a signed message, where digital signatures prove the sender's authority and a monotonically increasing nonce prevents replay. The transaction's payload may contain contract calls and parameters. Nodes that receive it may not be trusted to behave honestly; instead, every validator or full node may independently re-execute the same bytecode deterministically, using a sandboxed virtual machine such as the Ethereum Virtual Machine or an eBPF-based runtime, with opcodes defined so that identical inputs produce identical outputs. Access to non-deterministic sources may be disallowed or tightly scoped, there may be no ambient system calls, and persistent state may be confined to a key-value store owned by the contract, which removes side channels and allows deterministic re-execution on any node.

Resource accounting may make computation safe under adversarial load. Each operation may have a fixed cost metered as gas or compute units, callers may prepay with explicit limits and fees, and the runtime may revert if limits are exceeded. This prevents an untrusted producer from embedding unbounded loops or excessive storage writes that would otherwise deny service to verifiers. Memory and storage access may be isolated so a contract can only mutate its own state or explicitly passed-in accounts, and call graphs may execute atomically: either every storage write produced by the transaction is committed or the entire update is rolled back, ensuring that partial effects cannot be introduced by a faulty node.

State correctness may be enforced with cryptographic commitments. Within a block, the platform may compute a Merkle-style commitment to all transactions, receipts, or state (e.g., a Merkle-Patricia or Verkle root). Across blocks, each header may include a cryptographic hash pointer to its parent header, forming a directed acyclic graph of blocks where altering any past byte would change all descendant hashes. When a block is proposed, every verifier may re-execute its transactions and recompute the same commitments; a mismatch may cause the block to be rejected irrespective of who proposed it. Because hash functions used in commitments may satisfy preimage, second-preimage, and collision resistance-often built from Merkle-Damgård or sponge constructions—an adversary may be unable to forge alternate data with the same digest or find two different states that verify under one commitment.

Consensus may turn verifiable execution into a single shared history. In proof-of-work, nodes may accept the branch with the most accumulated work, making it economically prohibitive to replace a validated suffix without redoing massive computation. In proof-of-stake, validators may propose and attest to blocks with stake-weighted votes; fork-choice rules may select the head from competing branches, and finality gadgets may checkpoint epochs that cannot be reverted without slashing staked collateral for equivocation or signing invalid blocks. This economic layer may ensure that even if some proposers are malicious, honest re-executors converge on the same canonical state because alternative histories are either too costly to produce or lead to penalties.

Platforms may extend these guarantees with verifiable inclusions and light-client proofs. A light client may accept only headers and verify Merkle or Verkle proofs for specific keys (balances, storage slots) without holding full state. L2 rollups may further separate execution from verification by posting data and proofs to a base chain: optimistic rollups may rely on fraud proofs that re-execute disputed steps, while validity rollups may attach zero-knowledge proofs that the entire state transition is correct. In both cases, untrusted sequencers or provers may not need to be trusted because the base layer's data availability and proof verification may be sufficient for any node to check correctness.

Additional protocol mechanics may reinforce reliability under adversarial conditions. Fee markets may prioritize inclusion without central scheduling. Access lists or account declarations may allow parallel execution while preventing hidden state touches. Event and receipt logs may be committed into trees so off-chain systems can later prove exactly which function path executed and which indexes or policies were read. In some embodiments, these features may allow any untrusted node to propose or relay blocks and transactions while leaving validation to the protocol: signatures authorize intent, deterministic sandboxes produce the same effects everywhere, gas metering bounds work, cryptographic commitments bind contents to headers, and consensus selects one branch while penalizing misbehavior. Some embodiments may execute on a system where correctness does not depend on trusting any individual node, bridge, or application, only on publicly specified rules and widely checked cryptographic evidence.

Example Computing Device

Figure 8:
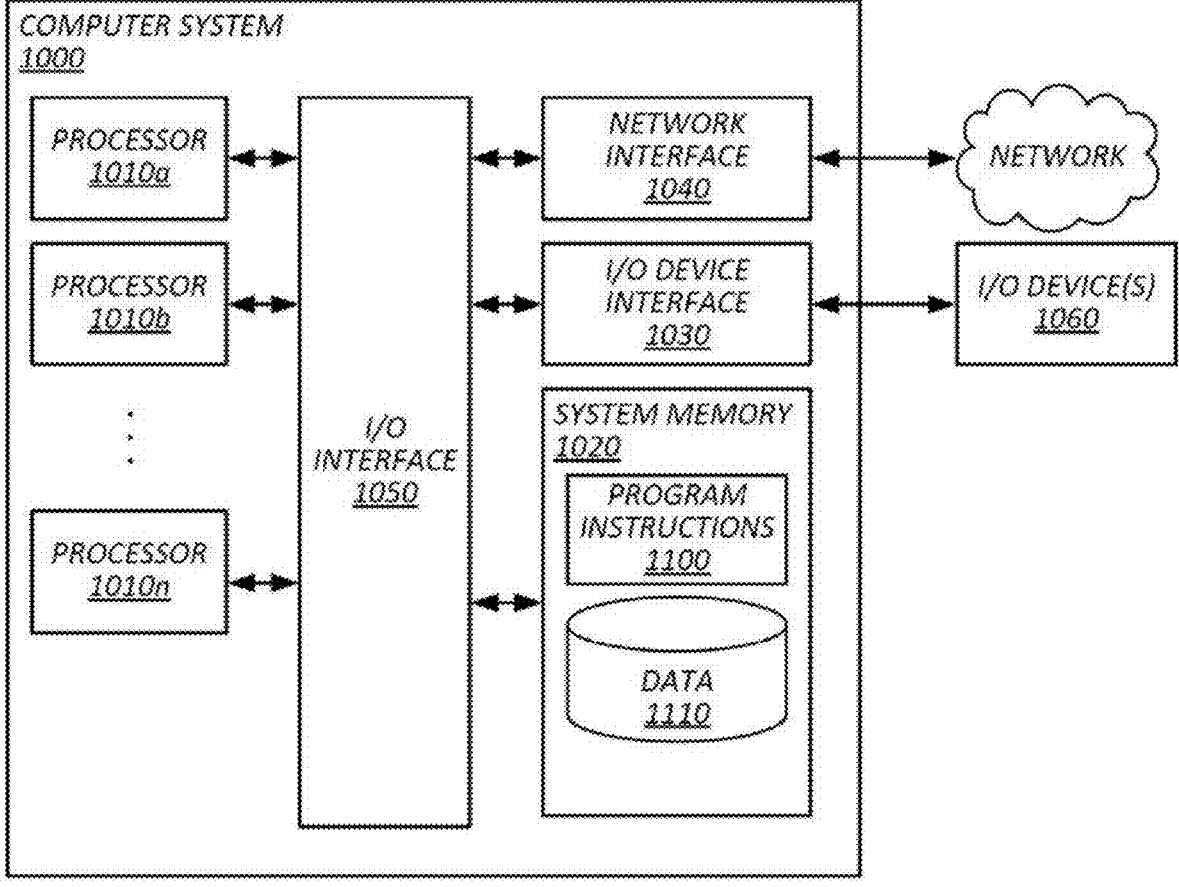
FIG. 8 illustrates an example of a computing device with which computing systems implementing the present techniques may be implemented.

FIG. 8 is a diagram that illustrates an exemplary computing device 1000 in accordance with embodiments of the present technique. A single computing device is shown, but some embodiments of a computer system may include multiple computing devices that communicate over a network, for instance in the course of collectively executing various parts of a distributed application like that discussed above. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010$a$-1010$n$) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010$a$), or a multi-processor system including any number of suitable processors (e.g., 1010$a$-1010$n$). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface May 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010$a$-1010$n$) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system"

performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence. In the present disclosure, the term "substantially simultaneously" refers to operations that occur either concurrently (e.g., are part of the same operation) or nearly concurrently with one another (e.g., within 10 milliseconds, 100 milliseconds, 1 second, or 1 minute of each other).

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood when read in view of the following enumerated embodiments:

Embodiment 1. A tangible, non-transitory, machine-readable medium storing instructions that when executed by one or more processors effectuate operations comprising: minting a base token with a base-token smart contract on a blockchain, the base token being rendered a rivalrous asset by the blockchain; wrapping the base token with a first-type of wrapper token with a first wrapper smart-contract on the blockchain, wherein the wrapping comprises minting the first-type of wrapper token, transferring the base token to a first wrapper blockchain account partially, but not fully, controlled by the first wrapper smart-contract, and transferring the minted first-type of wrapper token to a first user blockchain account without also transferring the base token to the first user blockchain account; receiving a request to transfer the base token to a second-type of wrapper token; and in response to receiving the requested transfer: determining that the requested transfer complies with rules in a policy associated with the first wrapper smart-contract; unwrapping the base token from the first-type of wrapper token; wrapping the base token with a second-type of wrapper token with a second wrapper smart-contract on the blockchain, wherein the second wrapper smart-contract is associated with a different policy from the policy associated with the first wrapper smart-contract, and the base token is transferred to a second wrapper blockchain account partially, but not fully, controlled by the second wrapper smart-contract.

Embodiment 2. The medium of embodiment 1, wherein the first-type of wrapper token earns yield without increasing the number of first-type wrapper tokens of the first user blockchain account.

Embodiment 3. The medium of embodiment 1, wherein compliance with the policy associated with the first wrapper smart-contract by the transfer of the base token to the second-type of wrapper token is determined by the first wrapper smart-contract or another smart contract on the blockchain.

Embodiment 4. The medium of embodiment 1, wherein compliance with the policy associated with the first wrapper smart-contract by the transfer of the base token to the second-type of wrapper token is determined by code not executed by a computing platform implementing the blockchain.

Embodiment 5. The medium of embodiment 1, wherein the base token is a stable coin backed by an asset, and the first-type of wrapper token and the second-type of wrapper token are stable coins backed by the base token.

Embodiment 6. The medium of embodiment 1, wherein the entities creating the first-type of wrapper token and the second-type of wrapper token are not issuers of a stable coin and do not own the base token when wrapped with their respective wrapper tokens.

Embodiment 7. The medium of embodiment 1, wherein interoperability of the base token between the first-type of wrapper token and the second-type of wrapper token is implemented with a router smart contract that is independent of the first wrapper smart-contract and the second wrapper smart-contract.

Embodiment 8. The medium of embodiment 1, wherein interoperability of the base token between the first-type of wrapper token and the second-type of wrapper token is implemented with a router smart contract that is independent of the first wrapper smart-contract and the second wrapper smart-contract.

Embodiment 9. The medium of embodiment 1, wherein interoperability of the base token between the first-type of wrapper token and the second-type of wrapper token is implemented by the first wrapper smart-contract, the second wrapper smart-contract, or both.

Embodiment 10. The medium of embodiment 1, wherein (a) the minting of the first-type of wrapper token and (b) the transferring of the base token to the first wrapper blockchain account partially, but not fully, controlled by the first wrapper smart-contract occur substantially simultaneously.

Embodiment 11. The medium of embodiment 1, wherein the partial control of the first wrapper smart-contract and the second wrapper smart-contract includes the ability to selectively block transfers of the base token.

Embodiment 12. The medium of embodiment 11, wherein the partial control of the first wrapper smart-contract and the second wrapper smart-contract does not include the ability to transfer the base token to blockchain accounts that are not pre-approved in a registry controlled by a different entity from entities specifying the policies associated with the first-type of wrapper token and the second-type of wrapper token.

Embodiment 13. The medium of embodiment 1, the operations further comprising steps for wrapping the base token with the second-type of wrapper token with the second wrapper smart-contract on the blockchain.

Embodiment 14. The medium of embodiment 1, wherein the blockchain comprises a first blockchain network and a second blockchain network, and wherein a spoke portal smart contract on the second blockchain network (a) receives an epoch update originating from a hub portal smart contract on the first blockchain network, (b) verifies authenticity of the epoch update based on cryptographic proof data, (c) rejects the epoch update based on a freshness rule stored on the second blockchain network, and (d) stores the epoch update in chain state of the second blockchain network for use in determining that the requested transfer complies with the policy associated with the first wrapper smart-contract or the policy associated with the second wrapper smart-contract.

Embodiment 15. The medium of embodiment 1, wherein determining that the requested transfer complies with rules in the policy comprises verifying, on the blockchain, a cryptographic membership proof that a destination blockchain account is included in a set of permitted destination blockchain accounts represented by a digest stored in chain state, wherein the cryptographic membership proof is bound to an epoch identifier stored in chain state.

Embodiment 16. The medium of embodiment 1, wherein the base-token smart contract maintains, in chain state, an index value that is monotonically non-decreasing over time, and wherein the first-type of wrapper token and the second-type of wrapper token are non-rebasing such that balances of the first-type of wrapper token and balances of the second-type of wrapper token do not change in response to changes in the index value.

Embodiment 17. The medium of embodiment 1, wherein receiving the request to transfer the base token to the second-type of wrapper token comprises receiving, by a router smart contract, a message that includes an authorization memo, and wherein at least one of the first wrapper smart-contract or the second wrapper smart-contract is configured to reject an unwrap or wrap operation unless the authorization memo satisfies a memo rule stored on the blockchain.

Embodiment 18. The medium of embodiment 1, wherein the first-type of wrapper token and the second-type of wrapper token are designated as being issued by different entities.

Embodiment 19. The medium of embodiment 1, wherein: (a) the blockchain maintains a replicated chain state that stores, for the base token, at least a balance mapping from blockchain accounts to base-token amounts and rejects any proposed state transition that would debit a base-token amount from a blockchain account without a valid cryptographic authorization attributable to that blockchain account or that would cause the base-token amount of that blockchain account to become negative; (b) the wrapping of the base token with the first-type of wrapper token is performed within execution of a single blockchain transaction that (i) effects the transferring of the base token from the first user blockchain account to the first wrapper blockchain account and (ii) effects the minting of the first-type of wrapper token to the first user blockchain account; (c) the first wrapper blockchain account is an account whose ability to transfer the base token out of the first wrapper blockchain account is constrained such that a transfer out of the first wrapper blockchain account is valid only when the transfer is invoked by the first wrapper smart-contract and the transfer additionally satisfies a second authorization requirement that is distinct from the first wrapper smart-contract; (d) the policy associated with the first wrapper smart-contract is represented on-chain by at least one policy record that includes a policy identifier and a cryptographic digest of a corresponding rule set, and determining that the requested transfer complies with rules in the policy comprises evaluating, by on-chain code, at least one rule predicate that references a registry of pre-approved destination blockchain accounts; and (e) receiving the request to transfer the base token to the second-type of wrapper token comprises receiving, by a router smart contract that is independent of the first wrapper smart-contract and the second wrapper smart-contract, a call that identifies at least the first wrapper smart-contract, the second wrapper smart-contract, and a requested base-token amount, wherein the unwrapping of the base token from the first-type of wrapper token and the wrapping of the base token with the second-type of wrapper token occur within execution of the call.

Embodiment 20. A tangible, non-transitory, machine-readable medium storing instructions that when executed by one or more processors effectuate operations comprising: maintaining, by a policy registrar smart contract, a policy record set comprising a plurality of policy records each associated with a policy identifier, each policy record defining at least one authorization rule for token-transfer operations based on at least one blockchain address; storing, for each of a plurality of token smart contracts, a respective selected policy identifier and an association between the token smart contract and the respective selected policy identifier; in response to a transfer request invoking a transfer function of a given token smart contract of the plurality of token smart contracts, obtaining, by the given token smart contract, policy data for the respective selected policy identifier associated with the given token smart contract from the policy registrar smart contract and determining that the transfer request satisfies the authorization rule of the policy record associated with the respective selected policy identifier; and in response to determining the transfer satisfies the authorization rule, updating blockchain state to effectuate the transfer; wherein an update to policy data for a particular policy identifier at the policy registrar smart contract is applied by at least two of the plurality of token smart contracts to subsequent transfer requests without redeploying the at least two token smart contracts.

Embodiment 21. The medium of embodiment 20, wherein each policy record comprises at least one of: an allow-list identifying permitted blockchain addresses, a deny list identifying blocked blockchain addresses, or a revocation flag.

Embodiment 22. The medium of embodiment 20, wherein the policy registrar smart contract stores, for at least one policy identifier, a version identifier and a rule digest for a current policy version, and wherein obtaining the policy data comprises obtaining the rule digest.

Embodiment 23. The medium of embodiment 20, wherein the policy registrar smart contract stores role membership data and exposes a role-membership check function, and wherein determining whether the transfer request satisfies the authorization rule comprises invoking the role-membership check function with respect to at least one blockchain address associated with the transfer request.

Embodiment 24. The medium of embodiment 20, wherein the transfer request further specifies a memo value, and wherein updating blockchain state to effectuate the transfer comprises storing the memo value in an event log entry associated with the transfer.

Embodiment 25. The medium of embodiment 24, wherein the memo value is included in at least one of: a mint operation, a burn operation, or a delegated transfer operation.

Embodiment 26. The medium of embodiment 20, wherein the operations further comprise maintaining, by at least one token smart contract, a monotonically non-decreasing earning index and computing, based on the earning index, a reward amount attributable to a token-holding account.

Embodiment 27. The medium of embodiment 20, wherein the operations further comprise emitting an event log entry that includes at least two of: an executed conversion rate, a venue identifier, or a policy version identifier associated with the authorization rule.

Embodiment 28. The medium of embodiment 20, wherein: each policy record comprises at least one of: an allowlist identifying permitted blockchain addresses, a deny list identifying blocked blockchain addresses, and a revocation flag; the policy registrar smart contract stores, for at least one policy identifier, a version identifier and a rule digest for a current policy version, and wherein obtaining the policy data comprises obtaining the rule digest; the policy registrar smart contract stores role membership data and exposes a role-membership check function, and wherein determining whether the transfer request satisfies the authorization rule comprises invoking the role-membership check function with respect to at least one blockchain address associated with the transfer request; the transfer request further specifies a memo value, and wherein updating blockchain state to effectuate the transfer comprises storing the memo value in an event log entry associated with the transfer; the memo value is included in at least one of: a mint operation, a burn operation, or a delegated transfer operation; and the operations further comprise maintaining, by at least one token smart contract, a monotonically non-decreasing earning index and computing, based on the earning index, a reward amount attributable to a token-holding account, and emitting an event log entry that includes at least two of: an executed conversion rate, a venue identifier, and a policy version identifier associated with the authorization rule.

Embodiment 29. A method, comprising: the operations of any of embodiments 1-28.

What is claimed is:

1. A tangible, non-transitory, machine-readable medium storing instructions that when executed by one or more processors effectuate operations comprising:

minting a base token with a base-token smart-contract on a blockchain, the base token being rendered a rivalrous asset by the blockchain;

wrapping the base token with a first-type of wrapper token with a first wrapper smart-contract on the blockchain, wherein the wrapping comprises:

minting the first-type of wrapper token, transferring the base token to a first wrapper blockchain account partially, but not fully, controlled by the first wrapper smart-contract, and transferring the minted first-type of wrapper token to a first user blockchain account without also transferring the base token to the first user blockchain account;

receiving a request to transfer the base token to a second-type of wrapper token; and in response to receiving the requested transfer:

determining that the requested transfer complies with rules in a policy associated with the first wrapper smart-contract;

unwrapping the base token from the first-type of wrapper token; and wrapping the base token with a second-type of wrapper token with a second wrapper smart-contract on the blockchain, wherein:

the second wrapper smart-contract is associated with a different policy from the policy associated with the first wrapper smart-contract, and the base token is transferred to a second wrapper blockchain account partially, but not fully, controlled by the second wrapper smart-contract.

2. The medium of claim 1, wherein:

the first-type of wrapper token earns yield without increasing the number of first-type of wrapper tokens of the first user blockchain account.

3. The medium of claim 1, wherein:

the requested transfer's compliance with the policy associated with the first wrapper smart-contract is determined by the first wrapper smart-contract or another smart-contract on the blockchain.

4. The medium of claim 1, wherein:

the requested transfer's compliance with the policy associated with the first wrapper smart-contract is determined by code not executed by a computing platform implementing the blockchain.

5. The medium of claim 1, wherein:

the base token is a stable coin backed by an asset; and the first-type of wrapper token and the second-type of wrapper token are stable coins backed by the base token.

6. The medium of claim 1, wherein:

the entity that created the first-type of wrapper token and the entity that created the second-type of wrapper token are each not stable coin issuers and do not own the base token when wrapped with their respective wrapper tokens.

7. The medium of claim 1, wherein:

interoperability of the base token between the first-type of wrapper token and the second-type of wrapper token is implemented with a router smart-contract that is independent of the first wrapper smart-contract and the second wrapper smart-contract.

8. The medium of claim 1, wherein:

interoperability of the base token between the first-type of wrapper token and the second-type of wrapper token is implemented by the first wrapper smart-contract, the second wrapper smart-contract, or both.

9. The medium of claim 1, wherein (a) the minting the first-type of wrapper token and (b) the transferring the base token to the first wrapper blockchain account partially, but not fully, controlled by the first wrapper smart-contract occur substantially simultaneously.

10. The medium of claim 1, wherein the partial control of the first and second wrapper smart-contracts includes an ability to selectively block transfers of the base token.

11. The medium of claim 10, wherein the partial control of the first and second wrapper smart-contracts does not include the ability to transfer the base token to blockchain accounts that are not pre-approved in a registry controlled by a different entity from entities specifying policies associated with the first-type of wrapper token and the second-type of wrapper token.

12. The medium of claim 1, the operations further comprising:

steps for wrapping the base token with the second-type of wrapper token with the second wrapper smart-contract on the blockchain.

13. The medium of claim 1, wherein the blockchain comprises a first blockchain network and a second blockchain network, and wherein a spoke portal smart-contract on the second blockchain network (a) receives an epoch update originating from a hub portal smart-contract on the first blockchain network, (b) verifies authenticity of the epoch update based on cryptographic proof data, (c) rejects the epoch update based on a freshness rule stored on the second blockchain network, and (d) stores the epoch update in chain state of the second blockchain network for use in determining that the requested transfer complies with the policy associated with the first wrapper smart-contract or the policy associated with the second wrapper smart-contract.

14. The medium of claim 1, wherein determining that the requested transfer complies with rules in the policy comprises verifying, on the blockchain, a cryptographic membership proof that a destination blockchain account is included in a set of permitted destination blockchain accounts represented by a digest stored in chain state, wherein the cryptographic membership proof is bound to an epoch identifier stored in chain state.

15. The medium of claim 1, wherein the base-token smart-contract maintains, in chain state, an index value that is monotonically non-decreasing over time, and wherein the first-type of wrapper token and the second-type of wrapper token are non-rebasing such that balances of the first-type of wrapper token and balances of the second-type of wrapper token do not change in response to changes in the index value.

16. The medium of claim 1, wherein receiving the request to transfer the base token to the second-type of wrapper token comprises receiving, by a router smart-contract, a message that includes an authorization memo, and wherein at least one of the first wrapper smart-contract or the second wrapper smart-contract is configured to reject an unwrap or wrap operation unless the authorization memo satisfies a memo rule stored on the blockchain.

17. The medium of claim 1, wherein the first-type of wrapper token and the second-type of wrapper token are designated as being issued by different entities.

18. The medium of claim 1, wherein: (a) the blockchain maintains a replicated chain state that stores, for the base token, at least a balance mapping from blockchain accounts to base-token amounts and rejects any proposed state transition that would debit a base-token amount from a blockchain account without a valid cryptographic authorization attributable to that blockchain account or that would cause the base-token amount of that blockchain account to become negative; (b) the wrapping of the base token with the first-type of wrapper token is performed within execution of a single blockchain transaction that (i) effects the transferring of the base token from the first user blockchain account to the first wrapper blockchain account and (ii) effects the minting of the first-type of wrapper token to the first user blockchain account; (c) the first wrapper blockchain account is an account whose ability to transfer the base token out of the first wrapper blockchain account is constrained such that a transfer out of the first wrapper blockchain account is valid only when the transfer is invoked by the first wrapper smart-contract and the transfer additionally satisfies a second authorization requirement that is distinct from the first wrapper smart-contract; (d) the policy associated with the first wrapper smart-contract is represented on-chain by at least one policy record that includes a policy identifier and a cryptographic digest of a corresponding rule set, and determining that the requested transfer complies with rules in the policy comprises evaluating, by on-chain code, at least one rule predicate that references a registry of pre-approved destination blockchain accounts; and (e) receiving the request to transfer the base token to the second-type of wrapper token comprises receiving, by a router smart-contract that is independent of the first wrapper smart-contract and the second wrapper smart-contract, a call that identifies at least the first wrapper smart-contract, the second wrapper smart-contract, and a requested base-token amount, wherein the unwrapping of the base token from the first-type of wrapper token and the wrapping of the base token with the second-type of wrapper token occur within execution of the call.

19. A method, comprising causing a blockchain computing platform to perform operations comprising:
  minting a base token with a base-token smart-contract on a blockchain, the base token being rendered a rivalrous asset by the blockchain;
  wrapping the base token with a first-type of wrapper token with a first wrapper smart-contract on the blockchain, wherein the wrapping comprises:
    minting the first-type of wrapper token,
    transferring the base token to a first wrapper blockchain account partially, but not fully, controlled by the first wrapper smart-contract, and
    transferring the minted first-type of wrapper token to a first user blockchain account without also transferring the base token to the first user blockchain account;
  receiving a request to transfer the base token to a second-type of wrapper token; and
  in response to receiving the requested transfer:
    determining that the requested transfer complies with rules in a policy associated with the first wrapper smart-contract;
    unwrapping the base token from the first-type of wrapper token; and
    wrapping the base token with a second-type of wrapper token with a second wrapper smart-contract on the blockchain, wherein:
      the second wrapper smart-contract is associated with a different policy from the policy associated with the first wrapper smart-contract, and
      the base token is transferred to a second wrapper blockchain account partially, but not fully, controlled by the second wrapper smart-contract.

20. The method of claim 19, wherein:
  the first-type of wrapper token earns yield without increasing the number of first-type of wrapper tokens of the first user blockchain account.

21. The method of claim 19, wherein:
  the requested transfer's compliance with the policy associated with the first wrapper smart-contract is determined by the first wrapper smart-contract or another smart-contract on the blockchain.

22. The method of claim 19, wherein:
  the requested transfer's compliance with the policy associated with the first wrapper smart-contract is determined by code not executed by a computing platform implementing the blockchain.

23. The method of claim 19, wherein:
  the base token is a stable coin backed by an asset; and
  the first-type of wrapper token and the second-type of wrapper token are stable coins backed by the base token.

24. The method of claim 19, wherein:
  the entity that created the first-type of wrapper token and the entity that created the second-type of wrapper token are each not stable coin issuers and do not own the base token when wrapped with their respective wrapper tokens.

25. The method of claim 19, wherein:
  interoperability of the base token between the first-type of wrapper token and the second-type of wrapper token is implemented with a router smart-contract that is independent of the first wrapper smart-contract and the second wrapper smart-contract.

26. The method of claim 19, wherein:

interoperability of the base token between the first-type of wrapper token and the second-type of wrapper token is implemented by the first wrapper smart-contract, the second wrapper smart-contract, or both.

27. The method of claim 19, wherein (a) the minting the first-type of wrapper token and (b) the transferring the base token to the first wrapper blockchain account partially, but not fully, controlled by the first wrapper smart-contract occur substantially simultaneously.

28. The method of claim 19, wherein the partial control of the first and second wrapper smart-contracts includes an ability to selectively block transfers of the base token.

29. The method of claim 28, wherein the partial control of the first and second wrapper smart-contracts does not include the ability to transfer the base token to blockchain accounts that are not pre-approved in a registry controlled by a different entity from entities specifying policies associated with the first-type of wrapper token and the second-type of wrapper token.

30. The method of claim 19, further comprising:

steps for wrapping the base token with the second-type of wrapper token with the second wrapper smart-contract on the blockchain.

31. The method of claim 19, wherein the blockchain comprises a first blockchain network and a second blockchain network, and wherein a spoke portal smart-contract on the second blockchain network (a) receives an epoch update originating from a hub portal smart-contract on the first blockchain network, (b) verifies authenticity of the epoch update based on cryptographic proof data, (c) rejects the epoch update based on a freshness rule stored on the second blockchain network, and (d) stores the epoch update in chain state of the second blockchain network for use in determining that the requested transfer complies with the policy associated with the first wrapper smart-contract or the policy associated with the second wrapper smart-contract.

32. The method of claim 19, wherein determining that the requested transfer complies with rules in the policy comprises verifying, on the blockchain, a cryptographic membership proof that a destination blockchain account is included in a set of permitted destination blockchain accounts represented by a digest stored in chain state, wherein the cryptographic membership proof is bound to an epoch identifier stored in chain state.

33. The method of claim 19, wherein the base-token smart-contract maintains, in chain state, an index value that is monotonically non-decreasing over time, and wherein the first-type of wrapper token and the second-type of wrapper token are non-rebasing such that balances of the first-type of wrapper token and balances of the second-type of wrapper token do not change in response to changes in the index value.

34. The method of claim 19, wherein receiving the request to transfer the base token to the second-type of wrapper token comprises receiving, by a router smart-contract, a message that includes an authorization memo, and wherein at least one of the first wrapper smart-contract or the second wrapper smart-contract is configured to reject an unwrap or wrap operation unless the authorization memo satisfies a memo rule stored on the blockchain.

35. The method of claim 19, wherein the first-type of wrapper token and the second-type of wrapper token are designated as being issued by different entities.

36. The method of claim 19, wherein: (a) the blockchain maintains a replicated chain state that stores, for the base token, at least a balance mapping from blockchain accounts to base-token amounts and rejects any proposed state transition that would debit a base-token amount from a blockchain account without a valid cryptographic authorization attributable to that blockchain account or that would cause the base-token amount of that blockchain account to become negative;

(b) the wrapping of the base token with the first-type of wrapper token is performed within execution of a single blockchain transaction that (i) effects the transferring of the base token from the first user blockchain account to the first wrapper blockchain account and (ii) effects the minting of the first-type of wrapper token to the first user blockchain account; (c) the first wrapper blockchain account is an account whose ability to transfer the base token out of the first wrapper blockchain account is constrained such that a transfer out of the first wrapper blockchain account is valid only when the transfer is invoked by the first wrapper smart-contract and the transfer additionally satisfies a second authorization requirement that is distinct from the first wrapper smart-contract; (d) the policy associated with the first wrapper smart-contract is represented on-chain by at least one policy record that includes a policy identifier and a cryptographic digest of a corresponding rule set, and determining that the requested transfer complies with rules in the policy comprises evaluating, by on-chain code, at least one rule predicate that references a registry of pre-approved destination blockchain accounts; and (e) receiving the request to transfer the base token to the second-type of wrapper token comprises receiving, by a router smart-contract that is independent of the first wrapper smart-contract and the second wrapper smart-contract, a call that identifies at least the first wrapper smart-contract, the second wrapper smart-contract, and a requested base-token amount, wherein the unwrapping of the base token from the first-type of wrapper token and the wrapping of the base token with the second-type of wrapper token occur within execution of the call.

\* \* \* \* \*